US011771059B2

United States Patent
Deliou

(10) Patent No.: US 11,771,059 B2
(45) Date of Patent: Oct. 3, 2023

(54) METHOD AND SYSTEM FOR TRACKING A PLURALITY OF ANIMALS WITH A PORTABLE COMPUTING DEVICE

(71) Applicant: BOEHRINGER INGELHEIM ANIMAL HEALTH USA INC., Duluth, GA (US)

(72) Inventor: Pierre-Emmanuel Deliou, Sugar Hill, GA (US)

(73) Assignee: BOEHRINGER INGELHEIM ANIMAL HEALTH USA INC., Duluth, GA (US)

( * ) Notice: Subject to any disclaimer, the term of this patent is extended or adjusted under 35 U.S.C. 154(b) by 277 days.

(21) Appl. No.: 16/640,834

(22) PCT Filed: Aug. 31, 2018

(86) PCT No.: PCT/US2018/049030
§ 371 (c)(1),
(2) Date: Feb. 21, 2020

(87) PCT Pub. No.: WO2019/046685
PCT Pub. Date: Mar. 7, 2019

(65) Prior Publication Data
US 2020/0367471 A1    Nov. 26, 2020

Related U.S. Application Data

(60) Provisional application No. 62/552,872, filed on Aug. 31, 2017.

(51) Int. Cl.
*A01K 11/00* (2006.01)
*A01K 29/00* (2006.01)
(Continued)

(52) U.S. Cl.
CPC .......... *A01K 11/008* (2013.01); *A01K 29/005* (2013.01); *G06Q 10/0833* (2013.01); *H04B 5/0062* (2013.01); *H04L 67/52* (2022.05)

(58) Field of Classification Search
CPC ...................................................... H04L 51/10
(Continued)

(56) References Cited

U.S. PATENT DOCUMENTS

| 4,041,549 A | 8/1977 | Atkinson |
| 4,068,624 A | 1/1978 | Ramney |

(Continued)

FOREIGN PATENT DOCUMENTS

| AU | 2012268831 A1 | 7/2013 |
| CA | 2836178 A1 | 6/2015 |

(Continued)

OTHER PUBLICATIONS

C. Mulliner, "Vulnerability Analysis and Attacks on NFC-Enabled Mobile Phones," 2009 International Conference on Availability, Reliability and Security, 2009, pp. 695-700, doi: 10.1109/ARES.2009.46. (Year: 2009).*

(Continued)

*Primary Examiner* — William D Cumming

(57) ABSTRACT

A computer-implemented method and system for tracking near-field communication (NFC)-enabled animals with a portable computing device (PCD) (i.e. mobile phone) may include providing an NFC-tag comprising memory in which the memory contains a unique identifier. The NFC-tag may be coupled to an animal and then the NFC-tag may be scanned with the PCD. A tag identification server may determine if data from the NFC-tag exists in a database and then transmits an animal production facility identifier and one or more animal records associated with data from the NFC-tag from the tag identification server if the data from (Continued)

the NFC-tag exists in the database. Access to a secure memory area on the portable computing device containing a complete set of animal records for an entire animal facility may be granted if the software identifier matches the animal production facility identifier received from the tag identification server.

7 Claims, 27 Drawing Sheets

(51) Int. Cl.
    *G06Q 10/08*     (2012.01)
    *H04B 5/00*     (2006.01)
    *H04L 67/52*     (2022.01)
    *G06Q 10/0833*     (2023.01)

(58) Field of Classification Search
    USPC ........................................................ 709/204
    See application file for complete search history.

(56) References Cited

U.S. PATENT DOCUMENTS

| | | | |
|---|---|---|---|
| 5,991,925 A | 11/1999 | Wu | |
| 6,233,740 B1 | 5/2001 | Meyers et al. | |
| 6,283,065 B1 | 9/2001 | Shorrock et al. | |
| 6,342,839 B1 | 1/2002 | Curkendall et al. | |
| 6,506,784 B1 | 1/2003 | Dhanoa et al. | |
| 6,539,281 B2 | 3/2003 | Wan et al. | |
| 7,299,990 B2 | 11/2007 | Hoshina | |
| 7,460,018 B2 | 12/2008 | Kubo | |
| 7,589,638 B2 | 9/2009 | Jackson et al. | |
| 8,031,067 B2 | 10/2011 | Greenberg | |
| 8,368,515 B2 | 2/2013 | Kim | |
| 8,560,349 B2 | 10/2013 | Coe | |
| 8,573,502 B2 | 11/2013 | McCoy | |
| 8,905,317 B1 | 12/2014 | Hsu et al. | |
| 9,298,756 B1 * | 3/2016 | Johnson | G06F 16/9554 |
| 9,560,482 B1 | 1/2017 | Frenz | |
| 9,693,536 B1 | 7/2017 | Dana | |
| 11,026,402 B2 * | 6/2021 | Deliou | A01K 15/023 |
| 2002/0158765 A1 | 10/2002 | Pape et al. | |
| 2003/0182435 A1 * | 9/2003 | Redlich | G06F 21/62 726/16 |
| 2004/0236191 A1 | 11/2004 | Poliska et al. | |
| 2005/0190038 A1 | 9/2005 | Parthoens | |
| 2006/0075001 A1 * | 4/2006 | Canning | G06F 8/65 707/999.203 |
| 2006/0202835 A1 | 9/2006 | Thibault | |
| 2006/0242799 A1 | 11/2006 | Flossner | |
| 2006/0270421 A1 | 11/2006 | Phillips et al. | |
| 2008/0040157 A1 | 2/2008 | Saunders | |
| 2011/0234399 A1 | 9/2011 | Yan | |
| 2012/0124387 A1 | 5/2012 | Skocic | |
| 2012/0231816 A1 | 9/2012 | Kubo | |
| 2012/0285056 A1 | 11/2012 | Corrales, Jr. | |
| 2013/0157628 A1 | 6/2013 | Kim et al. | |
| 2013/0340305 A1 | 12/2013 | Mobley | |
| 2014/0113549 A1 | 4/2014 | Beg et al. | |
| 2014/0164507 A1 * | 6/2014 | Tesch | H04L 51/10 709/204 |
| 2014/0306005 A1 | 10/2014 | Kline | |
| 2014/0370909 A1 | 12/2014 | Natucci, Jr. et al. | |
| 2015/0053773 A1 | 2/2015 | Hsu et al. | |
| 2015/0257388 A1 | 9/2015 | Vardi et al. | |
| 2015/0334994 A1 | 11/2015 | Prasad | |
| 2015/0339501 A1 | 11/2015 | Auer | |
| 2016/0027022 A1 | 1/2016 | Benoit et al. | |
| 2016/0063188 A1 | 3/2016 | Thornberry et al. | |
| 2016/0116596 A1 | 4/2016 | Rajala | |
| 2016/0135431 A1 | 5/2016 | Siegel | |
| 2016/0142872 A1 | 5/2016 | Nicholson et al. | |
| 2016/0189174 A1 * | 6/2016 | Heath | G06Q 30/0201 705/7.29 |
| 2017/0150698 A1 * | 6/2017 | Zaidi | A01K 5/0225 |
| 2017/0280688 A1 * | 10/2017 | Deliou | G06K 19/07773 |
| 2018/0211718 A1 * | 7/2018 | Heath | G16H 80/00 |
| 2018/0225486 A1 | 8/2018 | Teruyama | |
| 2020/0275635 A1 * | 9/2020 | Deliou | H04W 4/021 |
| 2020/0367471 A1 * | 11/2020 | Deliou | G06Q 50/02 |

FOREIGN PATENT DOCUMENTS

| | | | |
|---|---|---|---|
| EP | 1772696 A1 | 4/2007 | |
| EP | 2465344 A1 | 6/2012 | |
| ES | 2558790 A1 | 2/2016 | |
| JP | H06-72352 | 10/1994 | |
| JP | 2006209497 A | 8/2006 | |
| JP | 2007094875 A | 4/2007 | |
| JP | 2013117905 A | 6/2013 | |
| WO | 97/48302 A1 | 12/1997 | |
| WO | 2006091765 A2 | 8/2006 | |
| WO | 2010016772 A1 | 2/2010 | |
| WO | 2011129840 A1 | 10/2011 | |
| WO | 2012006331 A1 | 1/2012 | |
| WO | 2012086412 A1 | 6/2012 | |
| WO | 2016000081 A1 | 1/2016 | |
| WO | WO-2016000081 A1 * | 1/2016 | A01K 11/006 |
| WO | 2016109835 A1 | 7/2016 | |
| WO | 2016189524 A9 | 11/2017 | |
| WO | 2019046685 A1 | 3/2019 | |
| WO | WO-2019046685 A1 * | 3/2019 | A01K 11/008 |
| WO | WO-2019067473 A1 * | 4/2019 | A01K 11/007 |

OTHER PUBLICATIONS

P. Stirparo, "A Fuzzing Framework for the Security Evaluation of NDEF Message Format," 2013 Fifth International Conference on Computational Intelligence, Communication Systems and Networks, 2013, pp. 165-170, doi: 10.1109/CICSYN.2013.58. (Year: 2013).*

Klee, Steffen · Roussos, Alexandros • Maass, Max • Hollick, Matthias, "NFCGate: Opening the Door for NFC Security Research with a Smartphone-Based Toolkit" Cornell University, Aug. 10, 2020 (Year: 2020).*

Kang, Byeongbeom, and Hyun Yoe. "NFC Based Livestock Traceability Management System." Advanced Science and Technology Letters, vol. 51, 2014, pp. 329-336.

JeeHee Koo, et al. "Development of the RFID-Based Livestock ID Management System." Journal of Next Generation Information Technology, vol. 4, No. 5, 2013, pp. 147-151.

"NXPRFID-Livestock Management RFID | Livestock Industry Solutions" web page downloaded from https://nxprfid.;com/applications/livestockmanagement/ on Oct. 26, 2016.

"QR Code Pet ID Tags by BARKCODE—BARKCODE Dog Collars and Pet ID Tags," (https://shopbarkcode.com/ collections/barkcode-pet-id-tag-retail?from=barkcode.com and https:// shopbarkcode.com/pages/sample-dprofile); accessed Sep. 6, 2017.

Voulodimos, et al., "A complete farm management system based on animal identification using RFID technology," Computers and Electronics in Agriculture, vol. 70.2, 2010, pp. 380-388.

"Smart Pet Collar—MDT Innovations Sdn. Bhd," (http://mmdt.cc/iot-solutions-mdt/smart-pet-collar/), accessed Sep. 6, 2017.

"SureFlap RFID Collar Tab," web page download from http:// petdoorsus.co.nz/SureFLapRFIDCollarTag on Dec. 19, 2016.

T Berners-Lee et al.,"RFC 3986—Uniform Resource Identifier (URI): Generic Syntax," Jan. 31, 2005 (Jan. 31, 2005), XPO55228543, Retrieved from the Internet [retrieved on Nov. 16, 2015].

L.T. Beng, et al., « Field testing of IoT devices for livestock monitoring using Wireless Sensor Network, near field communication and Wireless Power Transfer, » 2016 IEEE Conference on Technologies for Sustainability (SusTech), 2016, pp. 169-173, doi : 10.1109/SusTech. 2016.7897161. (Year : 2016).

(56) References Cited

OTHER PUBLICATIONS

"NFC Tags 101 How To Create a Tag that Opens a Website URL Viewed on internet" [URL: https://www.youtube.com/ watch?v=ZCIH8zJBEEK; Published on Aug. 22, 2020 Viewed on internet on Mar. 6, 2021].

Machine translation of JP H06-72352 from Espacenet.

* cited by examiner

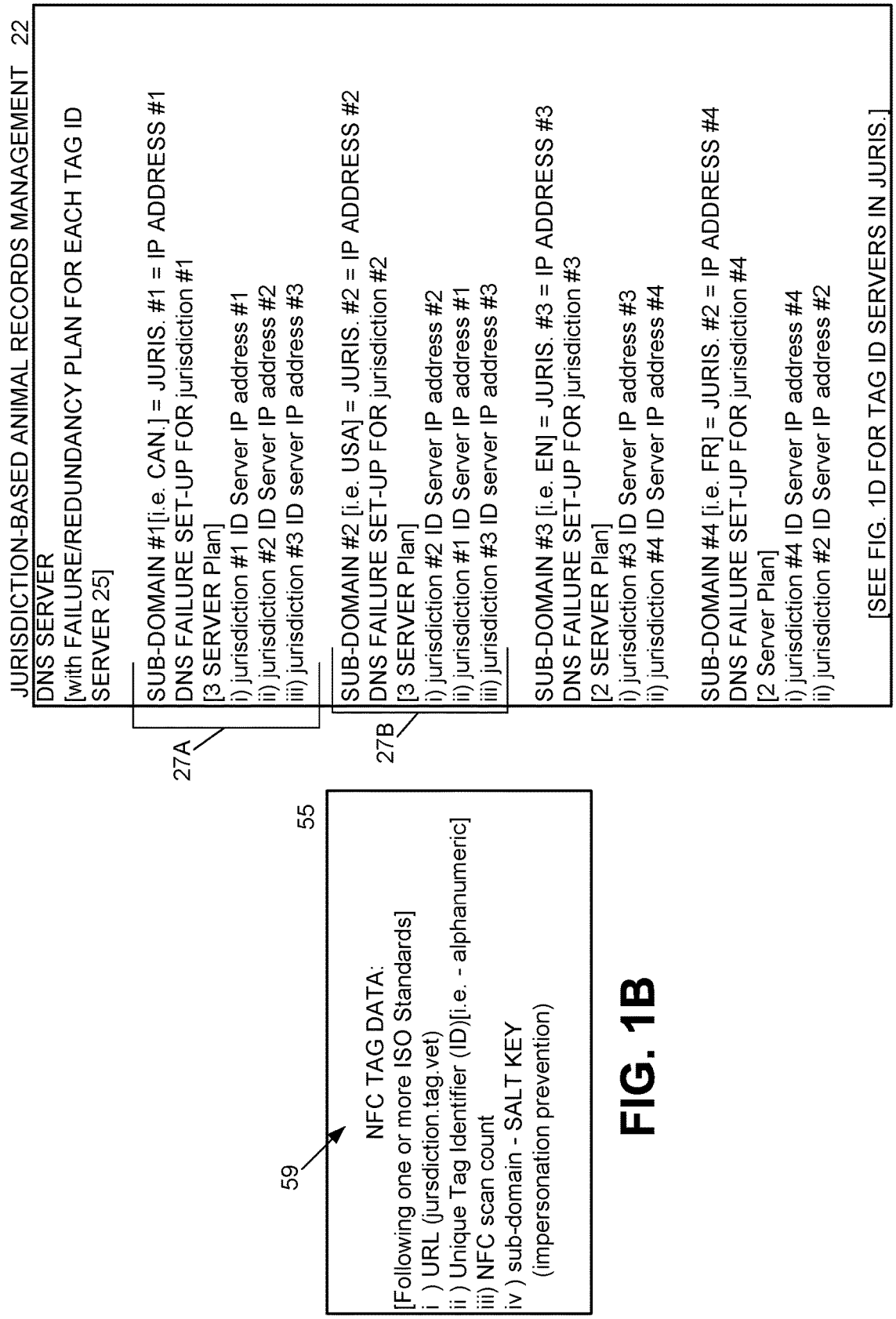

JURISDICTION-BASED ANIMAL RECORDS MANAGEMENT

JURIS. #1 – NFC TAG IDENTIFICATION SERVER
(physically located
In select jurisdiction [i.e. country])

DNS FAILURE SET-UP FOR jurisdiction #1
i) jurisdiction #1 ID Server IP address #1
ii) jurisdiction #2 ID Server IP address #2
iii) jurisdiction #3 ID server IP address #3

25A
27A

JURIS. #2 – NFC TAG IDENTIFICATION SERVER
(physically located
In select jurisdiction [i.e. country])

DNS FAILURE SET-UP FOR jurisdiction #2
i) jurisdiction #2 ID Server IP address #2
ii) jurisdiction #1 ID Server IP address #1
iii) jurisdiction #3 ID server IP address #3

25B
27B

JURIS. #3 – NFC TAG IDENTIFICATION SERVER
(physically located
In select jurisdiction [i.e. country])

DNS FAILURE SET-UP FOR jurisdiction #3
i) jurisdiction #3 ID Server IP address #3
ii) jurisdiction #4 ID Server IP address #4

25C
27C

JURIS. #4 – NFC TAG IDENTIFICATION SERVER
(physically located
In select jurisdiction [i.e. country])

DNS FAILURE SET-UP FOR jurisdiction #4
i) jurisdiction #4 ID Server IP address #4
ii) jurisdiction #3 ID Server IP address #3

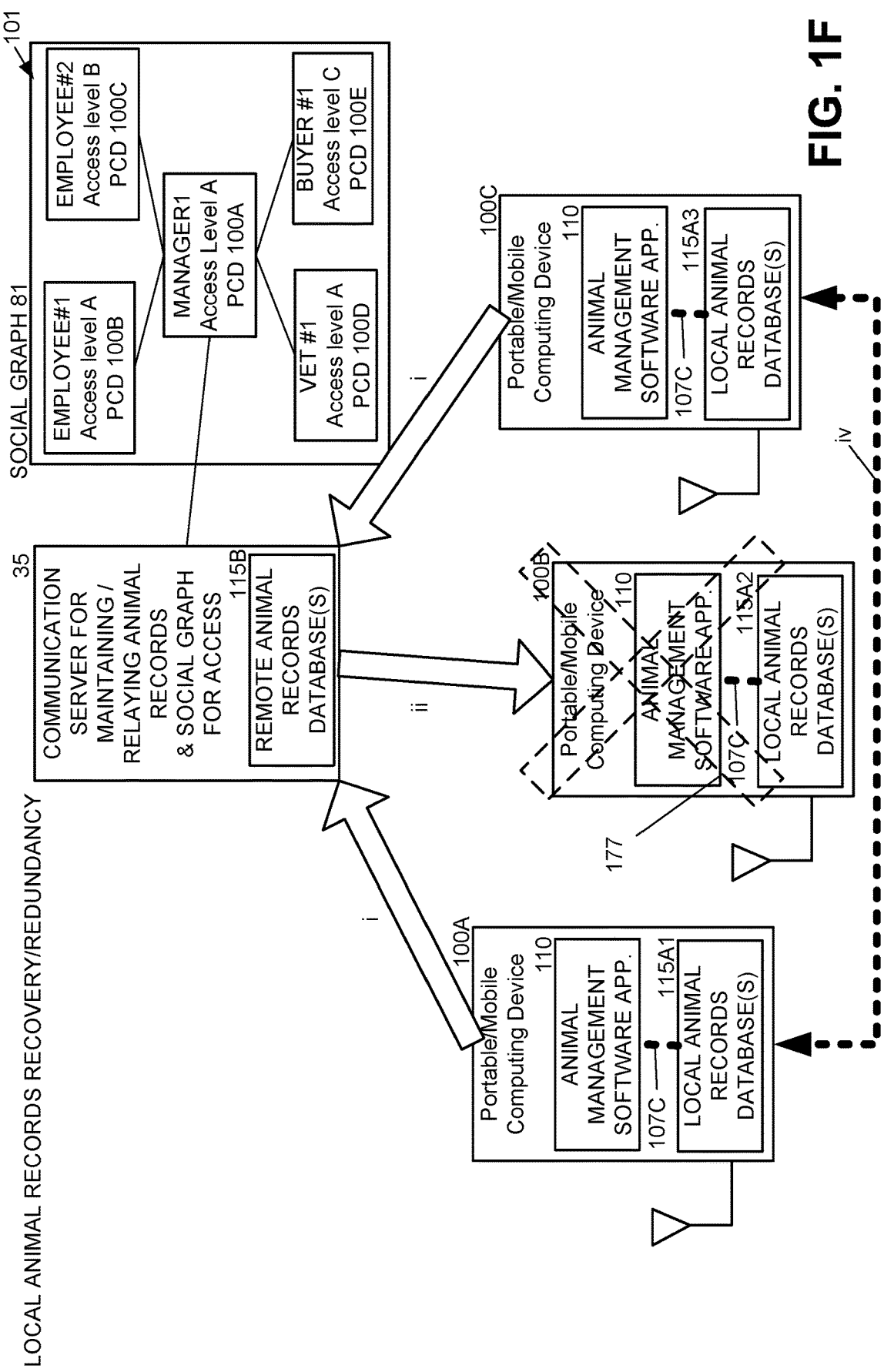

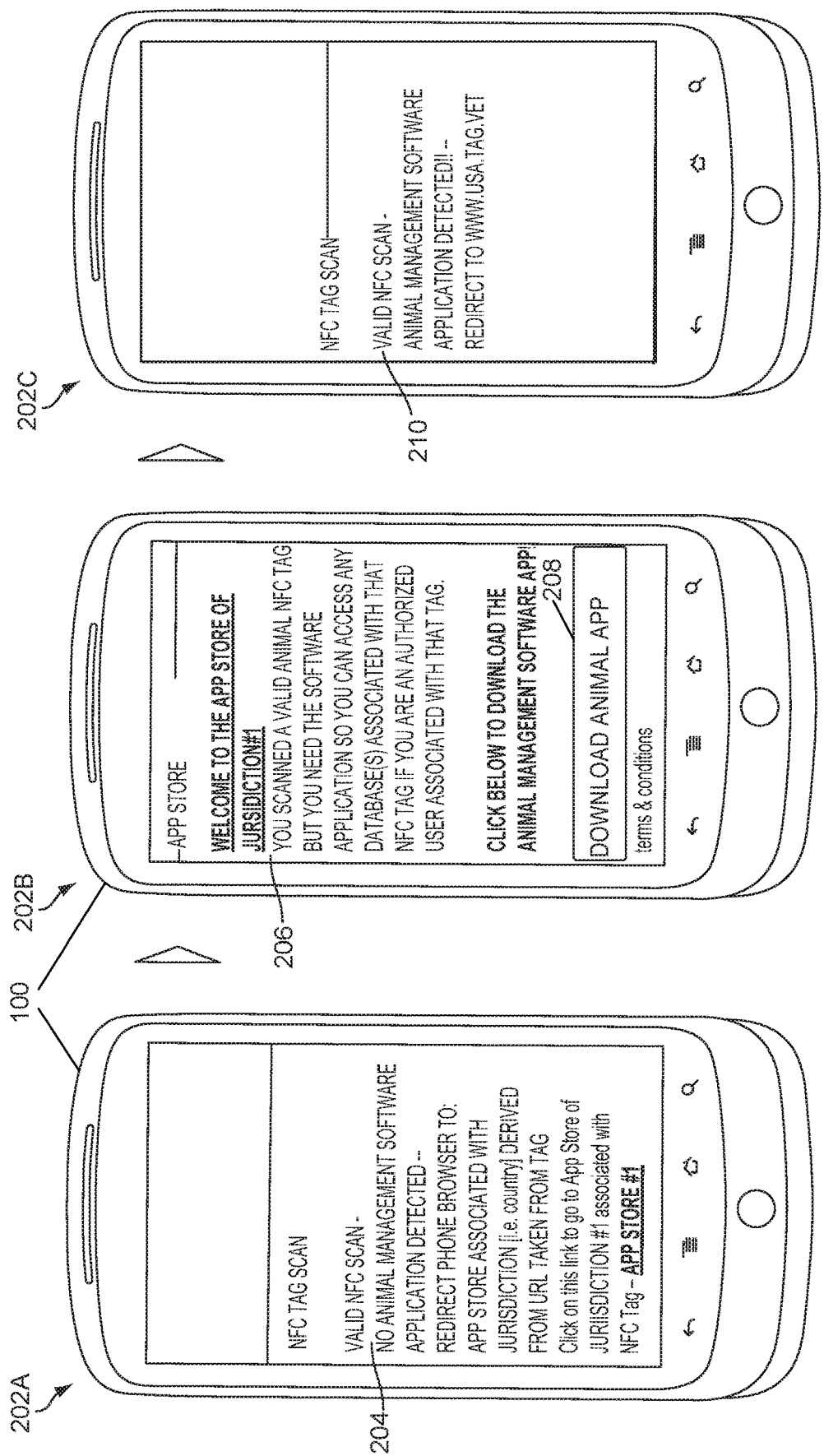

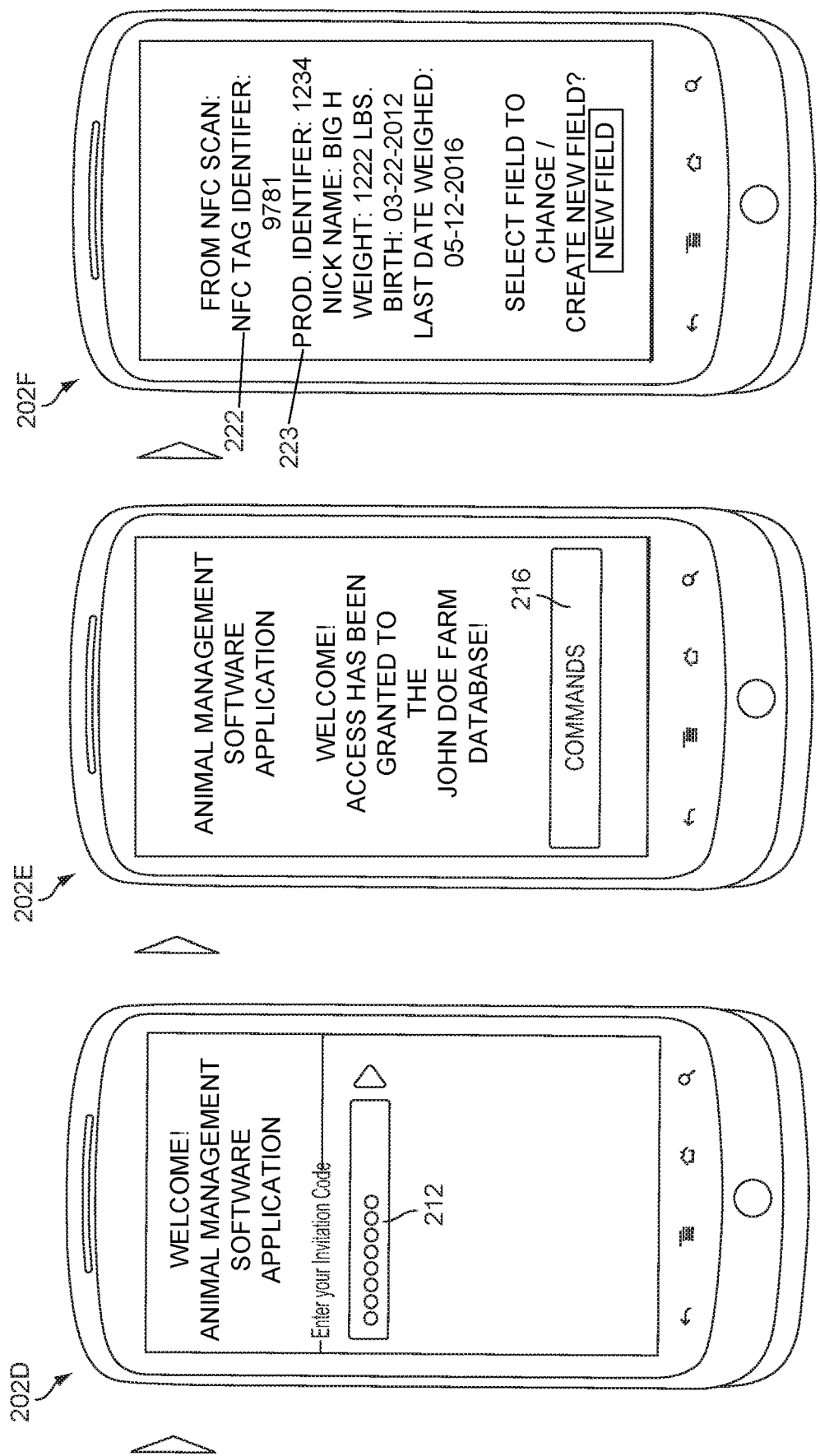

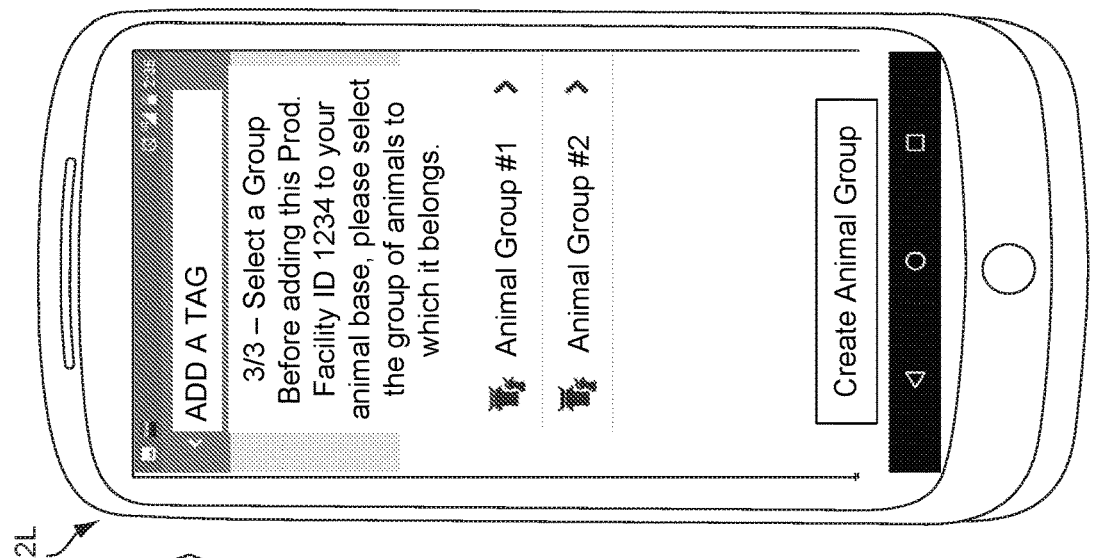
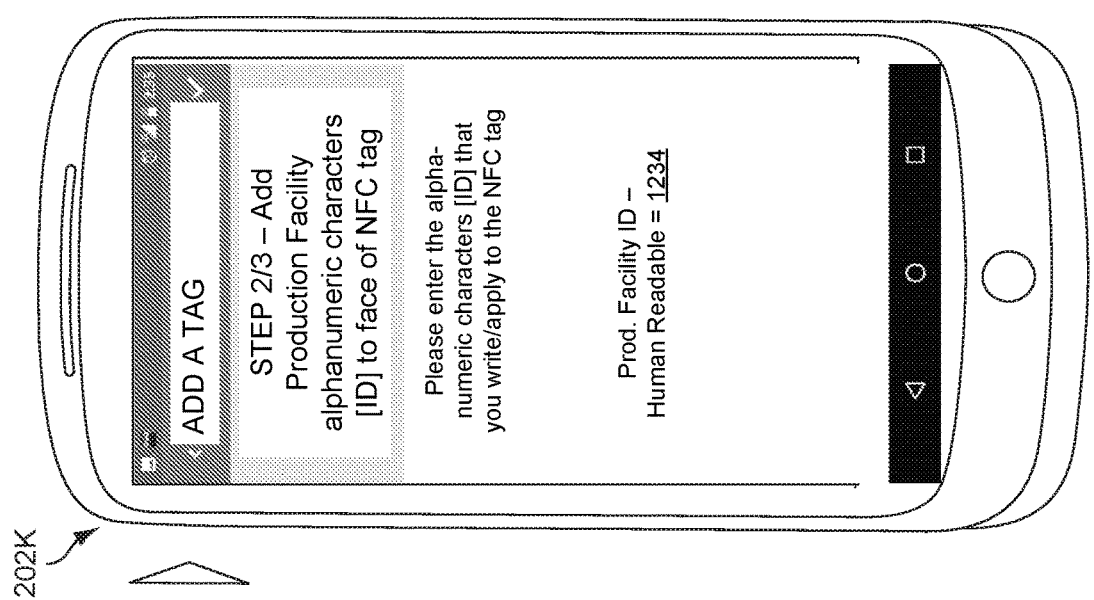
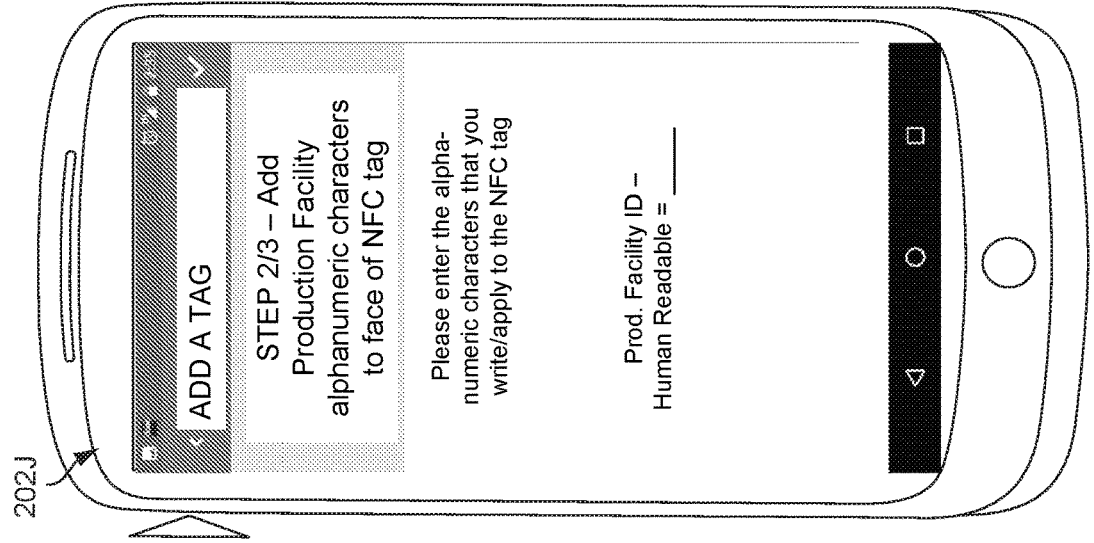
FIG. 2L
FIG. 2K
FIG. 2J

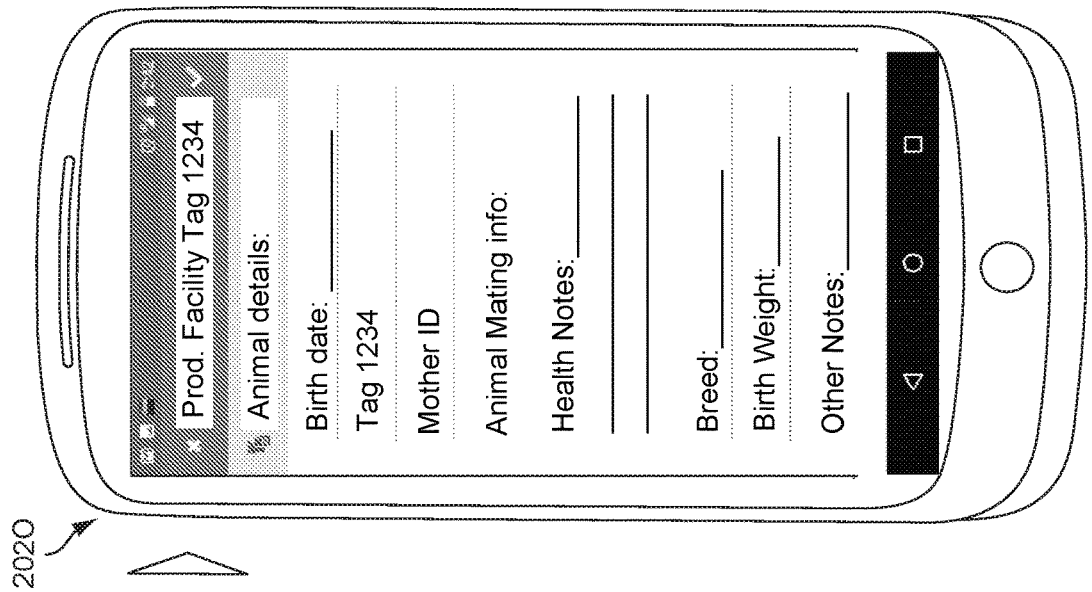
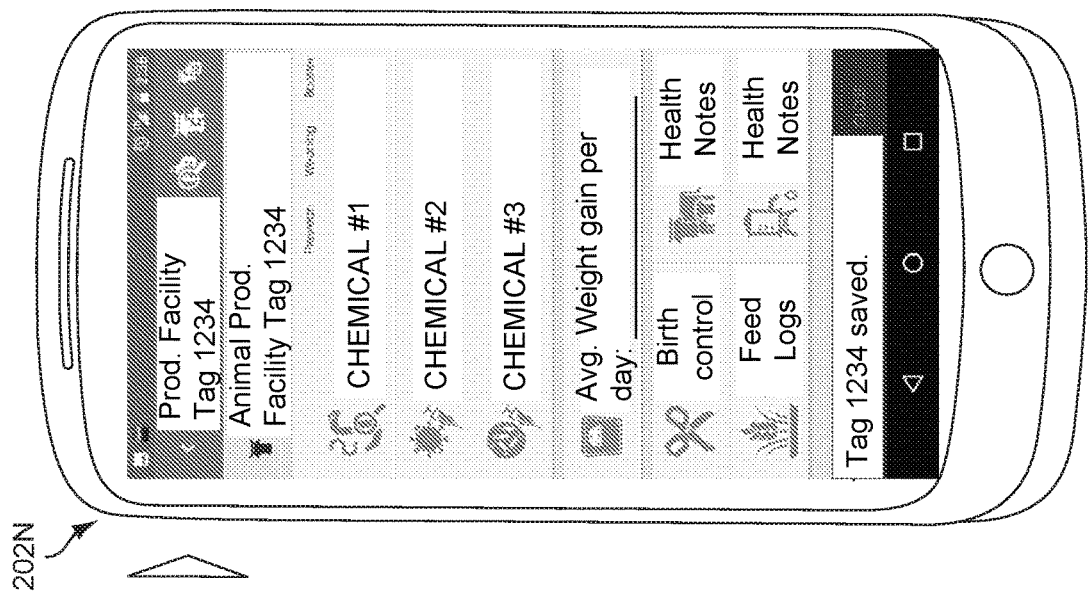
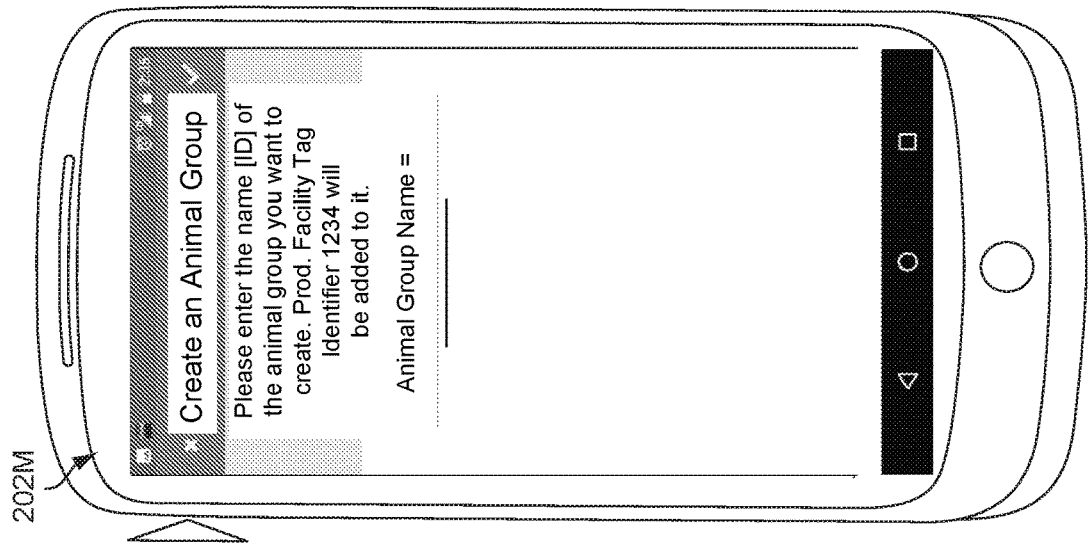
FIG. 2O
FIG. 2N
FIG. 2M

METHOD AND SYSTEM FOR TRACKING A PLURALITY OF ANIMALS WITH A PORTABLE COMPUTING DEVICE

BACKGROUND

Conventional computer systems and electronic/smart tags that are attached to animals have been developed for tracking animals, such as herds of animals that may be part of the livestock/cattle industry. The conventional computer systems in the livestock industry may be used to generate and store electronic records for each animal on a farm that is raised from birth to maturity. The electronic records can be used to track medical information about each animal that is important for the livestock industry which is often regulated by a jurisdiction, such as the government of a country or local jurisdiction (city, town, county, province, state, etc.).

The medical information contained in each electronic record may include a wide range of parameters that usually relate to the general health and/or well being of an animal. The medical information may include, but is not limited to, birth date, weight, types of vaccinations, dates of the vaccinations, nutrition supplements, medical history, etc.

One problem often faced by conventional computer systems was that a desktop or laptop computer having a QWERTY keyboard was needed for an operator (i.e. a farmer and/or animal handler) to enter or key-in data about each animal. This means that a power source and/or flat surface like a desk or table was needed to be provided adjacent to the livestock in a barn or on the ground outside and adjacent to livestock while medical information about a particular animal was being taken.

Desktop and laptop computers are usually not very portable or conducive for general use outdoors when working with livestock. Desktop and laptop computers can also be challenging for buildings, like barns, which often do not have power sources and/or flat surfaces (i.e. desks) readily available for supporting a desktop or laptop computer.

Another problem faced by conventional computer systems in the livestock industry has been the storage and retrieval of the electronic records created for each animal. Conventional computer systems may require electronic records to be stored on computer servers that are remote relative to the desktop or laptop computer which are used to create the records. The computer servers may be accessed using computer communications networks such as the Internet.

Such remote storage of the electronic records creates problems when computer communication networks are down/off-line. Further, many farms are often geographically remote and frequently do not have high-speed wired access to the Internet, unlike suburban/residential areas which are catered to with respect to high-speed wired access to the Internet. This means that when access to the Internet is down, a farm using conventional computer systems may not have access to its electronic records about its animals which are stored on remote computer servers.

To easily associate electronic records with an animal, conventional computer systems will work in conjunction with smart or electronic tags, such as Radio Frequency Identification (RFID) tags or "microchips." RFID tags may be used for identifying animals, including production and domestic animals and wildlife. Such RFID tags may be used in such varied circumstances as recording production animal movements and handling, lost domestic animal identification, and wildlife "banding" for research purposes.

Conventional RFID tags often suffer from various disadvantages, including availability, power and portability limitations of specifically designed RFID readers, and limited information available through the RFID microchip. Moreover, competing microchip manufacturers may maintain separate databases, and microchips of those manufacturers may use different types of RFID readers that may only read the microchip of that manufacturer.

Therefore, what is needed in the art is a system and method for tracking animals with electronic tags and a portable computing device (PCD), such as a mobile telephone. Another need exists in the art for a method and system for tracking animals with a PCD and electronic tags and in which electronic records may be stored locally, such as on the PCD itself, so that electronic records may be accessed, edited, and/or created even when the PCD may not have access to a computer communications network, like the Internet.

SUMMARY

A computer-implemented method and system for tracking near-field communication (NFC)-enabled animals with a portable computing device (PCD)(i.e. mobile phone) may include providing an NFC-tag comprising memory in which the memory contains a unique identifier. The NFC-tag may be coupled to an animal and then the NFC-tag may be scanned with the PCD.

The PCD may receive tag information from the scan, where the tag information includes the unique identifier and a universal resource locater. The PCD may transmit the URL over a communications network to a domain name service computer server.

The domain name service computer server may then transmit over the communications network to the PCD an internet protocol address of a NFC-tag identification server assigned to the URL that was part of the tag information. The PCD may then transmit the tag info from the scan over the communications network to the NFC-tag identification server.

If the NFC-tag identification server is available, the NFC-tag identification server receives the tag info and then transmits a message comprising a link to an on-line store where animal management software that may communicate with the NFC-tag may be purchased and downloaded. In this way, appropriate animal management software which is jurisdiction-based/dependent [i.e.—country-based] may be downloaded.

A computer-implemented method and system for tracking near-field communication (NFC)-enabled animals with a portable computing device (PCD) may also include scanning an NFC-tag with the portable computing device and retrieving data from the scan. Next, it is determined if data from the NFC-tag matches data stored within the portable computing device. The NFC-tag data is transmitted over a communications network along with a software identifier associated with the PCD if the data from the NFC-tag matches data stored within the portable computing device.

A tag identification server may then determine if data from the NFC-tag exists in a database and then transmits an animal production facility identifier and one or more animal records associated with data from the NFC-tag from the tag identification server if the data from the NFC-tag exists in the database. Access to a secure memory area on the portable computing device containing additional animal records may be granted if the software identifier matches the animal production facility identifier received from the tag identification server.

The secure memory area on the portable computing device may contain a complete set of animal records for the entire animal production facility which are associated with a plurality of NFC-tags. A complete set of animal records may be stored in secure areas in each of a plurality of portable computing devices which may be used by an animal production facility.

When animal records are updated by portable computing devices, the system and method may use social graphs to determine portable computing devices associated with the animal production facility and then send messages to each portable computing device asking if an update to the animal records in the secure area is desired.

According to one exemplary aspect of the method and system, an animal record may comprise a production facility identifier that is also printed on a surface of the NFC-tag. This animal production facility identifier can be customized/selected by the management of the animal production facility. Thus, each NFC-tag identifier may be associated with an animal production facility identifier which is customizable/selected by management of the animal production facility.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

FIG. 1B illustrates exemplary NFC-tag data which may be stored within each of the NFC-tags of the system illustrated in FIG. 1A.

FIG. 1C illustrates exemplary data which may be stored on a domain name service (DNS) server and this figure also illustrates a failure/redundancy plan for each NFC-tag identification server of the system illustrated in FIG. 1A.

FIG. 1D illustrates respective exemplary geographic locations for each NFC-tag identification server that are illustrated in the system of FIG. 1A according to one exemplary embodiment of the invention.

FIG. 1F illustrates how the electronic records supported by the system of FIG. 1A may be stored locally within the portable computing devices which run the animal management software application according to one exemplary embodiment of the invention.

FIG. 2A illustrates an exemplary screenshot of a portable computing device after it conducts a scan of an NFC-tag and when the portable computing device does not have the animal management software.

FIG. 2B illustrates an exemplary screenshot of the portable computing device when the Internet browser of the portable computing device accesses an application store within a jurisdiction that has been identified by the NFC-tag identification server according to one exemplary embodiment.

FIG. 2C illustrates an exemplary screenshot of a portable computing device after an NFC-tag has been scanned and animal management software on the portable computing device has been detected by the OS of the portable computing device.

FIG. 2D illustrates an exemplary screenshot of the portable computing device when the animal management software application has been opened and prompts the operator for the user credentials of the application software.

FIG. 2E illustrates an exemplary screenshot of the portable computing device once access to the animal management software application running on the portable computing device has been granted.

FIG. 2F illustrates an exemplary screenshot of the portable computing device once access to the animal management software application running on the portable computing device has been granted and after an NFC-tag has been scanned by the portable computing device.

FIG. 2J illustrates an exemplary second step of a three step process having a screenshot displayed on the portable computing device for adding a printed production identifier to an NFC tag.

FIG. 2K illustrates the completion of the exemplary second step of the three step process of FIG. 2J in which the printed production identifier is now displayed on the portable computing device in a screenshot.

FIG. 2L illustrates an exemplary third step of a three step process having a screenshot displayed on the portable computing device for adding the NFC tag with the newly assigned production identifier to a particular animal subgroup tracked at an animal production facility.

FIG. 2M illustrates an exemplary screenshot displayed on the portable computing device when a new animal group described in connection with FIG. 2L is created.

FIG. 2N illustrates an exemplary screenshot displayed on the portable computing device which comprises information that can be supplied for the animal attached to the newly added NFC tag which also has the animal production facility identifier.

FIG. 2O illustrates an exemplary screenshot displayed on the portable computing device which comprises additional information that can be supplied for the animal attached to the newly added NFC tag and which also has the animal production facility identifier.

FIG. 12B-1 illustrates one exemplary embodiment of a single encasement for an implantable or ingestible NFC and RFID tag combination which has a common chip but separate antennas according to principles of the present invention.

FIG. 12C-1 illustrates one exemplary embodiment of a single encasement 60 for implantable or ingestible NFC and RFID tags having a common chip and common antenna for both tag functions.

FIG. 12A-2 illustrates one exemplary embodiment of a single encasement for implantable or an ingestible NFC tag and RFID 50 with separate chips and separate antennas following the exemplary embodiment illustrated in FIG. 12A-1.

FIG. 12B-2 this figure illustrates one exemplary embodiment of a single encasement for an implantable or ingestible NFC tag and RFID tag with a common chip 4000 and separate antennas following the exemplary embodiment illustrated in FIG. 12B-1.

FIG. 12C-2(i) illustrates one exemplary embodiment of a single encasement for an implantable or ingestible NFC tag and RFID tag with a common chip and a single, common antenna for both tags following the exemplary embodiment illustrated in FIG. 12C-1.

FIG. 12C-2(ii) illustrates one exemplary embodiment of a single encasement for an implantable or ingestible NFC tag and RFID tag having a common chip and a single antenna for both tags following the exemplary embodiment illustrated in FIG. 12C-1.

DETAILED DESCRIPTION

The term "exemplary" is used herein to mean "serving as an example, instance, or illustration." Any aspect described herein as "exemplary" is not necessarily to be construed as preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," "engine", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer.

By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon.

The components may communicate by way of local and/or remote processes such as in accordance with a signal having one or more data packets (e.g., data from one component interacting with another component in a local system, distributed system, and/or across a network such as the Internet with other systems by way of the signal).

Figures 1, 12A:
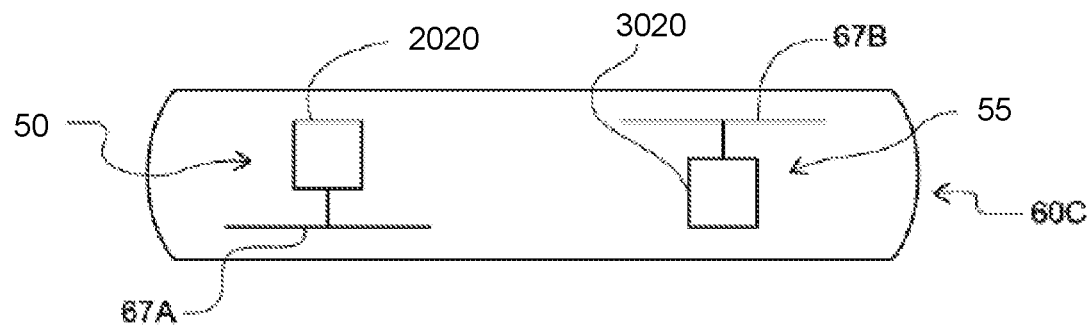
FIG. 12A-1 illustrates one exemplary embodiment of a single encasement for an implantable or ingestible NFC tag and RFID tag having separate chips and separate antennas according to principles of the present invention.

Referring now to the drawings, wherein the visuals are for purposes of illustrating certain exemplary embodiments of the present disclosure only, and not for purposes of limiting the same, FIG. 1 is functional block diagram of an exemplary system 101 for tracking a plurality of NFC-enabled animals 65 with a portable computing device 101 according to one exemplary embodiment of the invention. Specifically, the animals 65 may have a tag system 45 that attaches to the animal 65 via a mechanical coupling 60. The mechanical coupling 60 may take many forms/structures/embodiments and is described in further detail below in connection with FIGS. 4-8.

The animal 65 may comprise any type of animal. Exemplary animals include, but are not limited to, dogs, fox, cats, ferrets, raccoons, wildcats, calves, cows, piglets, sheep, pigs, hogs, boars, horses, oxen, zebras, camels, dromedaries, lamas, ostriches, deer, elks, moose, monkeys, chicken, hens, turkeys, geese, and various species of birds; tuna, dolphins, sharks, and various species of fish; lions, panthers, puma, etc. Production animals 65 as well as companion animals 65 may be well suited for system 101. Production animals 65 usually include, but are not limited to, calves, cows, piglets, sheep, pigs, hogs, horses, chickens, hens, turkeys, and geese. Companion animals 65 usually include, but are not limited to, dogs and cats.

The tag system 45 may comprise a radio-frequency (RF) identifier (RF-ID) tag 50 [that follows standards set for RF-ID tags] as well as a near-field communication (NFC) tag 55. Each tag 50, 55 may have its own antenna 67B, 67D. The tag antennas 67B, 67D may be coupled to other devices such as an RF-ID reader 70 and a portable computing device 100 via its own antenna 67A. The tag antennas 67B, 67D may be coupled to these other devices via communication links 103D, 103E. The communication links 103 illustrated in FIG. 1A may comprise either wired or wireless links. For communication links 103 that exist between antennas 67, such links are usually the wireless type.

The RF-ID tag 50 may be coupled/operably connected to the NFC-tag 55 as indicated by dashed line 27A. This dashed line 27A indicates that this coupling between the NFC-tag 55 and RF-ID tag 50 is optional. In some exemplary embodiments, each tag 50, 55 may operate/function independently of the other. But in other exemplary embodiments, each tag 50, 55 may share data and may communicate with the other tag 50, 55. This coupling/sharing of data between tags 50, 55 will be described in further detail below in connection with FIGS. 6-8.

Each tag 50, 55 may also be physically/mechanically separate from the other tag 50, 55 as denoted by dashed cut-line 27B. This cut-line 27B is illustrated with dashes to indicate that the physical separation among the two tags 50, 55 is optional. In some exemplary embodiments, the tags 50, 55 are coupled physically together. In other exemplary embodiments, the tags 50, 55 may be physically separate.

The RF-ID reader 70 that reads the RF-ID tag 50 may comprise off-the-shelf hardware and/or software. For example, the RF-ID reader 70 may comprise a hand-held wand type and/or it may be part of another device/machine such as a scale for weighing a production animal 65, like cattle. The RF-ID reader 70 may further comprise a radio-frequency (RF) transceiver 75 for communicating with another wireless device, such as the PCD 100. According to one exemplary embodiment, the RF transceiver 75 may comprise one that is suitable for an industry standard wireless communication, such as BLUETOOTH™ type/brand of wireless communications. Thus, the communication link 103C illustrated in FIG. 1A may comprise a wireless BLUETOOTH™ communication link between the RF transceiver 75 and the antenna 67A of the PCD 100. Other industry standard wireless communications, besides BLUETOOTH™ communications, are possible and are within the scope of this disclosure and are understood by one of ordinary skill in the art.

The PCD 100 may comprise a cellular telephone, a smartphone, a portable digital assistant (PDA), a portable game console, a navigation device, a tablet computer/PC, a fitness computer, and a wearable device (e.g., a sports watch, a fitness tracking device, etc.) or other battery-powered devices with a wireless connection or link. According to one exemplary and preferred embodiment, the portable computing device 100 may comprise a hand-held, smartphone that runs a high-level operating system (HLOS).

The HLOS may comprise the ANDROID™ brand operating system or the APPLE™ brand mobile phone operating system known as of this writing. The PCD 100 may also comprise a laptop or tablet PC as understood by one of ordinary skill in the art. One advantage of the system 101, according to one exemplary embodiment, is that the PCD 100 is a hand-held device (i.e. is easily carried with a single-hand) and can be carried by a person when he/she may be out outdoors tending to production animals 65 or inside a building like a barn. Buildings for production animals 65 [and even outdoors] may not have traditional furniture/set-up for supporting/holding larger non-portable devices, such as desktop computers or laptop computers, that are needed for tracking the production animals 65 having tags 50, 55.

The hand-held PCD 100 may execute/run an animal management software application 110 that is coupled to a local/internal animal records database(s) 115A. The animal management software application 110 may be coupled to the local animal records database(s) 115A by an internal communications link 107C. The animal management software application 110 may facilitate communications between the PCD 100 and the tag system 45 and the RF transceiver 75 of the RF-ID reader 70 using wireless communication links 103C, 103D. Further details about the data transferred using these communication links 103C, 103D will be described below in connection with the several flow charts.

The animal management software application 110 helps track the data stored and associated with the tag system 45 of each animal 65. Such tracking of data is very helpful in the production animal context when hundreds and sometimes thousands of animals 65 and their associated records are needed for efficient management of a production animal facility.

Exemplary records/data that are managed by the application 110 and which may be contained within the local animal records database 115A stored locally on the PCD 100 may include parameters such as, but not limited to, height, length, width, girth, weight, color, fertility status (i.e.—pregnant, not pregnant . . . etc.) and other physical characteristics of the animal, as well as treatments, such as vaccine data, drug treatment data, cleanings, health issues, feeding information etc. According to one exemplary and unique aspect of the system 101 is that the local animal records database 115A stored within a single PCD 100 may be one-hundred percent (100%) complete for an entire animal production facility.

That is, the local animal records database 115A stored locally on a hand-held single PCD 100 may contain all records for all animals which may be part of particular production facility, like a single farm/ranch. For example, suppose a farm has one-hundred animals 65 and there is a record for each animal 65. According to one exemplary embodiment, each local animal records database 115A stored on a hand-held PCD 100 would have all one-hundred records for the one-hundred animals 65 for that single farm.

As noted above, the local animal records database 115A may be stored within each PCD 100 if a plurality of portable computing devices 100 are being used for a single animal production facility, like a farm. This means, that each instance of the local animal records database 115A present on each hand-held PCD 100 would be the same and would be complete (contains all records for every animal 65 on the farm being monitored and which has a NFC-tag 55).

When an individual record for a single animal 65 is being updated on a first hand-held PCD 100, then this update to this record is then re-transmitted to the other, second hand-held portable computing devices 100 on the farm using the communications network 150 as will be described in more detail below. This means that one instance of the local animal records database 115A may stored remotely in a remote animal records database(s) 115B on a computer server 35 as will be described in more detail below.

In addition to communicating with the RF-ID reader 70 via the communications link 103C and the RF-ID tag 55 via communications link 103D, each hand-held PCD 100 may also communicate with other remote devices 100 via a wireless communications link 103B. The wireless communications link 103B may couple the PCD 100 to a communications network 150.

The communications network 150 may comprise a wide area network ("WAN"), the plain-old-telephone-system ("POTS), a local area network ("LAN"), the Internet, or any combination of these and other types of networks. Through the network 150, the portable communication device 100 may communicate with an animal management software developer customer resource management (CRM) server 10; an animal management software application production server 15; an animal management software applications store server 20; a domain name server (DNS) 22; one or more NFC-tag identification servers 25A, 25B, 25C; a communication server 35; and animal management software server 40.

Each of the computer servers 10, 15, 20, 22, 25, 35, 40 described herein as well each hand-held PCD 100 may support various submethods/routines which are part of a larger method for tracking a plurality of NFC-enabled animals 65. Each of the servers 10, 15, 20, 22, 25, 35, 40 may have portions and/or the entire set of elements illustrated in the exemplary computer server diagram of FIG. 10, described in further detail below.

In a particular aspect, one or more of the method steps described herein may be implemented by executable instructions and parameters, stored in the memory of the PCD 100 and the servers 10, 15, 20, 22, 25, 35, 40 that may form software embodiments of the system 101. These instructions that form the tracking system 101 may be executed by the CPUs 802 [FIG. 9], 121 [FIG. 10] or any other processor. Further, the processors 802, 121, the memory 815, 122, the instructions stored therein, or a combination thereof may serve as a means for performing one or more of the method steps described herein.

Referring back to FIG. 1A, the animal management software developer customer resource management [hereafter, "CRM server"] server 10 may manage and store records of the customers who have purchased licenses for and who have downloaded the animal management software application 110 for their portable computing devices 100. The CRM server 10 may provide account management services where a user, such as a legal entity, like a company that runs a production animal facility, such as a farm, may monitor and add/delete users/employees who download the animal management software application 110 to their respective portable computing devices 100 (i.e. phones 100). The CRM server 10 may also provide billing/accounting services for managing the software licensing fees. The CRM server 10 may also manage user information such as, but not limited to, user identity information like name of company, company address, company phone numbers, company e-mail addresses, fax numbers etc.

Figure 1A:
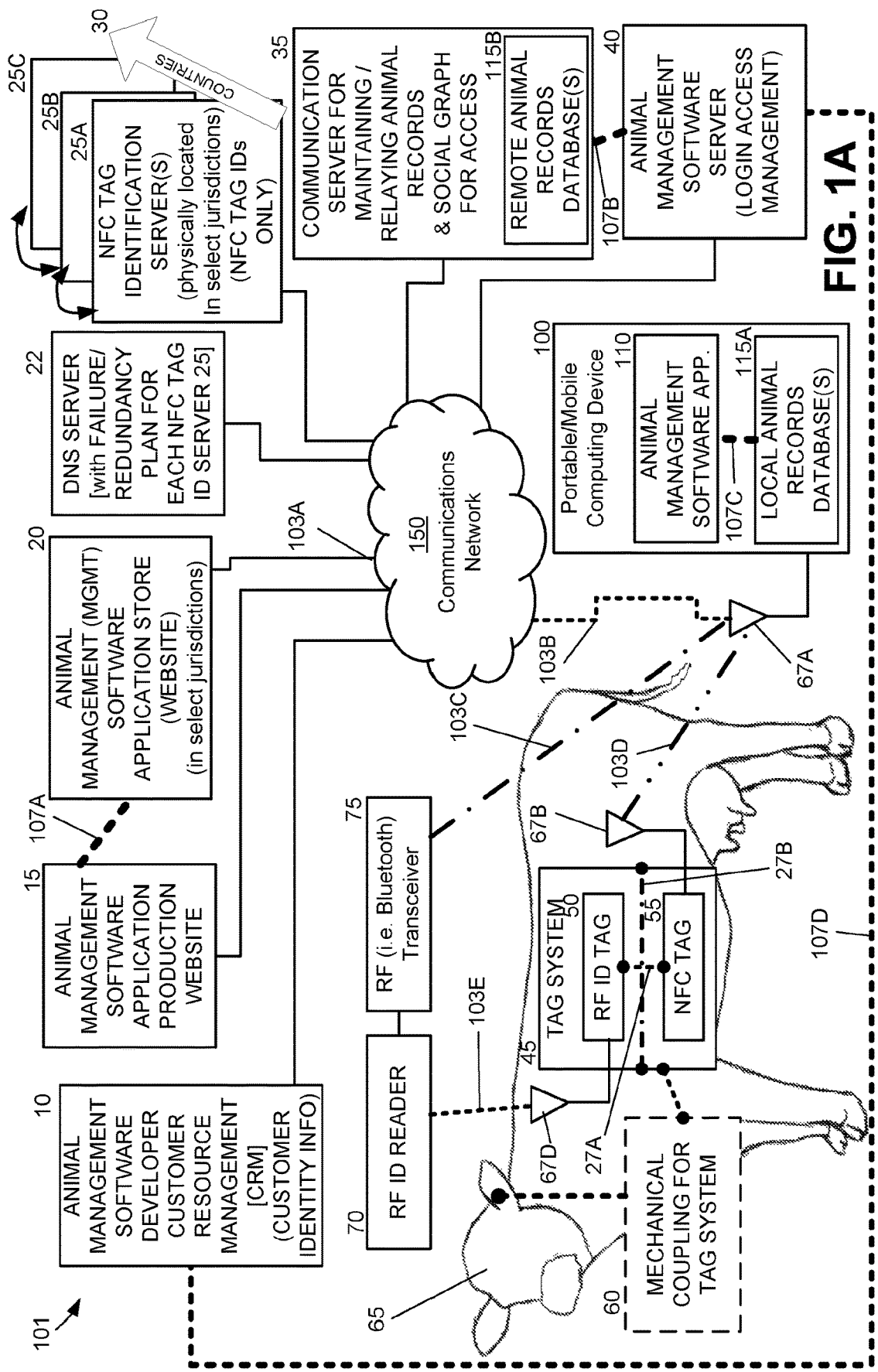
FIG. 1A illustrates a system for tracking a plurality of NFC-enabled animals with a portable computing device according to one exemplary embodiment of the invention.

The CRM server 10 may be in communication with the animal management software server 40 as indicated by communication link 107D, which may be a wired or wireless link, supported by the communications network 150. While communication link 107D is illustrated in FIG. 1A as a direct link between CRM server 10 and animal management software server 40, this link 107D may be provided/established by the communications network 150. The animal management software server 40 may provide for login/credentials management for the animal management software application 110 that runs on each PCD 100. For example, the animal management software server 40 may communicate with the animal management software application 110 to generate the login-screen illustrated in FIG. 2D (described in further detail below).

Referring back to FIG. 1A, the animal management software application production website/server [hereafter, "production server"] 15 may provide for roll-outs/updates to the animal management software application 110 which may be "sold"/downloaded from an animal management software application store/website 20. The production server 15 may allow computer programmers to generate new versions and/or updates to the downloadable animal management software application 110 that is typically run/executed on a hand-held PCD 100, such as a mobile phone 100.

The production server 15 may communicate with the animal management software application store/website [hereafter, "on-line application store"] 20 as indicated by communications link 107A. This communications link 107A may be established/supported by the communications network 150. The production server 15 may send new versions/updates for the animal management software application 110 that is sold and ready for download from the on-line application store 20 to a PCD 100.

According to one exemplary embodiment, the animal management software application 110 may be designed such that it is unique for particular jurisdictions in which the animal software application 110 is used. For example, a first version of the animal software application 110 may have unique features/functions that are particular to a first jurisdiction, such as the country of Canada. A second version of the animal software application 110 may have unique features/functions that are particular to a second jurisdiction, such as the country of the United States [see FIG. 1D for a map and exemplary jurisdictions described in more detail below].

This means an on-line application store 20 may be physically located in each jurisdiction and/or it may be designed to service/support animal management software applications 110 based on the location information found within the software application 110 and/or each NFC-tag 55 on an animal 65 within a jurisdiction. Further details about the jurisdictional nature of the system 101 will be described below.

Referring again to FIG. 1A, a domain name service (DNS) server 22 is coupled to the communications network 150 and may communicate with the PCD 100. The DNS server 22 has a universal resource locater (URL) assigned to it and this URL may be stored on each NFC-tag 55.

This URL may also contain jurisdiction information such as an abbreviation of the jurisdiction associated with the NFC-tag 55 (i.e. "US" for United States, "CA" for Canada, etc.). When an NFC-tag 55 is scanned by a hand-held PCD 100 which does not have any animal management software 110 installed (i.e. not running or not present), the HLOS of the PCD 100 will receive the URL from the NFC-tag 55 and then open a web browser of the HLOS for the portable computing device 100 using the URL.

However, if a hand-held PCD 100 has an existing account and is running/executing the animal management software 110, the animal management software 110 may recognize an NFC-tag 55 based on a tag identifier and the software 110 may direct the communications link for the PCD 100 to a communication server 35 associated with the account and within an appropriate jurisdiction. But if the hand-held PCD 100 does not have the animal management software 110 or the portable computing device has the animal management software 110 which does not recognize a scanned NFC-tag 55, the animal management software 110 may indicate the NFC-tag 55 is not recognized for the account and it may instruct the operator to contact the CRM server 10 to see if more information may be available from the CRM server 10 and/or the operators of that server 10.

In addition to storing Tag Identification servers 25 that are associated with jurisdictions assigned to NFC-tags 55, the DNS server 22 also stores the failure/redundancy plan for each Tag Identification server 25. This failure/redundancy plan for the jurisdiction-based Tag Identification servers 25 is described in further detail below in connection with FIGS. 1C-1D. The failure/redundancy plan helps maintain continuity of the system 101 should a particular Tag Identification Sever 25 be "off-line"/not available for service.

After a hand-held PCD 100 which does not have the animal management software 110 or software 110 does not recognize the tag identifier for a particular NFC-tag 55, the URL of a scanned NFC-tag 25 may be sent by the portable computing device to the DNS server 22 and based on the jurisdiction information in the URL, the DNS server 22 will relay an internet protocol (IP) address for an NFC-tag identification server 25 that is assigned to the jurisdiction to the PCD 100. The internet browser of the PCD 100 will then relay the NFC scanned data from NFC-tag 55 to the NFC-tag identification server 25 based on the IP address received from the DNS server 22.

The NFC-tag identification servers 25A-25C are coupled to the communications network 150. Each NFC-tag identification server 25 may store NFC-tag identifiers present on each NFC-tag 55 of an animal 65. As discussed above, each NFC-tag identification server 25 is physically located within a jurisdiction (i.e. a country—as indicated by arrow 30 which denotes multiple countries/jurisdictions may exist) and is associated with NFC-tags 55 that are also assigned to the jurisdiction (i.e. usually a country).

When the NFC-tag Identification Server 25 receives NFC-tag data from a PCD 100 which does not have the animal management software 110, the NFC-tag identification server 25 may generate a welcome page and direct the operator of the PCD 100 to an appropriate on-line store server 20. An appropriate on-line store server 20 may sell the animal management software 110 [available for downloading] that corresponds with the jurisdiction assigned to the scanned NFC-tag 55. Such a welcome page is illustrated in FIG. 2B described in further detail below.

Once a hand-held PCD 100 has downloaded animal management software 110 appropriate for its jurisdiction (based on the jurisdiction assigned to each NFC-tag 55 being scanned by the portable computing device), then the animal management software may establish a secure communication link 103B over the communications network 150 to the animal management software server 40 and the communication server 35.

The animal management software server 40 is coupled to the communications network 150 via a communications link. The animal management software server 40 is illustrated with a direct communications link 107B to the communication server 35. This direct communications link 107B may be virtual and may be established by the communications network 150. The communications link 107B is depicted to denote that the animal management software server 35 controls access to the communications server 35. The animal management software server 35 may communicate directly with each instance of animal management software 110 running on a portable computing device 100, such as a mobile phone 100.

The animal management software server 35 may facilitate a secure communications channel over the communications network 150 between the animal management software application 110 running on the PCD 100 and the communication server 35 which may maintain a remote animal record(s) database 115B. The remote animal record(s) database 115B corresponds with the local animal records database 115A present on each PCD 100, like a mobile phone. Further details about the remote animal record(s) database will be described below in connection with FIGS. 1E-1F.

The secure communications channel between the PCD 100 and communication server 35 facilitated/established by the animal management software server 40 may be encrypted according to off-the-shelf and/or conventional cryptographic standards known as of this writing. The animal management software server 40 may generate the log-in screen of FIG. 2D that is displayed on a PCD 100 when a PCD desires access to its local animal records database 115A present on the PCD 100. The log-in screen of FIG. 2D is described below in further detail.

Once the animal management software server 40 grants a PCD 100 access to its local animals records database 115A present on the PCD 100, the animal management software server 40 also grants access to the communication server 35 and the remote animal record(s) database 115B. According to one exemplary aspect of the system 101, the remote animal record(s) database 115B at the communication server 35 helps a plurality of PCDs 100 maintain complete records of animals 65 when a plurality of PCDs 100 are deployed for managing an animal production facility, like a farm. In other words, the communication server 35 and its remote animal record(s) database 115 helps each PCD 100 to have a local animal record(s) database 115B that is identical to another PCD 100 when multiple PCDs 100 are used to manage production animals 65 at an animal production facility, like a farm. Further details on how the communication server 35 and its remote animal record(s) database help manage the animal data managed across multiple PCDs 100 is described in further detail below in connection with FIGS. 1E-1F.

Referring now to FIG. 1B, this figure illustrates exemplary NFC-tag data 59 which may be stored within each of the NFC-tags 55 of the system 100 illustrated in FIG. 1A. Exemplary NFC-tag data 59 may include, but is not limited to, (i) a Universal Resource Locater (URL); (ii) a unique tag identifier; (iii) an NFC scan count; and (iv) a sub-domain-Salt Key. Additional or fewer data elements may be stored on each NFC-tag 55 as understood by one of ordinary skill in the art.

The URL element of the NFC-tag data 59 may comprise one, as described above, which is recognized and translated by the DNS server 22. The URL may take the format of "jurisdiction.tag.vet" in which the last three characters of the domain direct an internet browser to the DNS server 22. The DNS server then reviews the "jurisdiction" sub-domain in order to provide an IP address based on the "jurisdiction" data. The jurisdiction data usually comprises a country code, such as "US" for United States, "CA" for Canada, etc.

The unique tag identifier may comprise an alpha-numeric string of characters that are assigned to a particular NFC-tag 55 during its manufacture/production. The unique tag identifier may be stored at each Tag Identification Server 25 as described above so that a PCD 100 is directed to an appropriate, jurisdiction-based on-line store 20 so that jurisdiction-based animal management software 110 may be downloaded that matches the jurisdiction of the NFC-tag 55.

The tag data 59 may further comprise a scan count that is updated and stored on the NFC-tag 55. Each NFC-tag 55 may comprise a memory module/element 440 which stores the NFC-tag data 59 as illustrated in FIG. 8B described in further detail below. The memory module 440 may be updated to track changes such as changes in the scan count. The scan count may track how many times the NFC-tag 55 is scanned by a reader such as by a reader present on a PCD 100. This scan count may be used as a security parameter as understood by one of ordinary skill in the art.

The NFC-tag data 59 may further comprise a salt key. This salt key may prevent counterfeit/unauthorized duplicates and/or production of NFC-tags 55 as understood by one of ordinary skill in the art. As noted previously, additional or less NFC-tag data 59 may be stored on each NFC-tag 55 as apparent to one of ordinary skill in the art.

Referring now to FIG. 1C, this figure illustrates exemplary data which may be stored on a domain name service (DNS) server 22 in the system 101 of FIG. 1A. This figure also illustrates a failure/redundancy plan 27 for each NFC-tag identification server 25 of the system 101 illustrated in FIG. 1A. As noted previously, the server 22 directs an internet browser of a PCD 100 to the appropriate jurisdictional-based tag identification server 25 in response to the URL data received from a particular NFC-tag 55. Each tag identification server 25 may provide a web page and a link [such as illustrated in FIGS. 2A-2B described in further detail below].

If a NFC-tag identification server 25 is down/offline for a first jurisdiction, the DNS server 22 may receive this status and then re-direct the PCD 100 to a second jurisdiction according to the failure/redundancy plan 27. For example, the first redundancy plan 27A is for a first jurisdiction which is the country of Canada. See also FIG. 1D which illustrates the exemplary embodiments of jurisdictions in the form of countries.

According to this exemplary embodiment for a first redundancy plan 27A, the first line lists the IP address for a first Tag identification server 25A located in the first jurisdiction, which is Canada for this example. This first line of the plan 27A (line i) is what is relayed to a PCD 100 when the DNS server 22 re-directs the internet browser of the PCD 100 which just scanned an NFC-tag 55 that contains the URL data described above. If the DNS server 22 receives a status that one or more first servers 25A in the first jurisdiction (i.e. such as Canada) are down/off-line, then the DNS server 22 goes to the next line in the plan 27A (line ii of FIG. 1C].

In the exemplary embodiment for the first plan 27A, this second line ii of the plan instructs the DNS server 22 to provide the IP address of the server 25B which is located in the second jurisdiction (which is the United States) for this example. If the DNS server 22 detects and/or is informed that the second Tag identification server 25B in the second jurisdiction (see also FIG. 1D) is also down/off-line, then the DNS server 22 goes to the next line in the plan 27A which is line iii in this plan 27A. Line iii of plan 27A instructs the DNS server 22 to provide the IP address of a Tag identification server 25C located in the third jurisdiction (which is the country of Great Britain in this example).

Each Tag identification server failure/redundancy plan 27 as illustrated in FIGS. 1C-1D may be setup/created by the owner of an account for a particular animal production facility. Alternatively, each plan 27 may be controlled/set by governments of each jurisdiction. Usually, since regulations/laws may vary from one jurisdiction to the next, the failure/redundancy plan 27 may be created such that back-up Tag identification servers 25 listed in the plan 27 have regulations/laws similar to the primary Tag identification server 25.

Referring now to FIG. 1D, this figure illustrates respective exemplary geographic locations for each NFC-tag identification server 25 that are illustrated in the system 101 of FIG. 1A according to one exemplary embodiment of the invention. Each tag identification server 25 may have its own back-up/redundancy plan 27 which is stored at the DNS server 22 (as illustrated in FIG. 1C) and/or is accessible by the DNS server 22. Each plan lists IP addresses of other servers 25 which may be provided as a back-up/redundancy in case of failure/problems for a particular Tag identification server 22. Further details of each plan have been described above in connection with FIG. 1C.

While only the jurisdictions of Canada, the United States, and some European countries have been illustrated in FIG. 1D, other countries/geographical locations are possible and are included within the scope of this disclosure. The system 101 is also not limited to country-based jurisdictions. Sub/smaller jurisdictions are possible, such as provinces within a country and/or states (such as within the United States). For example, single states within a country like the United States may be used as jurisdictions. Groups of states/countries are also possible in order to form special jurisdictions. A jurisdiction may be formed from any combination of geographical regions as understood by one of ordinary skill in the art.

Each jurisdiction-based tag identification server 25 may perform replication of tag data as well as detailed animal record data with another identification server 25 for data redundancy. Such replication may be performed asynchronously as understood by one of ordinary skill the art. As noted above, servers 25 are typically physically present within certain geographic territories. Any replication of data among the servers 25 may occur locally meaning only servers 25 in the same geography will usually support the redundant data. Replication among servers 25 in different jurisdictions may also occur and/or follow the DNS server failure/redundancy plan as described above in connection with FIGS. 1C-1D.

Figure 1E:
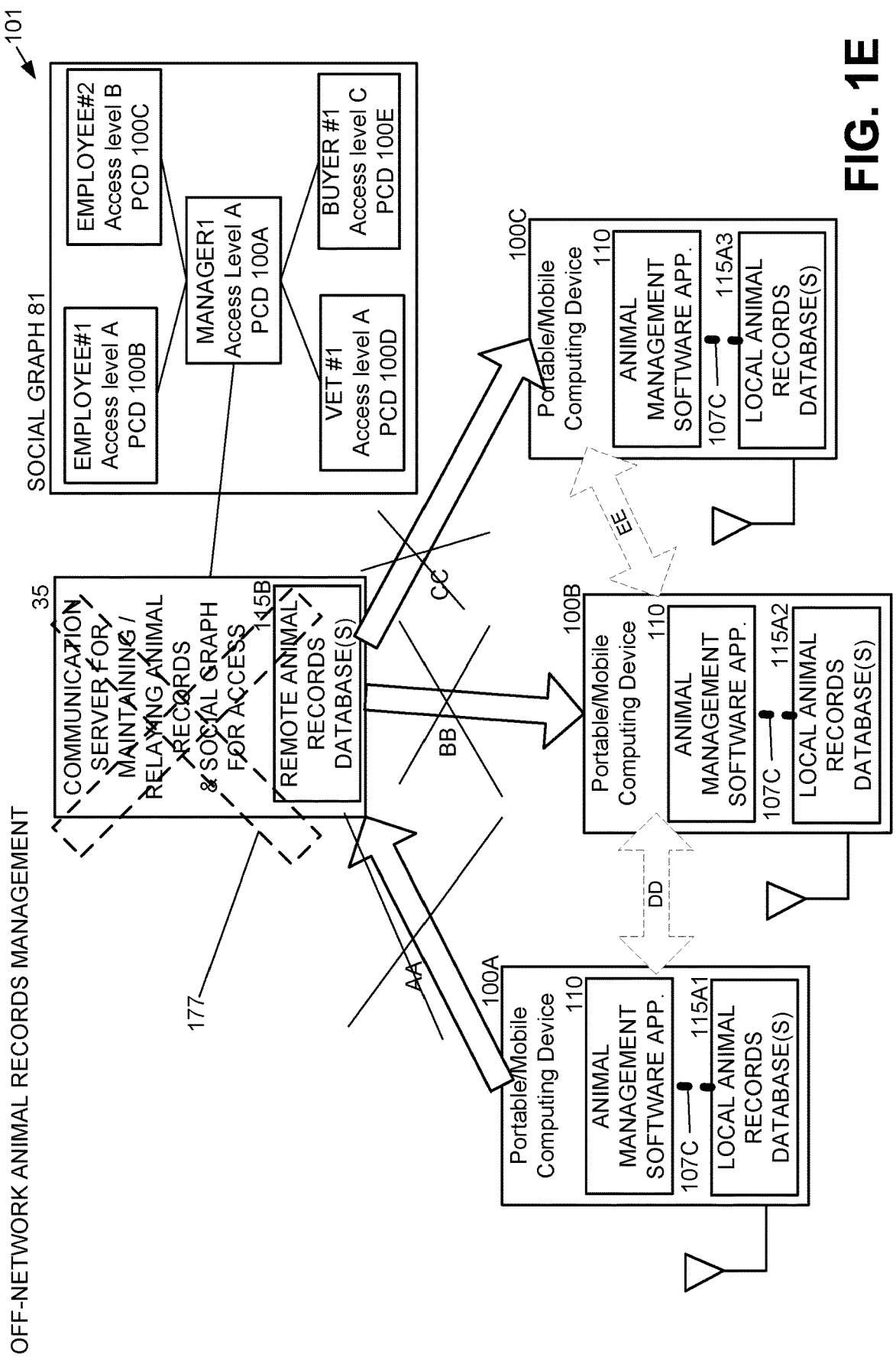
FIG. 1E illustrates how the electronic records maintained by the system of FIG. 1A may be accessed off-line in addition to how social graphs may be created to enable access and sharing of electronic records within the system.

Referring now to FIG. 1E, this figure illustrates how the electronic records maintained by the system 101 of FIG. 1A may be accessed off-line in addition to how social graphs 81 may be created to enable access and sharing of electronic records within the system 101. As noted previously, the local animal records database(s) 115 maintained on each PCD 100 associated with a single animal production facility (i.e. a farm/ranch) may be identical, according to one exemplary embodiment of the system 101.

So, as an example, if there are one-hundred production animals 65 at a facility, there would usually be at least one-hundred records stored within each local animal records database(s) 115 stored on each PCD 100. There would be at least one record for each animal 65. Each record may have a plurality of fields as described above, such as, but not limited to, fields like height, length, width, girth, weight, color, fertility status (i.e.—pregnant, not pregnant . . . etc.) and other physical characteristics of the animal, as well as treatments, such as vaccine data, drug treatment data, cleanings, health issues, feeding information etc.

This means that a first local animal records database 115A1 stored on a first hand-held PCD 100A would be identical to a second local animal records database 115A2 stored on a second hand-held PCD 100B, as well as the local animal records database 115A3 stored on a third hand-held PCD 100C. Each of these local databases 115A1-A3 may be kept/maintained as identical by the communication server 35 which may keep one or more instances of the animal records maintained within a remote animal record database 115B.

As a single record for an animal 65 is updated by a particular PCD 100, the communication server 35 may track which individual animal records are stored on each PCD 100. For example, if a first PCD 100A updates a first record for a first animal that is stored in the local database 115A1, the first PCD 100A via the animal management software 110 may send that updated first record over the communications network 150 (see FIG. 1A) to the communications server 35 as denoted by the communications link arrow AA.

The communications server 35 may store the updated first record received from the first PCD 100A in its remote animal records database 115B. Then, at later time windows, the communications server 35 can determine if the second PCD 100B and the third PCD 100C need this updated first record for their respective local animal records databases 115A2, 115A3. The communications server 35 can determine when the second PCD 100B and the third PCD 100C need the updated first record when they establish a communications link with the communications server 35.

The communications server 35 may track the status of the records of the local animal record databases 115A1-115A3 in various ways. According to one exemplary embodiment, the communications server 35 may flag/highlight those animal records which have been updated by a first PCD 100A. Then when second and third portable computing devices 100B, 100C establish a communications link with the server 35, the server 35 may request each PCD 100B, 100C to determine if it has the updated animal records that are present in the remote animal records database 115B maintained at the server 35.

If the server 35 determines that a local animal records database 115A does not have an updated record, then it may transmit that updated record from the remote animal record database 115B over the communications network 150 to each respective PCD 100 which may need the updated record as indicated by communication links arrows BB and CC in FIG. 1E.

When a PCD 100 first comes on-line/is activated or if the PCD 100 ever loses data, then the local animal records database 115A may be empty. In that situation, the sever 35 may download the entire set of records from the remote animal record database 115B over the communications network 150 to each respective PCD 100 which may need the complete set of records as indicated by communication links arrows BB and CC in FIG. 1E.

When a PCD 100 establishes a communication link with the communication server 35, the communication server 35 determines a level of access to the remote records database 115B available to a respective PCD 100 by reviewing security parameters which may be part of a social graph 81. According to an exemplary embodiment of the social graph 81 illustrated in FIG. 1E maintained by the communications server 35, three levels of access are provided: a first access level A; a second access level B; and a third access level C.

The first access Level A may permit the updating/editing of animal records as well as access to all animal records in the remote animal records database 115B. The first access Level A may provide the highest/most complete access to the remote animal records database 115B. This level may be assigned to manager(s) (MANAGER 1) and/or employees (EMPLOYEE #1) as well as veterinarian(s) (VET #1) associated with a particular animal production facility (i.e. a farm).

The second access Level B may provide for an intermediate/less robust access relative to the first access Level in connection with the remote animal records database 115B. This level may be assigned to less important/newer/lower-level employees (EMPLOYEE #2) associated with a particular animal production facility (i.e. a farm). According to this access Level B, records in the remote animal record database 115B as well those as stored in the local animal records database 115A on a portable computing device 100 may be viewed but not changed/edited. The entire database of animal records may be viewed but cannot be edited with this second access Level B. According to this second access Level B, the entire database 115 of animal records may be stored in the local animal record database 115B on a PCD 100.

The third access Level C may provide for lowest access relative to the first access Level in connection with the remote animal database 115B. This level may be assigned to non-employees/potential animal buyers (Buyer #1) associated with a particular animal production facility (i.e. a farm). According this third access Level C, only select records in the remote animal record database 115B as well those as stored in the local animal records database 115A on a PCD 100 may be viewed.

This means that usually the manager having the first access Level A will select a certain number of animal records, usually less than the entire database, that can only be viewed by a PCD 100 having the third access Level C. According to this third access Level C, the entire database 115 of animal records may not be stored in the local animal record database 115B on a portable computing device 100. Instead, a PCD 100 having the third access Level C may only be able to access the remote animal records database 115B of server 35—and cannot download the records permanently to the PCD 100.

While three levels of access are described above, one of ordinary skill in the art recognizes that fewer levels or additional levels of access are possible and are included within the scope of this disclosure. Further, variations in the types of access for each level are possible and are included within the scope of this disclosure as understood by one of ordinary skill in the art.

According to one exemplary benefit of system 101 which has the communication server 35 having the remote animal records database 115B and the local animal records database 115A stored on each PCD 100, the complete database 115 of animal records is usually stored on each of these devices 35, 100. This means that if one of the devices 35, 100 fails, then it is very easy to replicate the database 115 from one device 35, 100 to another.

In FIG. 1E, a dashed "X" 177 has been illustrated to denote that the communication server 35 could suffer some form of failure/break-down or this dashed "X" may denote that the communications network 150 is down and that none of the portable computing devices 100 may be able to establish a communication link with the server 35. Since each PCD 100 having the appropriate access level may have a complete set of animal records in its local database 115A, then each PCD 100 may function for some time without the need for communicating with server 35.

When the communication server 35 goes off-line as indicated by the dashed "X" 177, each of the portable computing devices 100 may rely on device-to-device communications, indicated by arrows DD and EE, such as point-to-point (P2P) Bluetooth communications or a WiFi direct synchronous mode protocols as understood by one of ordinary skill in the art. That is, each of the portable computing devices 100 may communicate with one another directly the communications server 35 is offline. Each of the portable computing devices 100 may exchange its respective local animal records with another portable computing device 100 when the communications server 35 is off-line.

In a scenario where the remote animal records database 115B may have been damaged/destroyed/erased, but then put back on-line, the system 101 allows for the rapid replication of animal records. As noted above, each PCD 100 (which may have the first or second access levels A or B described above) may have complete set of animal records in its respective local animal records database 115A which can be uploaded/communicated to the communication server 35. The communication server 35 can re-populate/re-install its entire remote animal records database 115B by using any one of the records that may be supplied from a local animal records database 115 supplied from a PCD 100 across the communications network 150.

Referring now to FIG. 1F, this figure illustrates how the electronic records supported by the system 101 of FIG. 1A may be stored locally within the portable computing devices 100 which run the animal management software application 110 according to one exemplary embodiment of the invention. FIG. 1F is similar to FIG. 1E, therefore, only the differences between these two exemplary embodiments will be described below.

According to this exemplary embodiment, compared to FIG. 1E, instead of the server 35 having some form of failure as indicated by the dashed "X" 170, a second PCD 100B may suffer some form of failure and it may lose the records of its local animal record database 115A. Like the scenario described above in connection with FIG. 1E, the second PCD 100B may restore its local database 115A2 from animal records supplied from any one of the local databases 115A1 and 115A3 of the first and third portable computing devices 100A, 110C as well as the remote animal records database 115B stored at the server 35.

Two arrows with roman numeral (i) have been provided to illustrate how records from local animal records databases 115A1, 115A3 could be uploaded over the communications network 150 to the communications server 35. As indicated by the arrow denoted with roman numeral (ii), the communication server 35 may relay the animal records it receives from the portable computing devices 100A, 100C over the communications network 150 to the second PCD 100B in order to restore the animal records in its local animal records database 115A2.

Alternatively, or in conjunction with communication server 35, the portable computing device 100A and the portable computing device 100C may communicate directly with one another, as indicated by arrow (iv), instead of/or in addition to their respective communication links to the communication server 35 indicated by the two arrows labeled (i). Each of the portable computing devices 100 may rely on device-to-device communications such as point-to-point (P2P) Bluetooth communications or WiFi direct synchronous mode protocols as understood by one of ordinary skill in the art, as noted above in FIG. 1E. The device-to-device communications may allow for the exchange of local animal records among portable computing devices 100.

Referring now to FIG. 2A, this figure illustrates an exemplary screenshot 202A of a PCD 100 after it conducts a scan of an NFC-tag 55 and when the PCD 100 does not have the animal management software 110 installed in its memory. As described above in connection with FIG. 1A, if a PCD 100 scans an NFC-tag 55 without having the animal management software 110, then the high-level operating system (HLOS) of the PCD 100 will receive the NFC-tag data 59 of FIG. 1B, and particularly a URL.

Based on that URL, the HLOS of the PCD 100 will use its internet browser to access the DNS server 22 using the URL. The DNS server 22 will then relay to the PCD 100 over the communications network 150 the IP address of the Tag identification server 25 that is associated with the sub-domain code of the URL (i.e. the country code contained within the URL).

The internet browser of the PCD 100 will then open a web page found on the Tag identification server 25 (illustrated in FIG. 2B described below). The Tag identification server 25 may display a message such as message 204 of FIG. 2A which has a hypertext link associated with the phrase, "APP STORE#1" which may be bolded and underlined to denote it as a hypertext link.

Referring now to FIG. 2B, this figure illustrates an exemplary screenshot 202B of the PCD 100 when the Internet browser of the PCD 100 accesses an application store 20 within a jurisdiction that has been identified by the NFC-tag identification server 25 according to one exemplary embodiment. Basically, this screen shot 202B is generated by the animal management software application store server 20 after the hypertext link produced in message 204 by the tag identification server 25 of FIG. 2A has been selected.

Screen shot 202B may comprise a message 206 which explains that a NFC-tag 55 supported by system 101 has been scanned by PCD 100. However, to access the data found on the tag 55 and any records in databases 115 associated with the tag 55 may only be made when the PCD 100 has the animal management software 110.

As noted previously, the appropriate on-line server/store 20 is referenced/supplied by the tag identification server 25 after an NFC-tag 55 is scanned by a device 100 which does not have the animal management software 110. Since each NFC-tag 55 may be managed according to rules, regulations, and/or laws unique to a jurisdiction, the Tag identification server 25 supplies a jurisdiction-dependent on-line store 20 which will supply animal management software 110 which may be unique for each jurisdiction. The correct Tag identification server 25 is located by the DNS server 22 according to the URL data stored within each NFC-tag 55 and received by a PCD 100.

Screenshot 202B may further comprise a hypertext link 208 which will allow the PCD 100 to download the animal management software application 110. Once the hypertext link 208 is activated, the PCD 100 may be prompted to download the animal management software application 110 to its memory and to execute/run the program.

FIG. 2C illustrates an exemplary screenshot 202C of a portable computing device 100 after an NFC-tag 55 has been scanned and animal management software 110 on the portable computing device 100 has been detected by the HLOS of the PCD 100. The screenshot 202C may comprise a message 210 that indicates that the scan of the NFC-tag 55 was valid and that the animal management software 110 has received the tag data and verifying if the PCD 100 has an authorized account which will allow the PCD 100 to access the local animal records database 115A which may contain additional records associated with the tag data 59, such as the unique tag identifier.

Referring now to FIG. 2D, this figure illustrates an exemplary screenshot 202E of the portable computing device 100 when the animal management software application 110 has been opened and prompts the operator for the user credentials of the application software 110. According to one exemplary embodiment of the system 101, when a manager/lead representative for an account establishes multiple users for the account so that a plurality of PCDs 100 may access the single account, then the animal management software CRM server 10 may provide an alpha-numeric code 212. This alpha-numeric code 212 may comprise numbers and/or letters and may have any length. The code 212 may authenticate each instance of the animal management software 110 with the communication server 35 to gain access to both the remote animal records database 115B maintained by the server 35 and the local animal records database 115A maintained on the PCD 100. Usually, the CRM server 10 provides one code 212 per user/PCD 100.

While the code 212 may be used to authenticate each instance of an animal management software 101 on a PCD 100, other authentications methods exist and are within the scope of this disclosure. Other authentication methods include, but are not limited to, public/private key encryption techniques including digital certificates, authenticating by SMS via a mobile phone number, authentication via e-mail, and authentication by a live phone call using a voice recognition system.

Referring now to FIG. 2E, this figure illustrates an exemplary screenshot 202E of the portable computing device 101 once access to the animal management software application 110 running on the portable computing device has been granted. The screenshot 202E may comprise a welcome screen and it may list commands 216 that may be issued by the operator of the PCD 100.

Referring now to FIG. 2F, this figure illustrates an exemplary screenshot 202F of the portable computing device 100 once access to the animal management software application 110 running on the portable computing device (PCD) 100 has been granted and after an NFC-tag 55 has been scanned by the PCD 100. According to this exemplary embodiment, the screenshot 202F displays certain data from the scan. Such data may include the unique NFC-tag identifier 222, which in this example, is the number 9781. Usually, the NFC tag ID 22 comprises a fourteen character Hexadecimal number as understood by one of ordinary skill in the art. An example of such a hexadecimal includes, but is not limited to, 04:EE:E5:72:29:49:80.

As noted previously, each NFC-tag 55 may be assigned a unique tag identifier 222 when the tag 55 is manufactured. The unique tag identifier 222 may comprise an alpha-numeric string of characters. The animal management software 110 may associate other records with this unique tag identifier 222, such as an animal production unique identifier 223 in this example (hereafter, "production identifier").

The production identifier 223 may also comprise an alpha-numeric string of characters. However, this production identifier 223, which has the value of 1234 in this example of FIG. 2F, may be created by an employee or manager of the animal production facility—such as a farm. Usually, the production identifier 223 can be entered into the animal management software 110 in addition to human-readable version that can be hand-written or machine-printed on each NFC-tag 55.

Figure 2I:
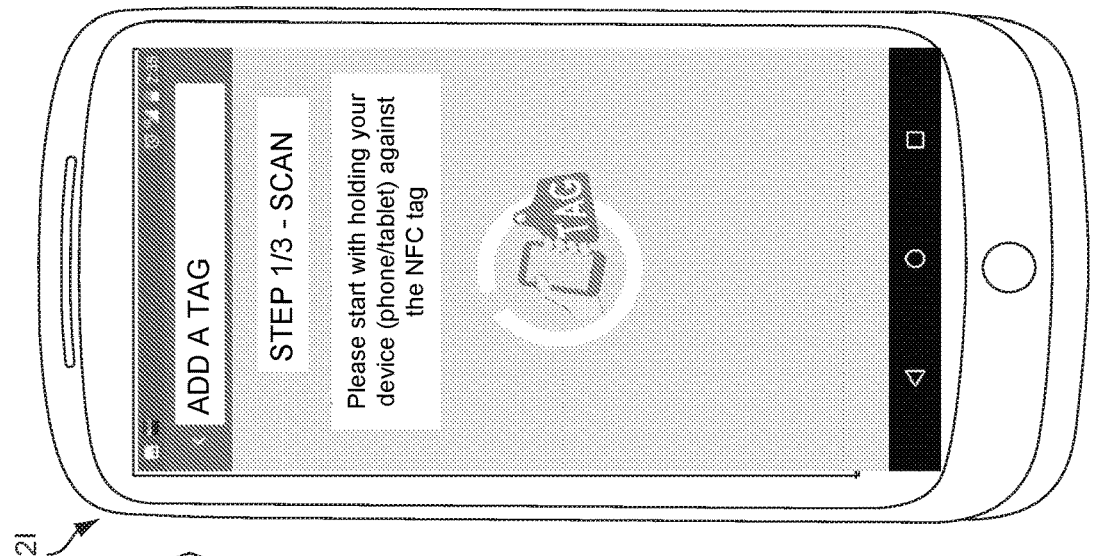
FIG. 2I illustrates an exemplary first step of a three-step process having a screenshot displayed on the portable computing device for adding a printed production identifier to an outer surface of an ear tag which are illustrated in FIGS. 6 and 7.
Figure 2H:
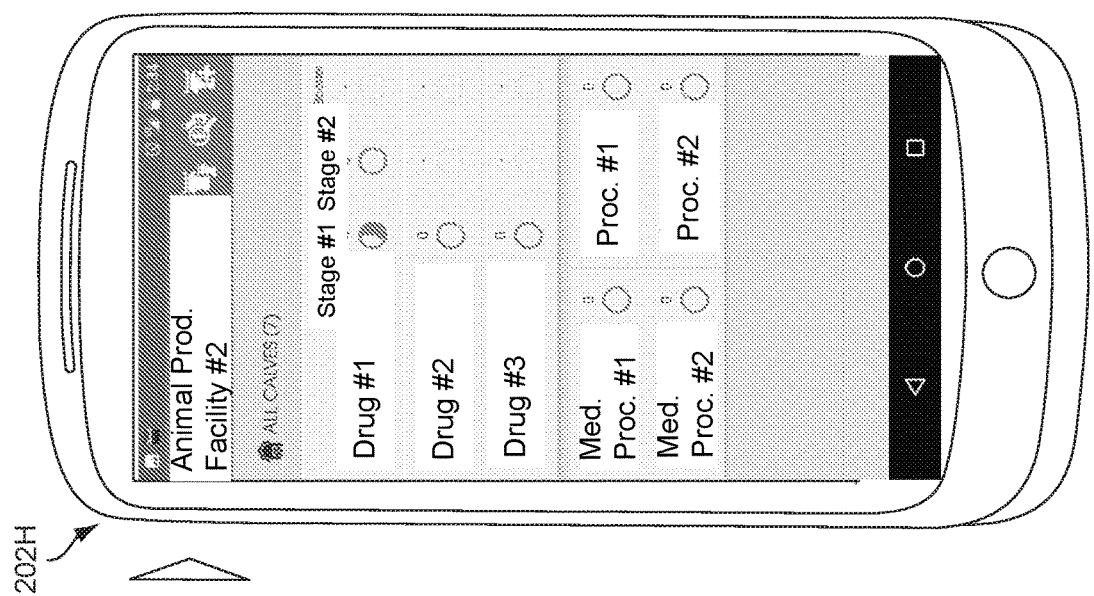
FIG. 2H illustrates an exemplary dash-board screenshot of the portable computing device running the animal management software.
Figure 2G:
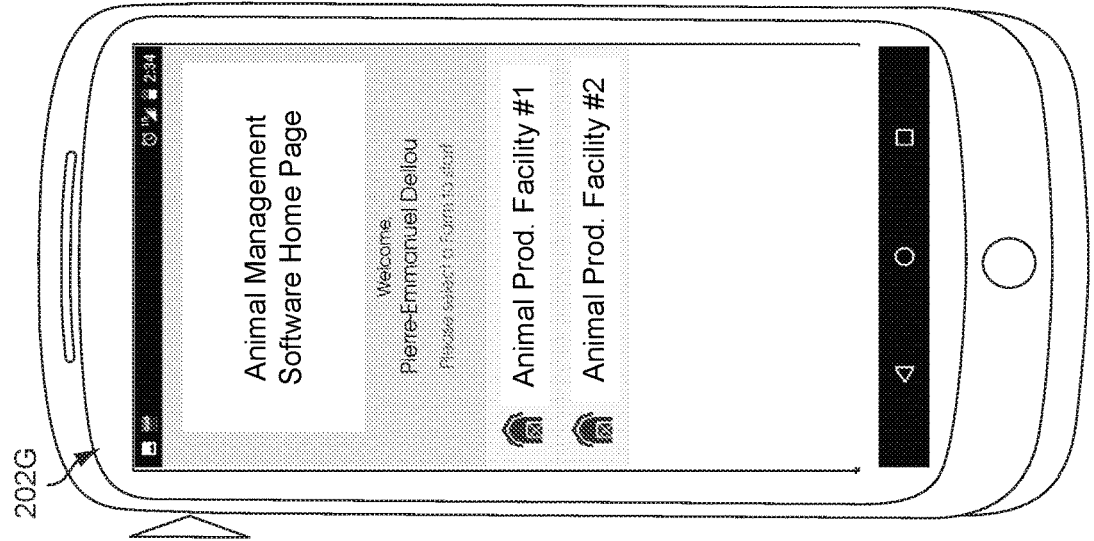
FIG. 2G illustrates an exemplary home-page screenshot of the portable computing device once access to the animal management software application running on the portable computing device has been granted.

Referring now to FIG. 2G, this figure illustrates an exemplary home-page screenshot 202G of the portable computing device 100 once access to the animal management software application 110 running on the portable computing device (PCD) 100 has been granted. According to this exemplary embodiment, a message is displayed on the PCD 100 that lists the one or more animal production facilities that a user may have access to in order to create and/or edit animal records stored locally on the PCD 100 as well at communication server 35 is described above in connection with FIG. 1.

Referring now to FIG. 2H, this figure illustrates an exemplary dash-board screenshot 202H of the portable computing device 100 running the animal management software 110. In this exemplary embodiment, a summary of information tracked for the animals in a production facility may be displayed. For example and as shown, various drugs or chemicals applied to animals of an animal production facility #2 may be tracked. In addition to the tracking of drugs or chemicals, system 101 may also track medical procedures as well as on a non-medical procedures. Exemplary drugs or chemicals, may include, but are not limited to, animal vaccines, parasiticides, antibiotics, vitamins, supplements, hormones, and other active agents and substances. Exemplary medical procedures may include, but are not limited to, spay or neuter status with respect to reproductive organs of animals, artificial insemination status/pregnancy status, and other similar medical procedures/health information for animals.

Figure 6:
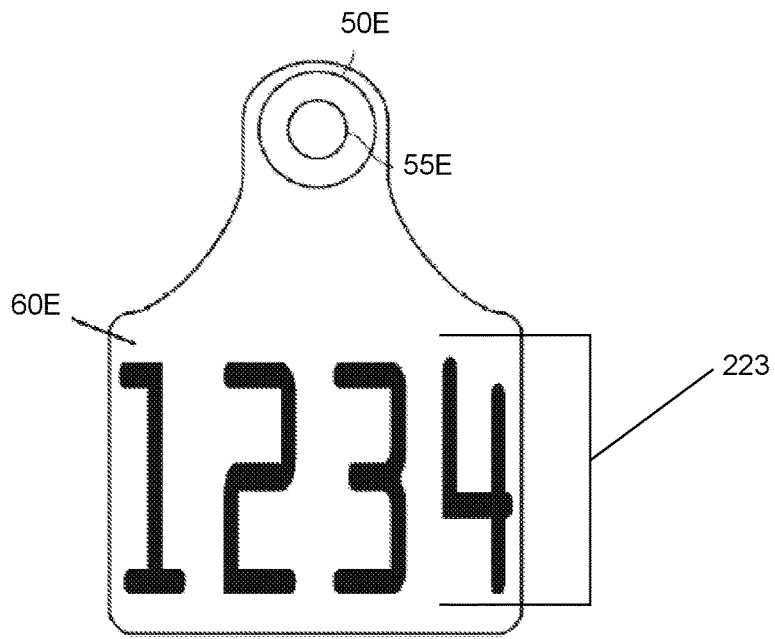
FIG. 6 illustrates an exemplary embodiment of both an RFID tag and an NFC-tag at a rivet point of the ear tag.
Figure 7:
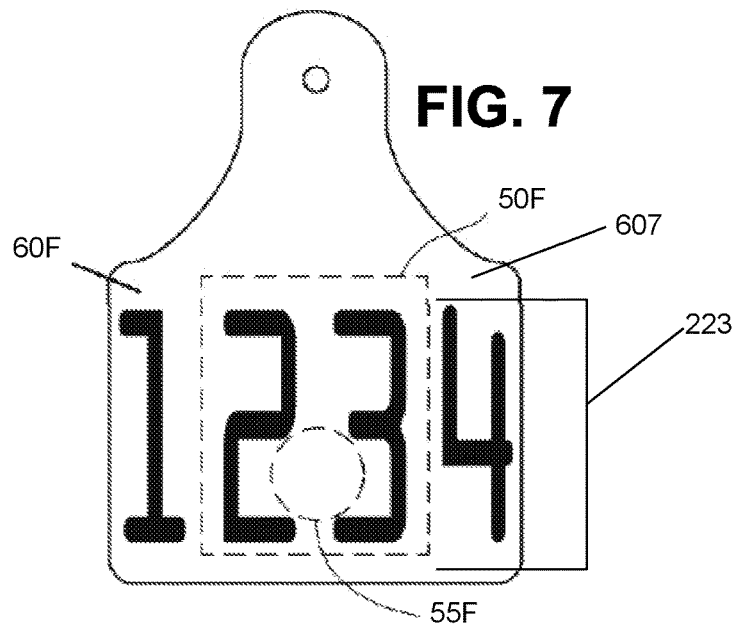
FIG. 7 illustrates an exemplary embodiment of both an RFID tag and an NFC-tag within an ear tag similar to the exemplary embodiment of FIG. 6.

Referring now to FIG. 2I, this figure illustrates an exemplary first step of a three step process having a screenshot 202I displayed on the portable computing device 100 for adding a printed production identifier 223 to an outer surface of an ear tag 60E, 60F which are illustrated in FIGS. 6 and 7. This screenshot 202I explains to an operator how a new NFC tag 55E, 55F may be scanned so it is added into the database 115 maintained by system 101. The screenshot 202I explains how the new NFC tag 55 needs to be placed in proximity to the PCD 100 for the scan.

Referring now to FIG. 2J, this figure illustrates an exemplary second step of a three step process having a screenshot 202J displayed on the portable computing device 100 for adding a printed production identifier 223 to an NFC tag 55. According to this second step which occurs after the scan of the NFC tag 55, the operator of a PCD 100 is prompted to enter data into the screenshot 202J which comprises the printed production identifier 223. As noted previously, the printed production identifier 223 which is applied to the outer surface of the NFC tag 55 may be hand-written and/or it may be printed by a printing machine such as by a computer printer. In this second step, the operator of the PCD 100 is supplying the printed production identifier 223 into the database 115.

Referring now to FIG. 2K, this figure illustrates the completion of the exemplary second step of the three step process of FIG. 2J in which the printed production identifier 223 is now displayed on the portable computing device 100 in screenshot 202K. According to this exemplary embodiment, the printed production identifier 223 was assigned a numeric value of 1234 as noted below in connection with FIGS. 6-7. As noted previously, the printed production identifier 223 may comprise alphanumeric text (i.e. numbers and/or letters) that may be selected according to the numbering scheme that a particular animal production facility desires to follow and which is independent of the animal records stored in the database 115 the system 101.

Referring now to FIG. 2L, this figure illustrates an exemplary third step of a three step process having a screenshot 202L displayed on the portable computing device 100 for adding the NFC tag 55 with the newly assigned production identifier 223 to a particular animal subgroup tracked at an animal production facility. According to this exemplary embodiment, two animal groups are available in which to classify the newly added NFC tag 55 which also has the newly assigned production identifier 223. Alternatively, instead of adding the new NFC tag 55 to an existing group of an animal production facility, a new animal group may be created in the database 115 by the portable computing device 100 as indicated by the on screen button listed at the bottom of FIG. 2L.

Referring now to FIG. 2M, this figure illustrates an exemplary screenshot 202M displayed on the portable computing device 100 when a new animal group described in connection with FIG. 2L is created. According to this exemplary embodiment, the screenshot 202M receives input for a name of a new animal group. The name may comprise any one of alphanumeric text, similar to the animal production identifier 223 described previously.

Referring now to FIG. 2N, this figure illustrates an exemplary screenshot 202N displayed on the portable computing device 100 which comprises information that can be supplied for the animal attached to the newly added NFC tag 55 which also has the animal production facility identifier 223. Exemplary information stored in database 115 associated with any NFC tag 55 as well as the production facility identifier 223 may include, but is not limited to, drugs or chemicals applied to the animal, the weight of the animal, birth records, birth control records, feeding logs, and other health notes. The drugs or chemicals stored in the database 115 may comprise vaccines, parasiticides and other active agents, strengths associated with vaccines or active agent, and vitamins and other nutrients which may be provided to an animal.

Referring now to FIG. 2O, this figure illustrates an exemplary screenshot 202O displayed on the portable computing device 100 which comprises additional information that can be supplied for the animal attached to the newly added NFC tag 55 and which also has the animal production facility identifier 223. Additional information that can be stored in database 115 and which may be associated with both the NFC tag 55 (its identifier) and the production facility identifier 223, may include, but is not limited to, date of birth, a mother or parent identifier used in breeding, animal mating information, read, weight at birth, health notes, as well as other notes.

Figure 2R:
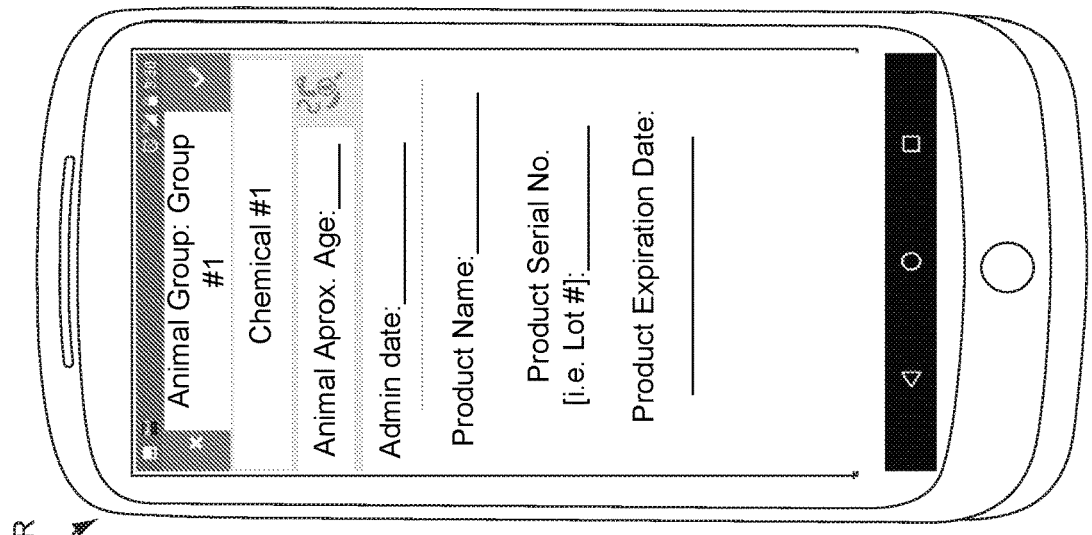
FIG. 2R illustrates an exemplary treatment information screenshot displayed on the portable computing device in response to the input received in connection with the screenshot of FIG. 2Q.
Figure 2Q:
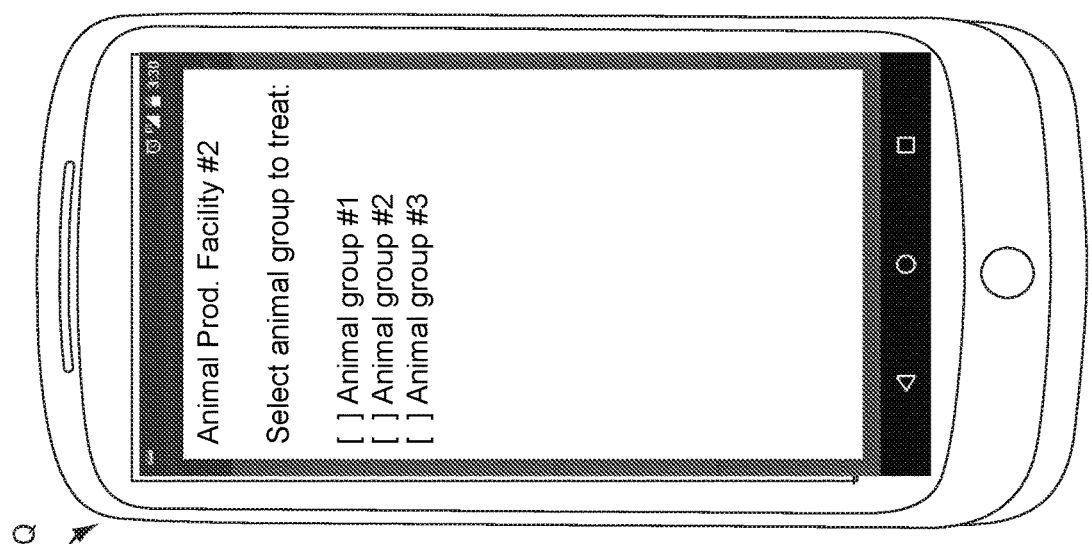
FIG. 2Q illustrates an exemplary animal group screenshot displayed on the portable computing device in response to the input received in connection with the screenshot of FIG. 2P.
Figure 2P:
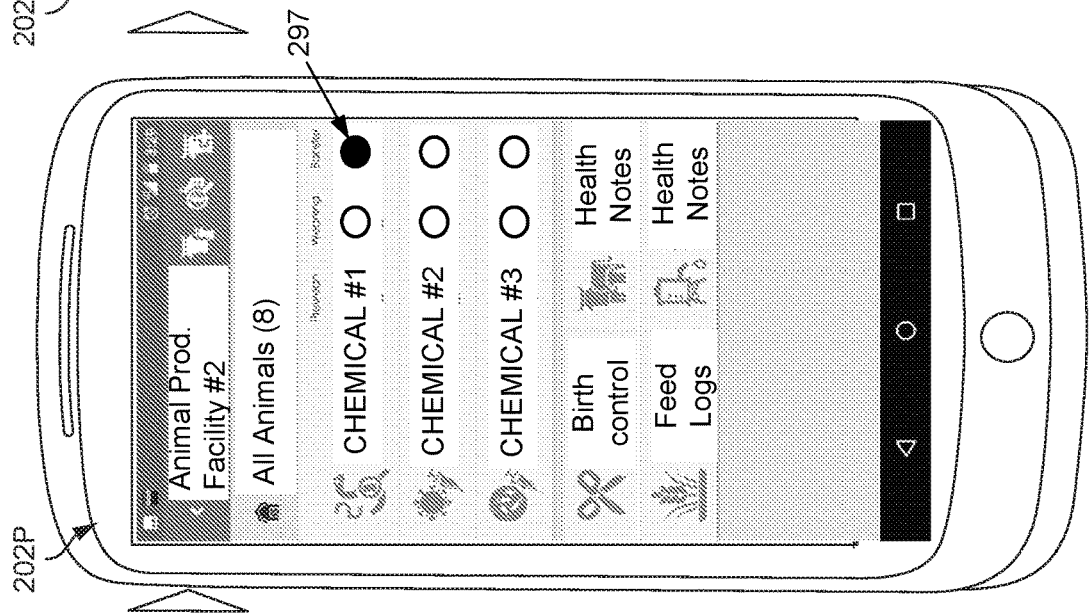
FIG. 2P illustrates an exemplary screenshot displayed on the portable computing device which comprises various actions for drugs or chemicals that can be applied to animals of a production facility.

Referring now to FIG. 2P, this figure illustrates an exemplary screenshot 202P displayed on the portable computing device 100 which comprises various actions for drugs or chemicals that can be applied to animals 65 of a production facility. In the exemplary embodiment illustrated in FIG. 2P, a first chemical listed as chemical #1 has been selected as indicated by arrow 297. The first chemical could be applied in two different stages of animal growth according to the exemplary embodiment illustrated. Note that a third stage of pre-wean is shown but is not available for the three chemicals listed. The two stages of animal growth listed include a weaning stage and a booster stage. According to exemplary embodiment illustrated in FIG. 2P, the booster stage was selected for chemical #1.

Referring now to FIG. 2Q, this figure illustrates an exemplary animal group screenshot 202Q displayed on the portable computing device 100 in response to the input received in connection with the screenshot 202P of FIG. 2P. According to this exemplary embodiment, once an action in screenshot 202P of FIG. 2P is selected, then this screenshot 202Q is generated to allow the selection of a particular animal group of an animal production facility as desired to be treated.

Referring now to FIG. 2R, this figure illustrates an exemplary treatment information screenshot 202R displayed on the portable computing device 100 in response to the input received in connection with the screenshot 202Q of FIG. 2Q. According to this exemplary embodiment, details for the treatment/action which was selected in screenshot 202Q of FIG. 2Q can be received before the action/treatment to the animal group is applied. Exemplary information for actions/treatments may include, but is not limited to, average approximate animal age for the animal group, administration date for the action/treatment, the name of the treatment/ action [i.e. drug name, vaccine name, parasiticide name, etc.], any serial number for the product associated with the treatment/action, and any product expiration date associated with any treatment/action.

Figure 2T:
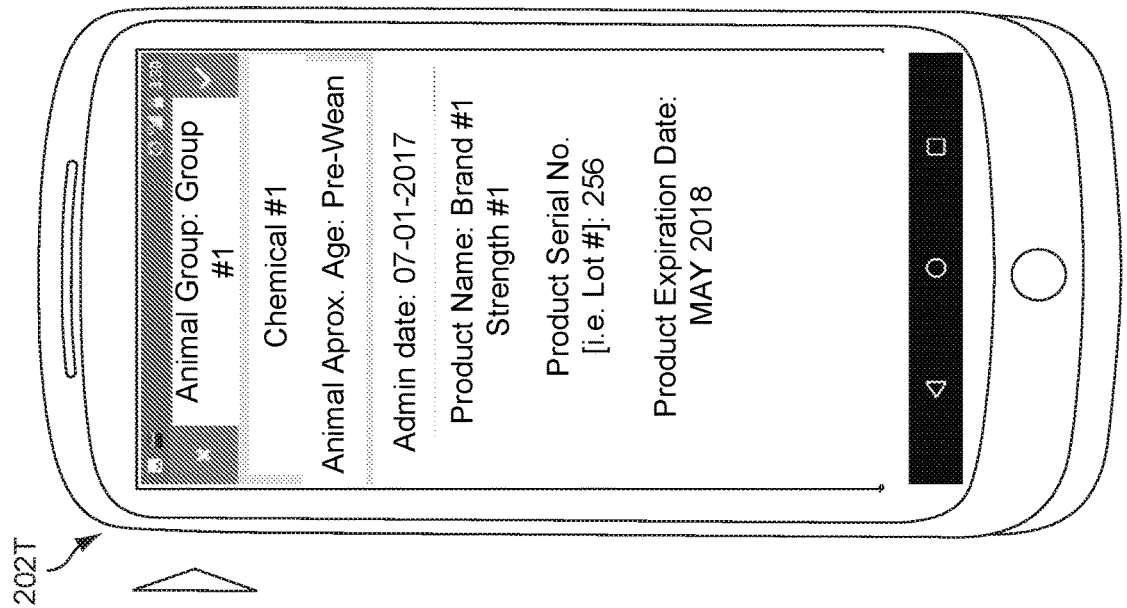
FIG. 2T illustrates a screenshot showing a completed record for a selected action/treatment of a particular animal group of an animal production facility.
Figure 2S:
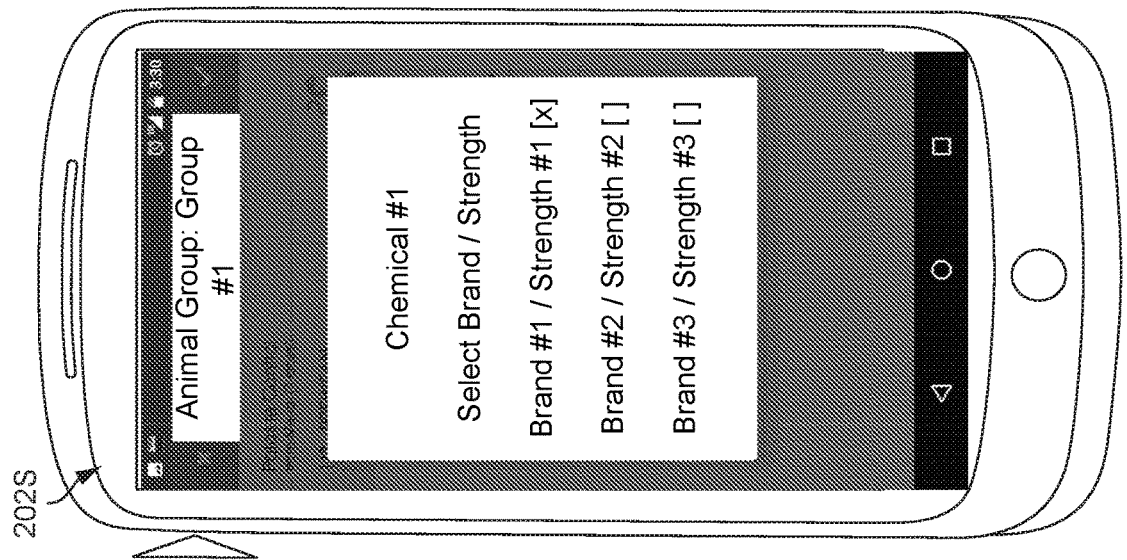
FIG. 2S this figure illustrates a brand/strength screenshot displayed on the portable computing device in response to the input received in connection with the screenshot of FIG. 2R.

Referring now to FIG. 2S, this figure illustrates a brand/ strength screenshot 202S displayed on the portable computing device 100 in response to the input received in connection with the screenshot 202R of FIG. 2R. According to this exemplary embodiment, screenshot 202S is generated in response to the chemical name which may be received in screenshot 202R of FIG. 2R. In FIG. 2R, the brand and any relative strength of the chemical may be entered into this screenshot 202S.

Referring now to FIG. 2T, this figure illustrates a screenshot 202T showing a completed record for a selected action/ treatment of a particular animal group in an animal production facility. As noted previously, exemplary information for the action/treatment which is stored in database 115 may comprise, but is not limited to, the chemical name, the average approximate each for each animal in the animal group, the administration date for the treatment/action on the group, any product name, any brand name, any relative strength of the product, any product serial numbers/lot numbers, and any product expiration dates.

See FIGS. 6 and 7 which illustrate exemplary ear tags 60E, 60F that comprise NFC-tags 55E, 55F and which may include production identifiers 223 printed thereon such that the identifiers 223 are human readable. The production identifiers 223 may be hand-printed or machine printed on the physical housing 60 which supports the NFC-tag 55.

The production identifier 223 is yet another exemplary unique feature of the system 101. The production identifier 223 may comprise a tracking system/organization system that may be unique to the animal production facility, such as a farm. Meanwhile, in addition to bearing the production identifier 223, each NFC-tag 55 may also comprise its unique identifier that is stored in its memory when the tag 55 is manufactured. In this way, an animal production facility may still choose to create its own tracking system/organization system for its production animals 65. However, the tracking system/organization system which is unique to the animal production facility may be managed with the NFC-tags 55 that are associated with the animal production tracking system using the unique identifiers 222 assigned to each NFC-tag 55 when it is manufactured.

Figure 3A:
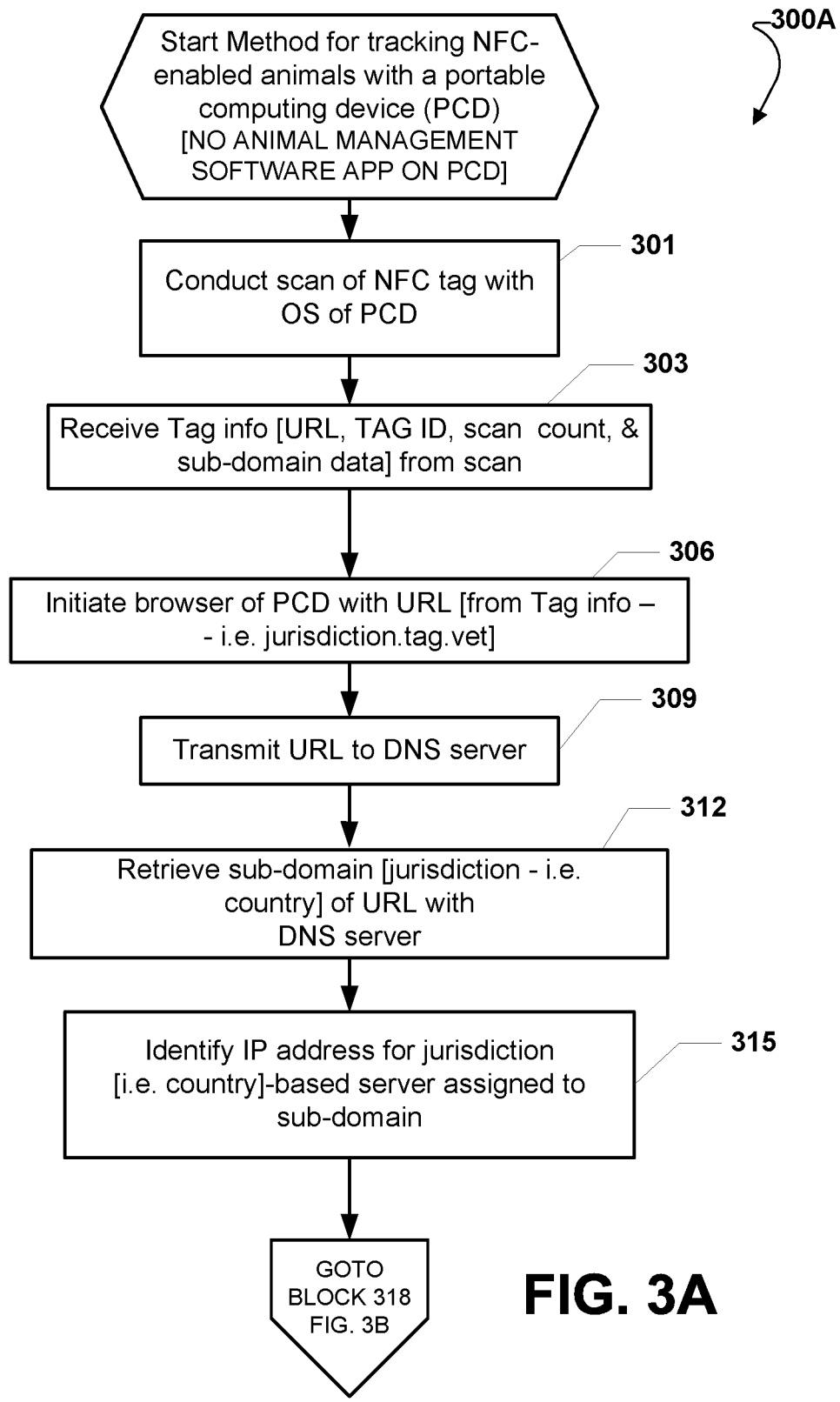
FIGS. 3A-3B depict a logical flow chart illustrating a method for tracking NFC-enabled animals with a portable computing device when animal management software is not detected on the portable computing device according to one exemplary embodiment of the invention.
Figure 3B:
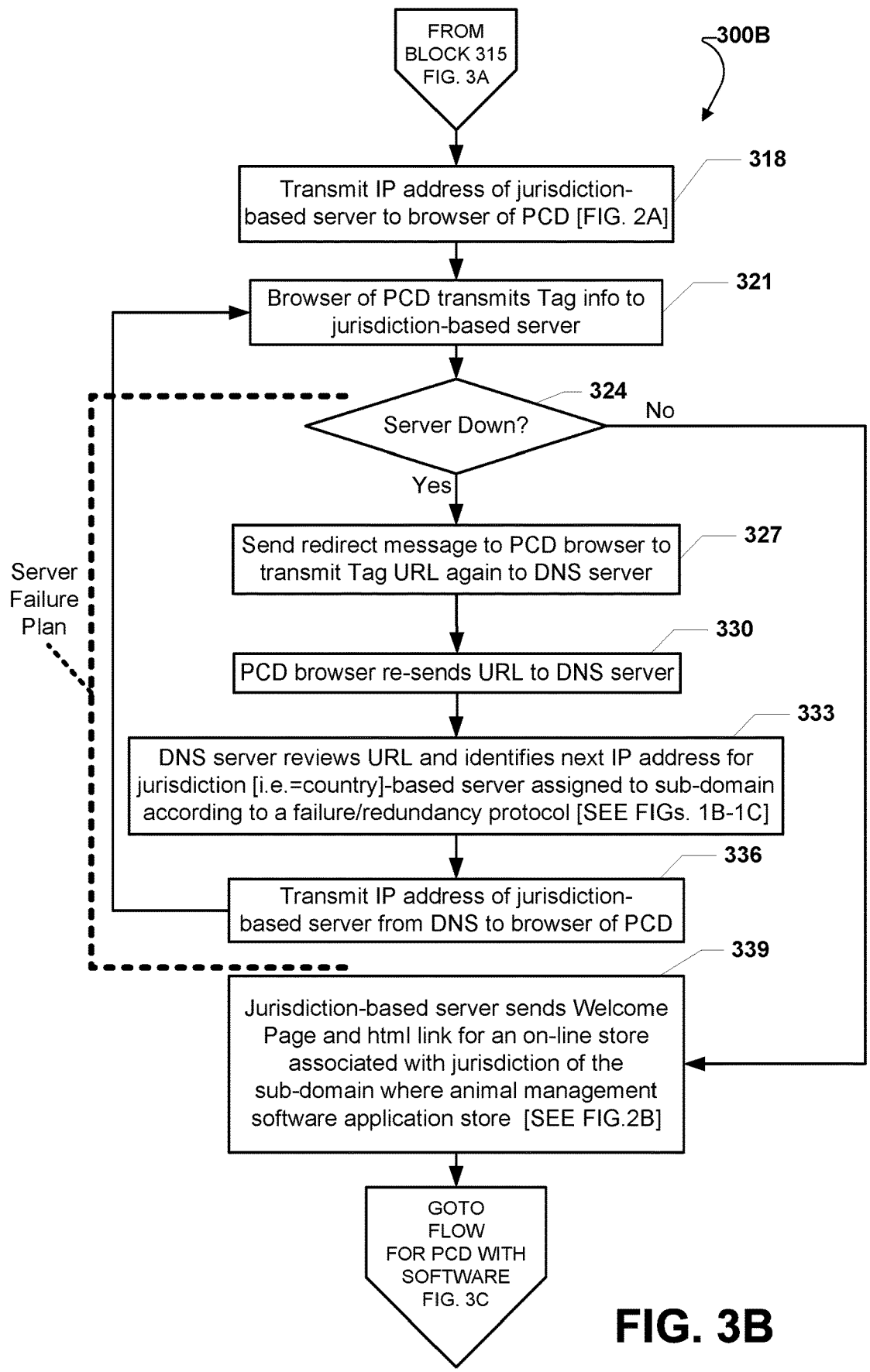

Referring now to FIGS. 3A-3B, these figures depict a logical flow chart illustrating a method 300 for tracking NFC-enabled animals 65 with a portable computing device 100 when animal management software 110 is not detected on the portable computing device 110 according to one exemplary embodiment of the invention. As noted previously, the NFC-tags 55 as well as the animal management software 110 may be dependent upon/governed by local rules, laws, and/or regulations of a particular jurisdiction. Therefore, the system 101 helps the operator of a portable computing device 100 download the appropriate software 110 for the jurisdiction associated with a particular NFC-tag 55.

Referring now to FIG. 3A, the method 300 begins with step 301 in which a portable computing device (PCD) 100 may conduct a scan of an NFC-tag 55 with the high-level operating system running on the PCD 100. Subsequently, in step 303, the PCD 100 a receive the tag information 59 as described above in connection with FIG. 1B. As discussed above, this tag information 59 may include, but is not limited to, a URL, a unique tag identifier, and a scan count.

Next, in step 306, the high-level operating system of the PCD 100 may initiate an Internet browser running on the PCD 100 based upon the URL received from the tag information/data 59. In step 309, a PCD 100 may transmit the URL over the medications that work 150 to the DNS server 22 as illustrated in FIG. 1A.

Subsequently, in step 312, the DNS server 22 may retrieve the sub-domain from the URL of the tag data 59 received from the PCD 100 sent over the communications network 150. Specifically, the sub-domain may comprise the jurisdiction assigned to the NFC-tag 55. According to one exemplary embodiment of the system 101, the jurisdiction usually comprises a country code. However, as noted previously, other jurisdictions are possible and are included within the scope of this disclosure as understood by one of ordinary skill in the art.

Next, in step 315, the DNS server 22 identifies the Internet protocol address based on the jurisdiction information that the DNS server 22 retrieved from the tag data 59. This Internet protocol address is usually for the tag identification server 25 as described above in connection with FIG. 1A. The selection of the Internet protocol address for the tag identification server is also governed by the failure/redundancy plan 27 also described above in connection with FIG. 1A.

The method 300A continues from step 315 of FIG. 3A to step 318 of FIG. 3B (of method 300B). Referring now to FIG. 3B, step 318 is the first step of this flowchart.

In step 318, the DNS server 22 transmits the Internet protocol address of the jurisdiction-based tag identification server 25 over the communications network 150 to the Internet browser of the PCD 100. This activity between the DNS server 22 and the tag identification server 25 may be part of a message that is communicated to the PCD 100 as illustrated in FIG. 2A.

In step 321, the browser of the PCD 100 may transmit the tag information/data 59 to the jurisdiction-based tag identification server 25 as described above in connection with FIG. 1A. Then, in decision step 324, the DNS server 22 determines if the tag identification server 25 is functioning properly and/or is off-line. The DNS server 22 may be waiting for a message from the server 25 and/or the DNS server 22 may wait for a predetermined period of time if there are no communications/responses from the tag identification server 25.

If the inquiry to decision step 324 is positive, the "yes" branch is followed to step 327. If the inquiry to decision step 324 is negative, the "no" branch is followed to step 339.

In block 327, the DNS server 22 may send a redirect message to the PCD browser to transmit the tag data 59 again to the DNS server 22. Alternatively, the DNS server 22 may store the tag data 59 in a local memory store (not illustrated) and access this memory store for this step 327.

In block 330, the PCD browser may resend the tag data 59 which may contain the URL over the communications network 150 to the DNS server 22. In block 333, the DNS server 22 reviews the URL and identifies the next IP address for the tag identification server 25 which is assigned to the sub-domain for that jurisdiction according to a failure/redundancy protocol 27 is described above in connection with FIGS. 1B-1C.

Next, in step 336, the DNS server 22 may transmit this Internet protocol address selected in step 333 over the communications network 150 to the Internet browser of the PCD 100. The method 300B then continues back to step 321.

In step 339, the jurisdiction-based tag identification server 25 generates a message comprising a welcome page and an HTML link for an on-line store associated with the jurisdiction of the sub-domain where the animal management software application 110 may be sold and downloaded. This step 339 generally corresponds with the message displayed on the PCD 100 as illustrated in FIG. 2A.

Figure 3C:
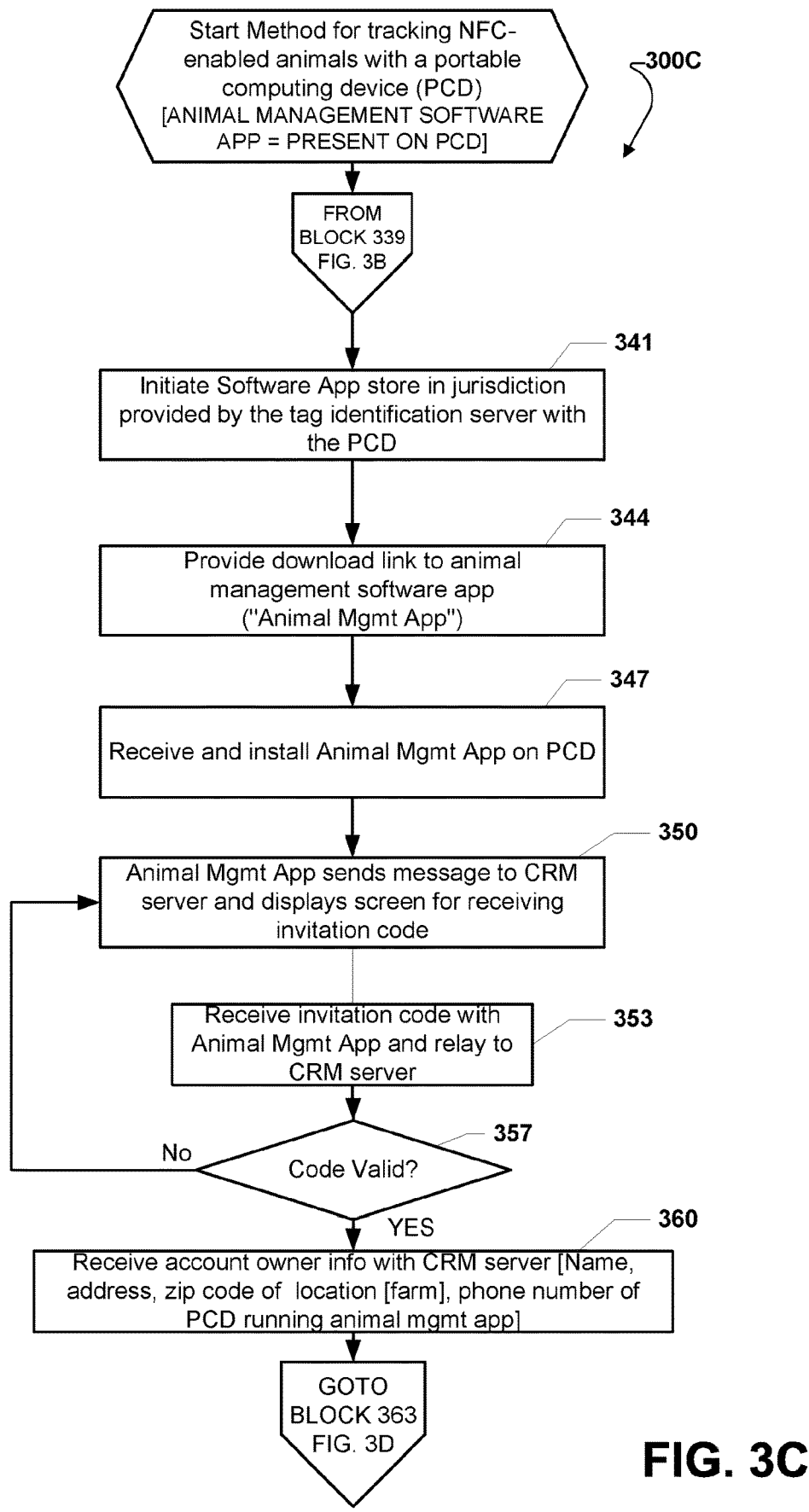
FIGS. 3C-3G are continuation flowcharts of the ones illustrated in FIGS. 3A-3B and further illustrate a method for tracking NFC-enabled animals with a portable computing device when animal management software is detected and running on the portable computing device according to one exemplary embodiment of the invention.

The method 300B then continues to FIG. 3C and to step 341 of that figure. Step 341 is the first step illustrated in FIG. 3C. According to this portion of the method 300, the PCD 100 is downloading the animal management software 110 and will begin running/executing the program instructions.

In step 341, the PCD browser may initiate the software applications store any jurisdiction provided by the tag identification server 25. This step 341 corresponds with message 206 in FIG. 2B.

Next, in step 344, the on-line store server 20 may provide a download link to the animal management software application 110. This step 344 generally corresponds with HTML link 208 in message 206 as illustrated in FIG. 2B described above.

Figure 9:
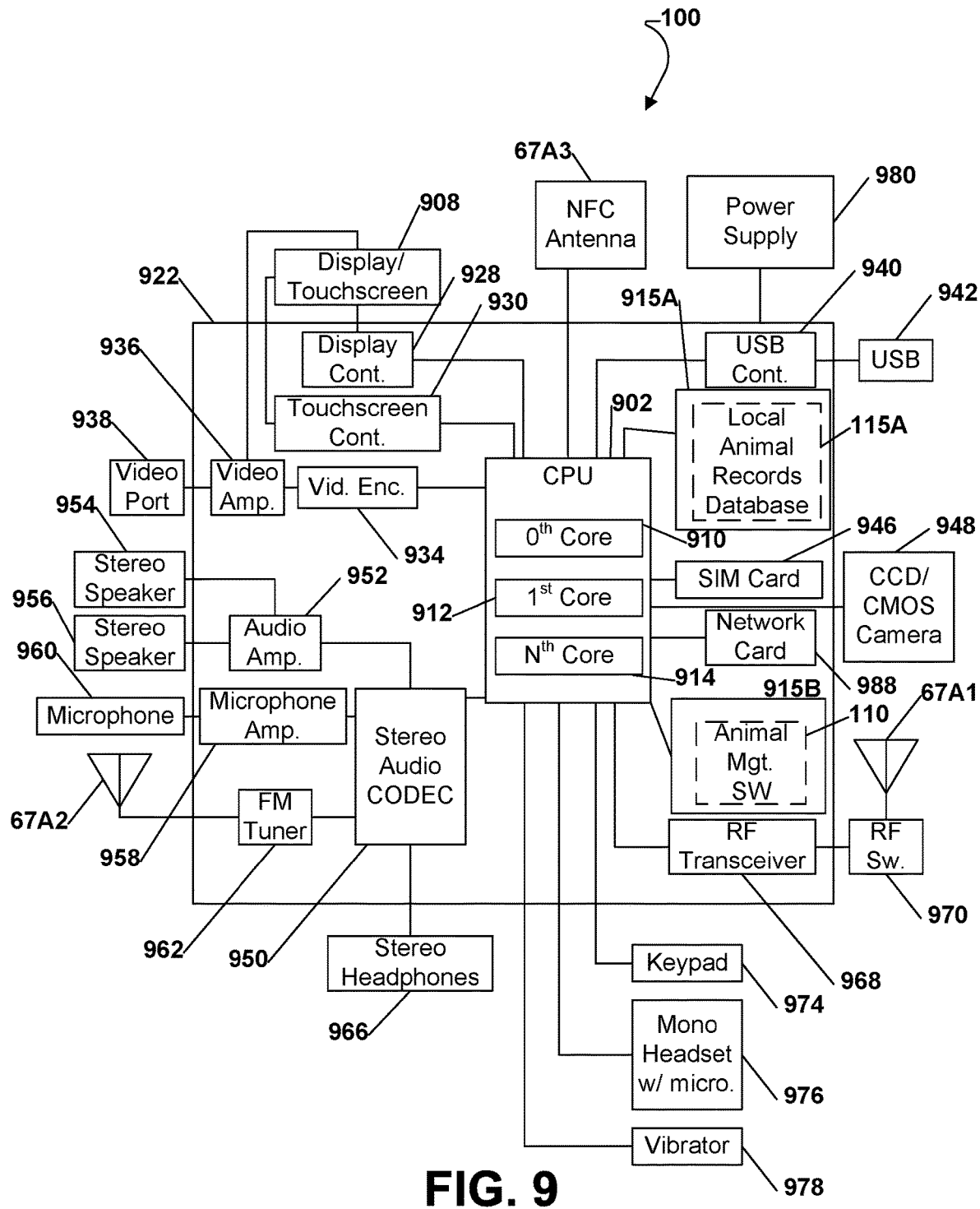
FIG. 9 illustrates one exemplary portable computing device of the system of FIG. 1A according to one exemplary embodiment of the invention.

In step 347, the PCD 100 receives and installs the animal management application software 110 in its memory 915 (See FIG. 9). Next, in step 350, the animal management software 110 may send a message to the CRM server 10 over the communications network 150 and it may display a screen for receiving an invitation code/authentication password/protocol 212 as illustrated in FIG. 2D described above. As noted previously, this code 212 may comprise the unique alpha-numeric characters which may be established by the CRM server 10 and/or the primary account holder when an account is established on the CRM server 10 to manage a particular animal production facility, such as a farm.

Next, in block 353, the animal management software 110 may receive the code 212 and then relay it over the communications network 150 to the CRM server 10. In decision block 357, the CRM server 10 determines if the code 212 is valid.

If the inquiry to decision step 357 is negative, then the "no" branch is followed back to step 350. If the inquiry to decision step 357 is positive, then the "yes" branch is followed to step 360.

In step 360, CRM server 10 may receive the account owner information across the communications network 150 from the PCD 100. As noted previously, this information may comprise, but is not limited to, name, address, zip code of the animal production facility, and a phone number of the PCD 100 running the animal management application software 110.

During this step 360, the operator of the PCD 100 running the animal management application software 110 may supply the names and phone numbers of other employees of the animal production facility may be granted access to the local and remote animal records database 115A, B. This data for the employees of the animal production facility may populate the social graph 81 as described above in connection with FIGS. 1E-1F.

Figure 3D:
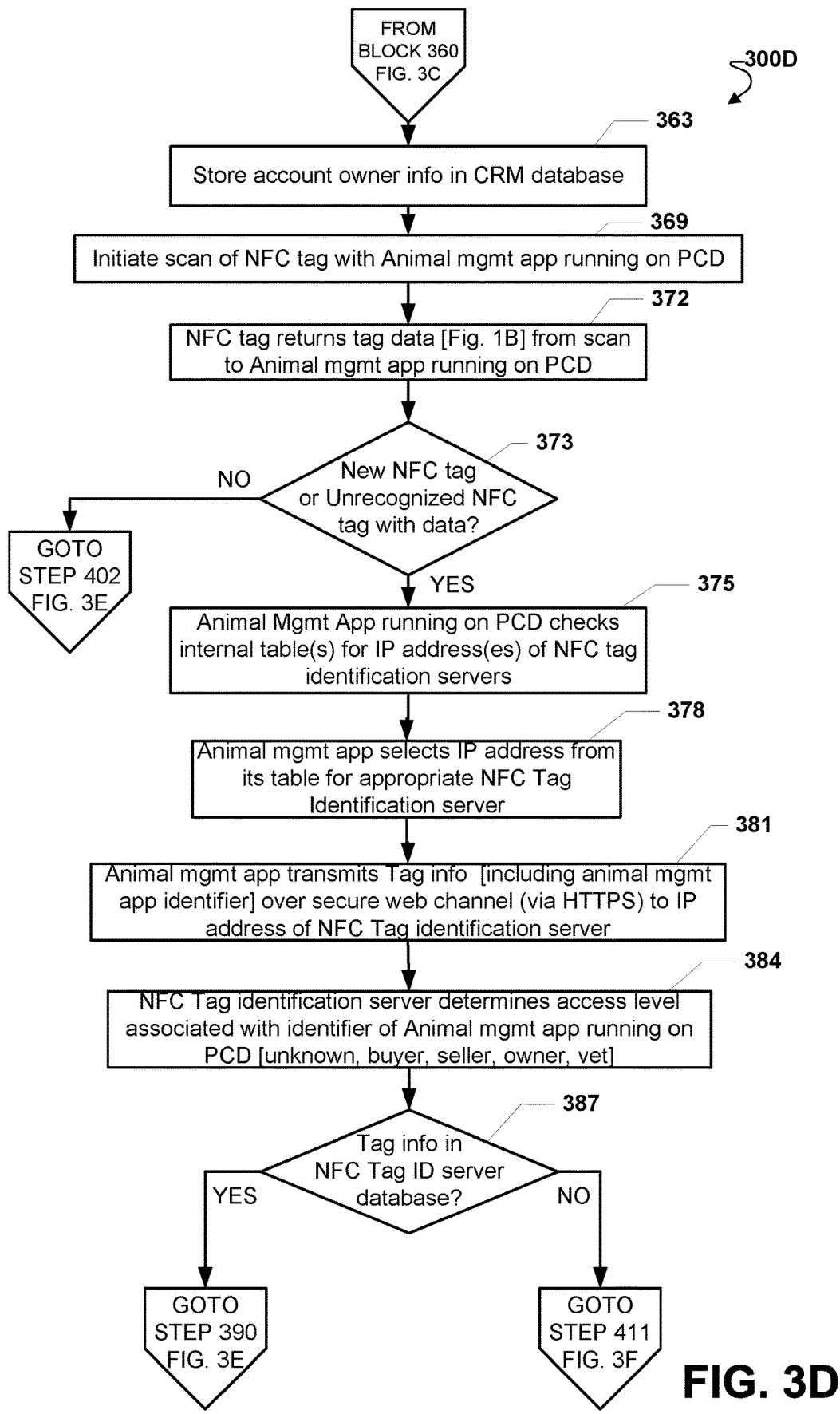

The method 300C of FIG. 3C then continues from step 360 to step 363 of FIGS. 3D. Referring now to FIG. 3D, step 363 is the first step listed in this flowchart.

In step 363, the CRM server 10 may store the account owner information in its CRM database as described above in connection with FIG. 1A. Next, in step 369, an operator of the PCD 100 may initiate a scan of the NFC-tag 55 with the animal management application 110 running on the PCD 100.

In step 372, the NFC-tag 55 may return the tag data 59 from the scan to the animal management application 110 running on the PCD 100. Next, in decision step 373, the animal management application software 110 may determine if the NFC-tag data 59 is recognized or not. In this decision step 373, the animal management application 110 may determine if its local database 115A has the unique tag identifier that is part of the tag data 59.

If the inquiry to decision step 373 is negative, then the "no" branch is followed to step 402 of FIG. 3. If the inquiry to decision step 373 is positive, then the "yes" branch is followed to block 375.

In block 375, the animal management application 110 running on the PCD 100 checks its internal tables for the Internet protocol addresses of NFC-tag identification servers 25. In block 378, the animal management application 110 an Internet protocol address from its table for an appropriate NFC-tag identification server 25.

In block 381, the animal management application 110 transmits the tag data 59 over a secure Internet channel (via HTTPS) to the IP address of the NFC-tag identification server 25. In step 384, the tag identification server 25 determines the access level associated with the identifier of the animal management application 110 running on the PCD 100. In this step 384, the tag identification server 25 is determining whether the operator of the PCD 100 is either unknown, a buyer, seller, an owner, an employee, and/or a veterinarian. These access levels are described above in connection with FIGS. 1E-1F.

Next, in decision block 387, the tag identification server 25 determines if the tag data 59 is stored within its database. If the inquiry to decision step 387 is positive, then the "yes" branch is followed to step 390 of FIG. 3E, described below. If the inquiry to decision step 387 is negative, then the "no" branch is followed to step 411 of FIG. 3F, which is also described below.

Figure 3E:
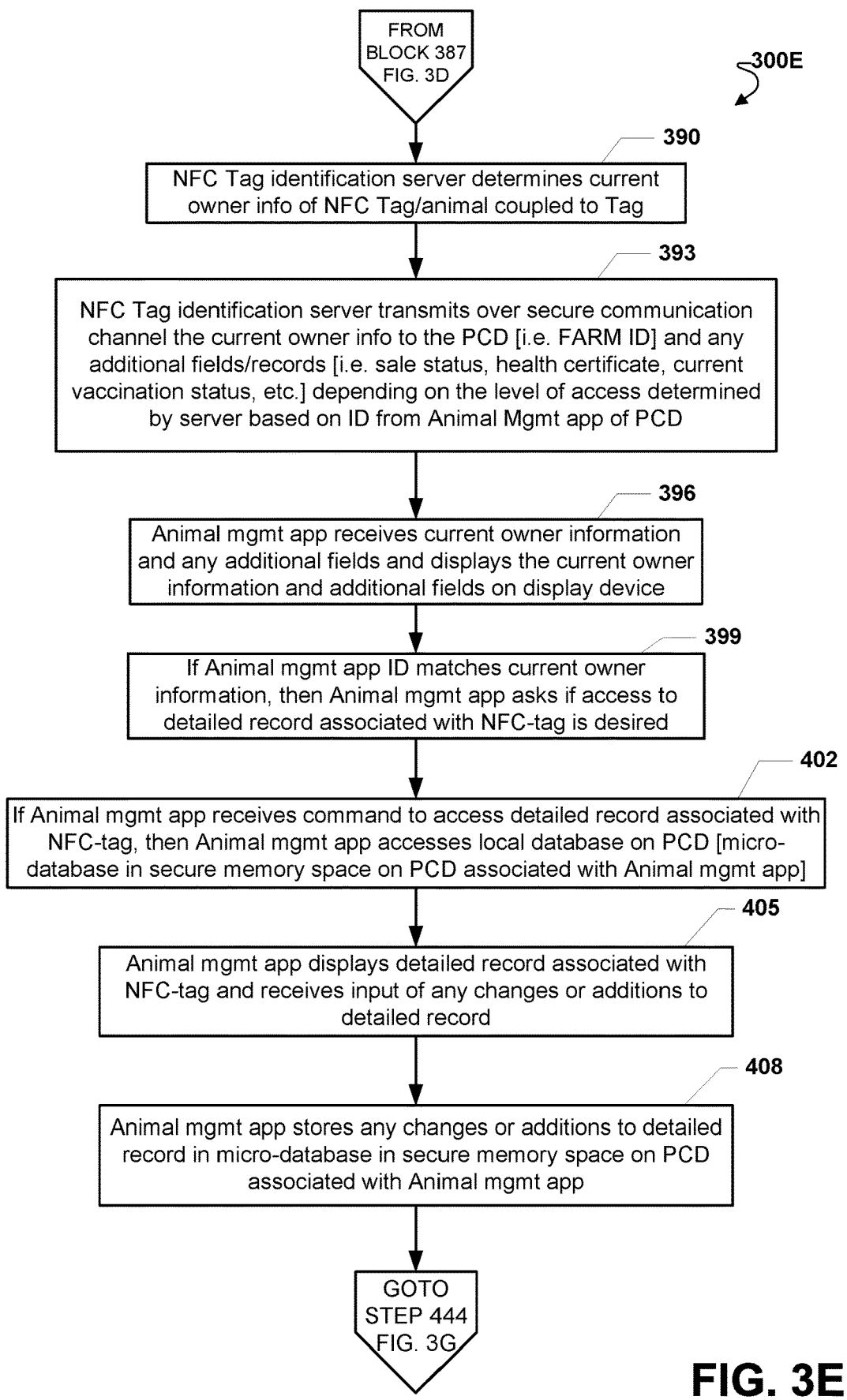

Referring now to FIG. 3E, this figure illustrates a continuation flowchart from the method 300D of FIG. 3D. Step 390 is the first step listed in the flowchart of FIG. 3E.

In step 390, the NFC-tag identification server 25 determines the current owner information associated with the NFC-tag 55 which was scanned by the PCD 101. Subsequently, in step 393, the NFC-tag identification server 25 transmits over a secure two indication channel within the communications network 150 the current owner information to the PCD 100, which may include an animal facility/animal production/farm identifier, and any additional fields/records stored at the tag identification server 25. These additional fields/records stored at each respective tag identification server 25 may include, but are not limited to, sale status, health certificate, current vaccination status, etc. The amount or number of additional records sent from the tag identification server 25 may also be dependent upon the level of access determined by the tag identification server 25 based on the identifier supplied by the animal management software application 110 running on a particular PCD 100.

Next, in step 396, the animal management software 110 running on the PCD 100 may receive the current owner information and any additional fields from the NFC-tag identification server 25. The animal management software 110 may also display the current owner information in the additional fields of information from the NFC-tag identification server 25 on the display device 908 of the PCD 100.

Subsequently, in step 399, if the animal management software application ID matches the current owner information supplied by the tag identification server 25 to the PCD 100, then the animal management software application 110 may ask if the operator of the PCD 100 would like access to the detailed records associated with the NFC-tag 55 that are stored in the secure and local database 115A of the memory of the PCD 100. In step 402, if the animal management software application 110 receives a command to access the detailed record associated with the NFC-tag 55 which just was scanned, then the animal management software application 110 may access the local database 115A on the PCD 100. The local database 115A, as mentioned previously, may reside in a secure memory space on the PCD 100 that is associated with the animal management application software 110.

Next, in step 405, the animal management software application 110 may display the detailed record associated with the unique identifier 222 of the NFC-tag 55 and the software 110 may receive input of any changes or additions to the detailed record which is displayed on the display device 908 of the PCD 100. This step 405 generally corresponds with screenshot 202F in FIG. 2F.

In step 408, the animal management software application 110 may store any changes or additions to the detailed record in the micro database/local animal records database 115A that may exist within secure memory space on the PCD 100 associated with the animal management application software application 110. The method 300E of FIG. 3E may then continue to step 444 in FIG. 3G.

Figure 3F:
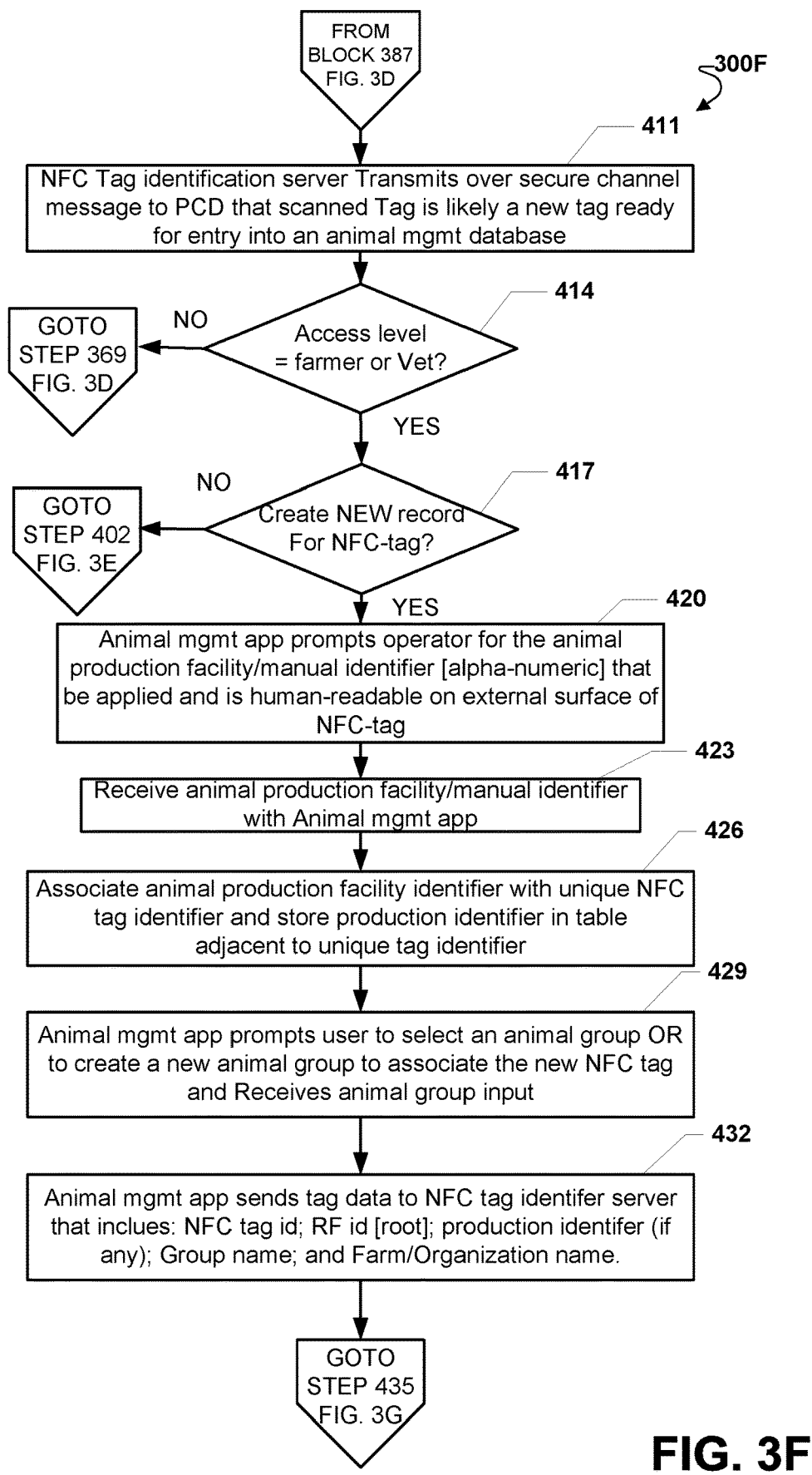

Referring now to FIG. 3F, this figure is a continuation flowchart diagram relative to the flowchart of FIG. 3D, and particularly, continues from step 387 of FIG. 3D. Step 411 is the first step of method 300F which is a continuation of method 300D described above in connection with FIG. 3D.

In step 411, the NFC-tag identification server transmits over a secure communications channel within the communications network 150 a message to the PCD 100 that the scanned NFC-tag 55 is likely a new tag ready for entry into the animal management database 115 stored locally on the PCD 100 and remotely at the communication server 35 illustrated in FIG. 1A.

Next, the animal management application software 110 in decision step 414 may determine the access level for the account associated with the PCD 100. If the inquiry to decision step 414 is negative, meaning that the operator of the PCD 100 does not have sufficient security/authorization to create a new record associated with a new NFC-tag 55, then the "no" branch is followed to step 369 of FIG. 3D, as described above.

If the inquiry to decision step 414 is positive, meaning that the operator of the PCD 100 does have sufficient security/authorization to create a new record within database 115 for a new NFC-tag 55, then the "yes" branch is followed to decision block 417.

In decision block 417, the animal management application software 110 may prompt the operator the PCD 100 if he/she desires to create a new record for the new NFC-tag 55. If the inquiry to decision block 417 is negative, then the "no" branch is followed to step 402 of FIG. 3E, as described above. If the inquiry to decision block 417 is positive, then the "yes" branch is followed to step 420.

In step 420, the animal management application software 110 prompts the operator of the PCD 100 for the production/manual identifier 223 as described above in connection with FIG. 2F and as illustrated in FIGS. 6-7. As noted above, the production identifier 223 is yet another exemplary unique feature of the system 101. The production identifier 223 may comprise a tracking system/organization system that may be unique to the animal production facility, such as a farm. Meanwhile, in addition to bearing the production identifier 223, each NFC-tag 55 may also comprise its unique identifier that is stored in its memory when the tag 55 is manufactured. In this way, an animal production facility may still choose to create its own tracking system/organization system for its production animals 65. However, the tracking system/organization system which is unique to the animal production facility may be managed with the NFC-tags 55 that are associated with the animal production tracking system using the unique identifiers 222 assigned to each NFC-tag 55 when it is manufactured.

In step 423, the animal management software application 110 may receive the production identifier 223 such as illustrated in FIG. 2F. Next, in step 426, the animal management software application 110 may associate the production identifier 223 with the unique NFC-tag identifier 222 from the NFC-tag 55 that was just scanned by the PCD 100. The animal management software application 110 may then store the production identifier 223 in a table adjacent to the unique tag identifier 222.

In step 429, the animal management software application 110 may prompt the operator of the PCD 100 to select an animal group or to create a new animal group to associate the new NFC-tag 55. The animal management software application 110 may then receive that animal group input from the operator of the PCD 100.

Subsequently, in step 432, the animal management software application 110 may send the tag data 59 to the NFC-tag identification server 25 that may include the NFC-tag identifier 222, any RF-ID identifier, and any production identifier 223; a group name, and farm/animal production facility name. Also, in this step 432, the NFC-tag identification server 25 may replicate this tag data 59 in the back-up NFC-tag identification servers 25 in other jurisdictions relative to the primary jurisdiction associated with the tag data 59. The back-up servers 25 in other jurisdictions are based on the failure/redundancy plan(s) described above in connection with FIGS. 1C-1D. The method 300F then proceeds to step 435 of FIG. 3G.

Figure 3G:
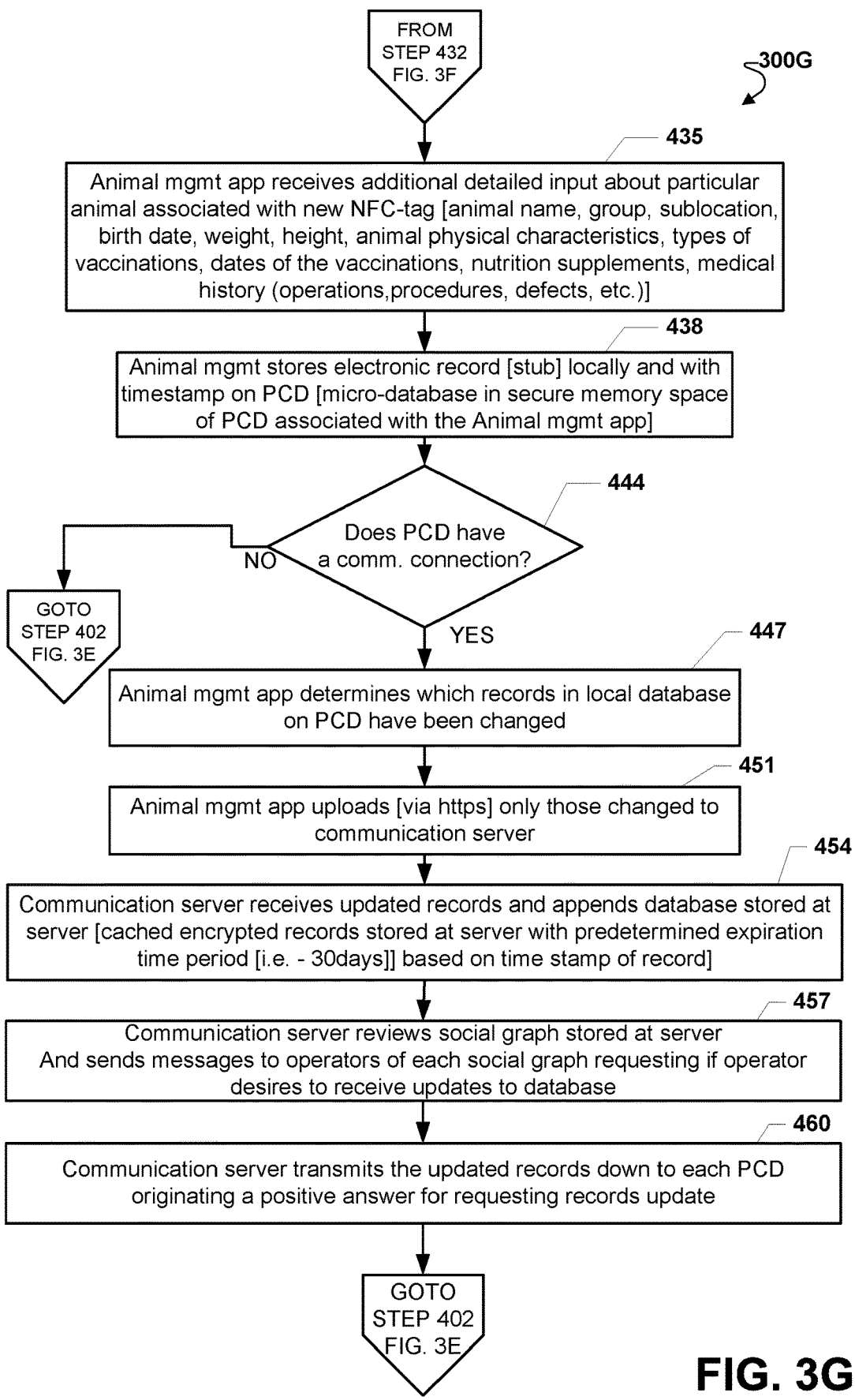

Referring now to FIG. 3G, this figure illustrates a continuation flowchart for a method 300G that continues from step 432 of FIG. 3F. Step 435 is the first step listed in a flowchart of FIG. 3G.

In step 435, the animal management software application 110 may receive additional detailed input about a particular animal 65 associated with the new NFC-tag 55. Such information may include, but is not limited to, a name for the animal 65; sub location; birthdate; weight; height; animal physical characteristics; types of vaccinations; dates of vaccinations; nutrition supplements; and medical history that may include, but is not limited to, operations, procedures, defects, etc.

Subsequently, in step 438, the animal management software application 110 may store the electronic record locally within the local animal records database 115A that is within the portable computing device 100, such as a mobile phone 100. As noted previously, the local animal records database 115A may comprise a secure memory space within the mobile phone 100.

Next, in step 444, the portable computing device 100 may determine if it has a communication link with the communications network 150 such that it may relate data to the communication server 35 and its remote animal records database 115B. If the inquiry to decision step 444 is negative, then the "no" branch is followed back to step 402 of FIG. 3E. if the inquiry to decision step 444 is positive, then the "yes" branch is followed to step 447.

In step 447, the animal management software application 110 may determine which records in the local database 115A within the portable computing device 100 may have been changed/updated. Next, in step 451, the animal management software application 110 may upload over the communications network 150 to the communication server 35 only those records which have been changed.

Next, in step 454, the communication server 35 may receive the updated records from the PCD 100 and it may attend its remote database 115B. The remote animal records database 115B may comprise cached encrypted records at a server which may have a predetermined expiration time period. For example, based on the timestamp for a particular record that the remote animal records database 115B, the record may be deleted within a time period of about 30 days. Time periods shorter or longer are possible and are included within the scope of this disclosure as understood by one of ordinary skill in the art.

Next, in step 457, the communication server 35 reviews the social graph 81 (see FIGS. 1E-1F) stored in its memory and sends messages to each PCD 100 that may not have the updated record associated with the NFC-tag 55 that has been edited/changed.

Subsequently, in step 460, the communication server 35 may transmit the updated records associated with one or more NFC-tags 55 over the communications network 150 down to each PCD 100 which provides a positive answer for requesting an animal records update to its local animal records database 115A. The method 300G then proceeds back to step 402 of FIG. 3E.

Figure 4:
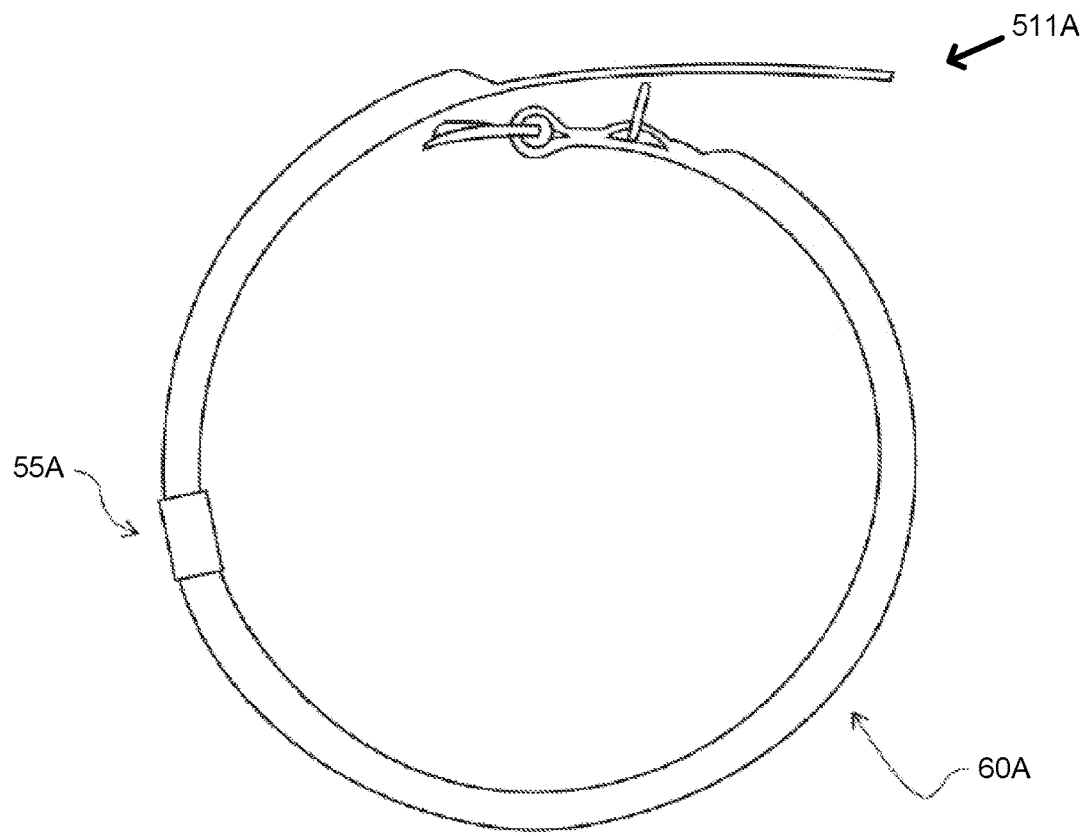
FIG. 4 illustrates an exemplary embodiment of the mechanical coupling depicted in FIG. 1A according to one exemplary embodiment of the invention.

Referring now to FIG. 4, this figure illustrates an exemplary embodiment of the mechanical coupling 60A with an NFC-tag 55A depicted in FIG. 1A. The NFC-tag 55A may take on various physical embodiments/forms as understood by one of ordinary skill in the art and which are also described in copending and commonly assigned U.S. patent application Ser. No. 15/474,300, filed Mar. 30, 2017, entitled, "SINGLE OR DUAL TECHNOLOGY ANIMAL TAGS AND SYSTEM AND METHOD OF USING THE SAME," the entire contents of which are hereby incorporated by reference (attached as Appendix A).

The NFC-tag 55A may be affixed to, enclosed in, or embedded in the material of a pet collar or other external coupling device 60 for an animal 65 (See FIG. 1 for animal 65). With respect to pets or companion animals 65, such as dogs and cats, this external device or coupling mechanism 60 may be in the form of a pet collar, anti-parasitic pet collar, harness or the like.

With respect to a production animal 65, such as cattle, pigs, goats, sheep or the like, this external device/coupling 60 might take the form of a mountable tag, such as an ear tag, such as illustrated in FIGS. 6-8A described below. With respect to sport animals 65, such as horses or camels, this external device might take the form of a bridle, saddle, harness or the like. With respect to laboratory animals, such as mice, rats rabbits or the like, this external device might take the form of earring, bracelet or collar 60 or the like for application to a leg, neck, foot or the like of the laboratory animal 65.

With respect to service or support animals 65, such as guide dogs for blind, search and rescue animals, custom drug detection animals, patrol horses, this external device/ coupling 60 might take the form of a harness. With respect to production birds or fowl animals 65, such as chickens, turkeys, ducks and geese, this external device/coupling 60 may take the form of a leg band 60, bracelet, wing tag or bead. With respect to wildlife, the external device/coupling 60 may be of any of the appropriate forms identified above, including implant, collar, ear tag, leg band, wing tag, harness, or bead.

While each configuration of the NFC-tag 55A described herein is suggested with respect to a particular type of animal, it is contemplated that each configuration of the NFC-tag 55A is not limited to any particular type of animal and all permutations and combinations are hereby contemplated by this disclosure as understood by one of ordinary skill in the art. For example, a collar 60 (FIG. 4) could be used for a camel or a horse 65 or an ear tag 60 (See FIGS. 6-7) could be used for a companion animal 65, like dog if desired.

With respect to external devices/couplers 60 including an NFC-tag 55A, the tag 55A and its circuitry/chip 56 (see FIG. 8B) may be incorporated into or on the device/coupler 60. For example, a pet collar 60A could be made of fabric, leather, plastic, rubber or other material. The collar 60A may have a buckle or plastic clip or other similar closure mechanism 511 (See FIGS. 4A-5C).

With respect to fabric, leather or similar material, the NFC-tag 55A may be sewn onto or into the fabric or leather or sandwiched between layers of the material and bonded. For a plastic collar 60A (FIG. 4), such as one including an anti-parasitic pharmaceutical compound, the NFC-tag 55A may be encased within the material, such as plastic, that is used to form the collar. The NFC-tag 55A may be otherwise attached, affixed, clipped or embedded in or to the collar by other known methods. Similar fabrications can be used for harnesses, bridles, saddles, leg bands, wing tags, bracelets, beads or the like. The NFC-tag 55A may simply be affixed by known methods to the external device 60 by known methods such as glue, stamping, riveting or the like. An RFID tag 50 (not illustrated with couplers 60) may be co-hosted and mounted in a similar fashion.

FIGS. 4 and 5(*a*)-(*c*) are schematic illustrations of the NFC-tag 55 with respect to a collar 60. Although the figures illustrate a collar 60 with a buckle closure 511, the invention contemplated herein is not limited to any particular closure mechanism 511. For example, if the collar 60 is fabric, the NFC-tag 55 may be sewn in or sealed between two layers of fabric. If the collar 60 is plastic, the NFC-tag 55 may be molded within. When the NFC-tag 55 is incorporated into the pet collar 60, the pet collar 60 may be imprinted with a notice to indicate that an NFC-tag 55 is included at specific location of the pet collar 60. Alternatively, the information may molded into the material of the collar 60, for example via the mold used for injection molding.

Referring again to FIG. 4, this figure illustrates another exemplary embodiment of an NFC-tag 55A according to principles of the present invention external to an animal collar 60A and which forms part of the body of the animal collar 60A. The NFC-tag 55A may have a small chip 56 and an antenna 67B which are not visible in this view (but see FIG. 8B). The NFC-tag 55A may have the same structure and functions as discussed above in connection with the schematic of FIG. 8B described below.

The closure mechanism 511A of this exemplary embodiment in FIG. 4 may comprise a buckle that has a projecting member that penetrates various holes (not shown) that are in the plastic animal collar 60A as understood by one of ordinary skill in the art. The various holes allow for the adjustment of fit of the animal collar 60A around the neck of the animal 65 (not visible in FIG. 4, but See FIG. 1).

According to this exemplary embodiment, the NFC-tag 55A may have a larger housing and/or mechanical structure such that the NFC-tag 55 forms a portion of the animal collar 60A, where the collar 60A is made from a plastic material. The NFC-tag 55A in this exemplary embodiment has a housing that is permanently attached to two ends of the animal collar 60A.

The housing of the NFC-tag 55A may be provided with a size and shape such that it mirrors the size and shape of the animal collar 60A. While the NFC-tag 55A illustrated in FIG. 4 has been depicted with a size and shape that is slightly larger than the size and shape of the collar 60A, it is feasible to create a NFC-tag 55A having a housing which has an identical size and shape as the collar 60GA as understood by one of ordinary skill in the art.

Figure 5A:
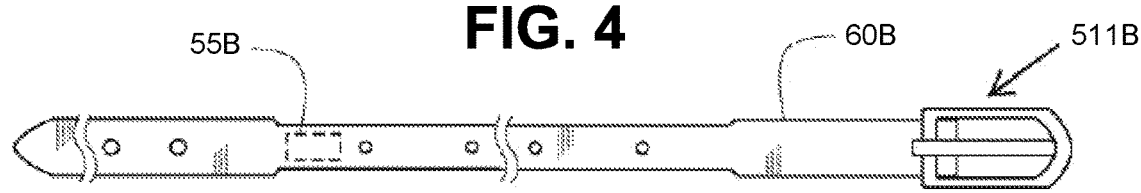
FIG. 5 illustrates additional exemplary embodiments of the mechanical coupling depicted in FIG. 1A according to the invention.

Referring now to FIG. 5A, this figure illustrates an exemplary embodiment of an NFC-tag 55B according to principles of the present invention internal to an animal collar 60B made from leather. FIG. 5A is similar to FIG. 4. Therefore, only the differences between these two animal collars 60A and 60B will be described below.

Similar to the embodiment of FIG. 4, the NFC-tag 55B of this exemplary embodiment may be embedded/enclosed with the fabric/leather structure of the animal collar 60B. The animal collar 60B may have a non-uniform cross-sectional shape in which the ends have a greater thickness compared to a mid-section of the collar 60B. However, it is possible to produce a leather collar 60B having a uniform cross-sectional shape and thickness as understood by one of ordinary skill in the art.

Figure 5B:
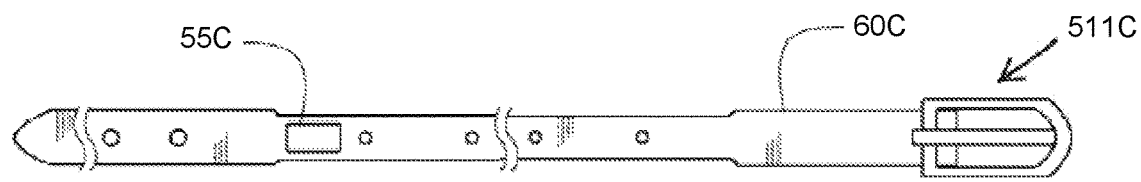

Referring now to FIG. 5B, this figure illustrates an exemplary embodiment of an NFC-tag 55C according to principles of the present invention external to an animal collar 60C made from leather. FIG. 5B is similar to FIG. 4. Therefore, only the differences between these two animal collars 60A and 60C will be described below.

Like the embodiment illustrated in FIG. 4, the NFC-tag 55C of this embodiment of FIG. 5B may be attached/ permanently fixed to an external portion of the leather collar 60C. The NFC-tag 55C will generally have housing that is smaller than a thickness of the leather collar 60C.

Figure 5C:
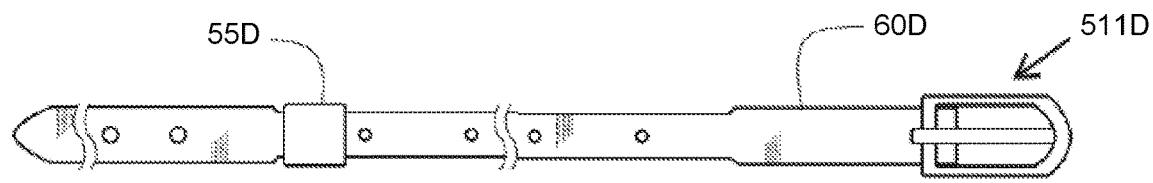

Referring now to FIG. 5C, this figure illustrates an exemplary embodiment of an NFC-tag 55D according to principles of the present invention external to an animal collar 60D made from leather. FIG. 5C is similar to FIG. 4.

Therefore, only the differences between these two animal collars 60A and 60D will be described below.

Like the embodiment of FIG. 4, the NFC-tag 55D has a housing which fastens to at least two ends of the leather collar 60D. While the NFC-tag 55D illustrated in FIG. 5C has been depicted with a size and shape that is slightly larger than the size and shape of the cross-section for collar 60D, it is feasible to create a NFC-tag 55D having a housing which has an identical size and shape as the collar 60D as discussed above and as understood by one of ordinary skill in the art.

Referring now to FIG. 6, this figure illustrates an exemplary embodiment of both an RFID tag 50E and an NFC-tag 55E at a rivet point of the ear tag 60E. In this exemplary embodiment, a coil antenna 67 (not visible in this figure) for the NFC-tag 55E may comprise a smaller diameter and may be positioned within the larger coil antenna 67 (not visible in this figure) for the RFID tag 50E. This exemplary embodiment is similar to other exemplary embodiments described in copending and commonly assigned U.S. patent application Ser. No. 15/474,300, filed Mar. 30, 2017, entitled, "SINGLE OR DUAL TECHNOLOGY ANIMAL TAGS AND SYSTEM AND METHOD OF USING THE SAME," the entire contents of which are hereby incorporated by reference.

The ear tag 60E may also bear a printed production identifier 223 as described above. This production identifier 223, which comprises the value of 1234 in this example, may be hand-written or machine-printed. As described above, this production identifier 223 may be unique to each animal production facility which may have its own tracking system/organization system for production animals 65.

Referring now FIG. 7, this figure illustrates an exemplary embodiment of both an RFID tag 50F and an NFC-tag 55F within an ear tag 60F similar to the exemplary embodiment of FIG. 6. Specifically, both tags 55F and 55E may be positioned within the rectangular portion 607 of the tag structure 60F. According to this exemplary embodiment, the RFID tag 50F may have circuitry and/or its antenna 67 (not visible) that contains/circumscribes the area which is occupied by the NFC-tag 55F.

Similar to FIG. 6, the ear tag 60F of FIG. 7 may also bear a printed production identifier 223 as described above. This production identifier 223, which comprises the value of 1234 in this example, may be hand-written or machine-printed. As described above, this production identifier 223 may be unique to each animal production facility which may have its own tracking system/organization system for production animals 65.

Figure 8A:
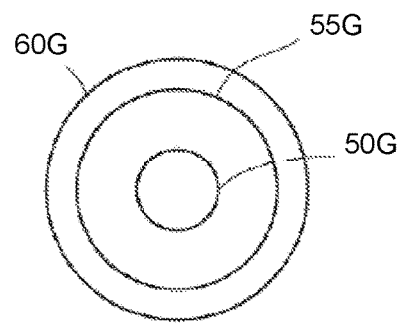
FIG. 8A illustrates an exemplary embodiment of both an RFID tag and an NFC-tag at a rivet point of a button type ear tag.
Figure 8B:
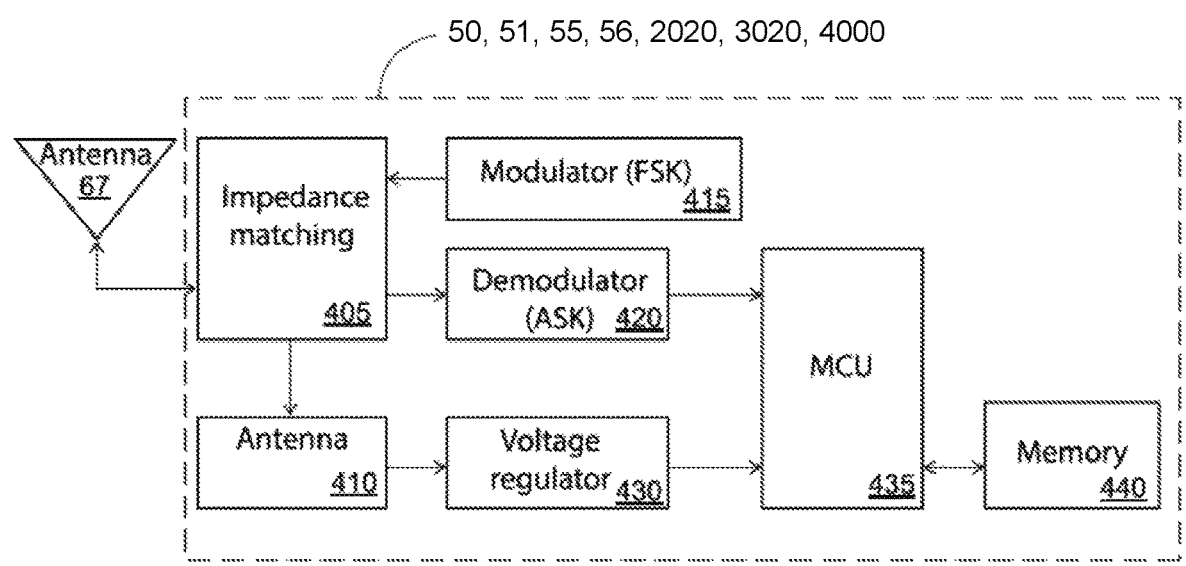
FIG. 8B illustrates a functional block diagram of one exemplary embodiment of circuitry that may form either an RFID chip or an NFC chip, or a chip that has a pair of dual circuits [two duplicates of the single circuit shown] in FIG. 8B for supporting both NFC and RFID communications.

Referring now to FIG. 8A, this figure illustrates an exemplary embodiment of both an RFID tag 50G and an NFC-tag 55F at a rivet point of a button type ear tag 60G. According to this exemplary embodiment, the coil antenna 67 (not visible in this figure) for the RFID tag 50G may comprise a smaller diameter and may be positioned within the larger coil antenna 67 (not visible in this figure) for the NFC-tag 55G.

Figures 1, 12B:
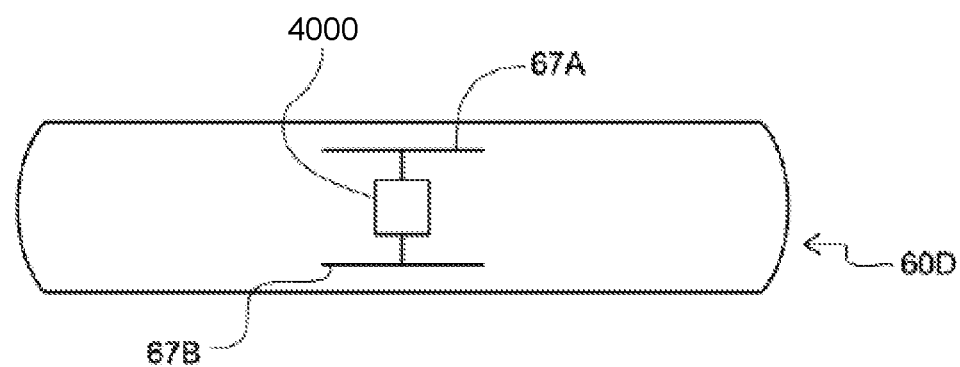
Figures 1, 12C:
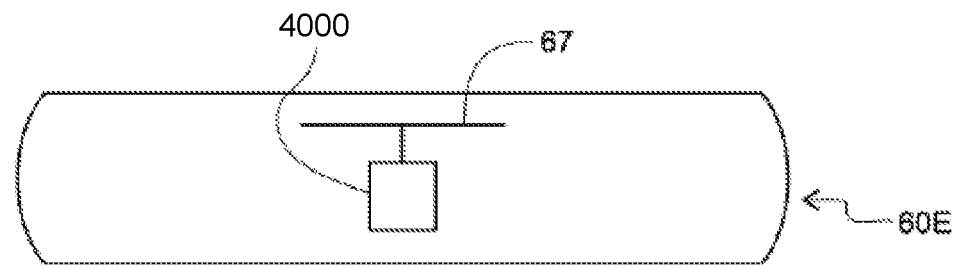

FIG. 8B illustrates a functional block diagram of one exemplary embodiment of circuitry that may form either an RFID chip 51/2020 or an NFC chip 56/3020, or a chip 4000 [see FIG. 12B-1, 12C-1] that has a pair of dual circuits [two duplicates of the single circuit shown] in FIG. 8B for supporting both NFC and RFID communications according to exemplary embodiments described herein. An RFID tag 50, an RFID chip 51/2020, an NFC-tag 55, an NFC chip 56/3020, and a common chip 4000 may comprise an impedance matching circuit/module 405, a power-harvester module 410, a modulator module 415, a demodulator module 420, a voltage regulator 430, a microcontroller unit (MCU) 435, and memory module 440.

The antenna 67 may receive RF energy which is flows through the impedance matching circuit/module 405 to the power-harvester module 410. The power-harvester module 410 may rectify incoming RF energy into direct-current voltage to power the entire chip/system. The voltage regulator 430 smoothes/filters out the DC voltage received from the power harvester module 410. The voltage regular 430 sends its current/voltage to the MCU 435.

Meanwhile, the demodulator module 420 extracts the data stream from the RF carrier wave using amplitude shift keying (ASK) as understood by one of ordinary skill in the art. The demodulator module 420 sends its signals to the MCU 435.

The MCU 435 may read and act on the signals it receives from the demodulator module 420. The MCU 435 may generate signals in response to the signals received from the demodulator module 420. For example, the MCU 435 may be requested to provide a unique identifier for the tag 50, 55. The unique identifier may be stored in memory module 440. The MCU 435 may retrieve the unique identifier from the memory module 440 and then send it to the modulator module 415.

The modular module 415 may then modulate the RF carrier wave with the unique identifier signal received from the MCU 435. The RF carrier wave may then flow through the impedance matching circuit/module 405 where it is then transmitted by the antenna 67. The NFC circuitry/tag 55/3020 described herein may be built according to at least one of these two standards known as of this writing: ECMA-340 and ISO/IEC 18092 as understood by one of ordinary skill in the art. The RFID circuitry/tag 50/2020 described herein may be built according to at least one of these four standards known as of this writing: ISO/IEC 18000; ISO/IEC 29167; ISO/IEC 20248; and ISO/IEC JTC 1/SC 31 as understood by one of ordinary skill in the art.

FIG. 9 illustrates one exemplary portable computing device 100 of the system of FIG. 1A according to one exemplary embodiment of the invention. As noted above, the portable computing device (PCD) 100 may comprise a cellular telephone, a smartphone, a portable digital assistant (PDA), a portable game console, a navigation device, a tablet computer/PC, a fitness computer, and a wearable device (e.g., a sports watch, a fitness tracking device, etc.) or other battery-powered devices with a wireless connection or link. According to one exemplary and preferred embodiment, the portable computing device 100 may comprise a hand-held, smartphone that runs a high-level operating system (HLOS).

The PCD 100 may comprise a system-on-chip (SoC) 922. The SOC 922 may include a multicore CPU 902. The multicore CPU 902 may include a zeroth core 910, a first core 912, and an Nth core 914. One of the cores may comprise, for example, a graphics processing unit (GPU) with one or more of the others comprising the CPU 902.

The muticore CPU 902 may be coupled to memory storage devices/units 915A, 915B. These memory storage devices/units 915 may comprise double-data rate (DDR) dynamic random access memory (DRAM), random access memory (RAM), flash memory, and other like volatile and/or non-volatile memory types.

The first memory device 915A may store the local animal records database 115A as described above in connection with FIG. 1A. The second memory device 915B may store the animal management software 110 as described above in connection with FIG. 1A. The multicore CPU 902 may execute/run the animal management software 110 when the CPU 902 loads it into its local memory (i.e., such as, but not limited to, flash memory) from the second storage device 915B as understood by one of ordinary skill in the art.

A display controller 928 and a touch screen controller 930 may be coupled to the CPU 902. In turn, the touch screen display 908 external to the on-chip system 922 may be coupled to the display controller 928 and the touch screen controller 930.

FIG. 9 further shows that a video encoder 934, e.g., a phase alternating line (PAL) encoder, a sequential color a memoire (SECAM) encoder, or a national television system(s) committee (NTSC) encoder, is coupled to the multicore CPU 902. Further, a video amplifier 936 is coupled to the video encoder 934 and the touch screen display 906. Also, a video port 938 is coupled to the video amplifier 936. As shown in FIG. 9, a universal serial bus (USB) controller 940 is coupled to the multicore CPU 902. Also, a USB port 942 is coupled to the USB controller 940.

Further, as shown in FIG. 9, a digital camera 948 may be coupled to the multicore CPU 902. In an exemplary aspect, the digital camera 948 is a charge-coupled device (CCD) camera or a complementary metal-oxide semiconductor (CMOS) camera.

As further illustrated in FIG. 9, a stereo audio coder-decoder (CODEC) 950 may be coupled to the multicore CPU 902. Moreover, an audio amplifier 952 may coupled to the stereo audio CODEC 950. In an exemplary aspect, a first stereo speaker 954 and a second stereo speaker 956 are coupled to the audio amplifier 952. FIG. 9 shows that a microphone amplifier 958 may be also coupled to the stereo audio CODEC 950. Additionally, a microphone 960 may be coupled to the microphone amplifier 958. In a particular aspect, a frequency modulation (FM) radio tuner 962 may be coupled to the stereo audio CODEC 950. Also, an FM antenna 67A2 is coupled to the FM radio tuner 962. Further, stereo headphones 966 may be coupled to the stereo audio CODEC 950.

FIG. 9 further illustrates that a radio frequency (RF) transceiver 968 may be coupled to the multicore CPU 902. An RF switch 970 may be coupled to the RF transceiver 968 and an RF antenna 67A1. A keypad 974 may be coupled to the multicore CPU 902. Also, a mono headset with a microphone 976 may be coupled to the multicore CPU 902. Further, a vibrator device 978 may be coupled to the multicore CPU 902.

FIG. 9 also shows an NFC antenna 67A3 that may be coupled to the CPU 902. FIG. 9 further illustrates a power supply 980 coupled to the on-chip system 922. In a particular aspect, the power supply 980 is a direct current (DC) power supply that provides power to the various components of the PCD 900 that require power. Further, in a particular aspect, the power supply is a rechargeable DC battery or a DC power supply that is derived from an alternating current (AC) to DC transformer that is connected to an AC power source.

FIG. 9 further indicates that the PCD 900 may also include a network card 988 that may be used to access a data network, e.g., a local area network, a personal area network, or any other network (like 150 of FIG. 1A). The network card 988 may be a Bluetooth network card, a WiFi network card, a personal area network (PAN) card, a personal area network ultra-low-power technology (PeANUT) network card, a television/cable/satellite tuner, or any other network card well known in the art. Further, the network card 988 may be incorporated into a chip, i.e., the network card 988 may be a full solution in a chip, and may not be a separate network card 988.

As depicted in FIG. 9, the touch screen display 908, the video port 938, the USB port 942, the camera 948, the first stereo speaker 954, the second stereo speaker 956, the microphone 960, the FM antenna 964, the stereo headphones 966, the RF switch 970, the RF antenna 972, the NFC antenna 67A3, the keypad 974, the mono headset 976, the vibrator 978, and the power supply 980 may be external to the on-chip system 922.

Figure 10:
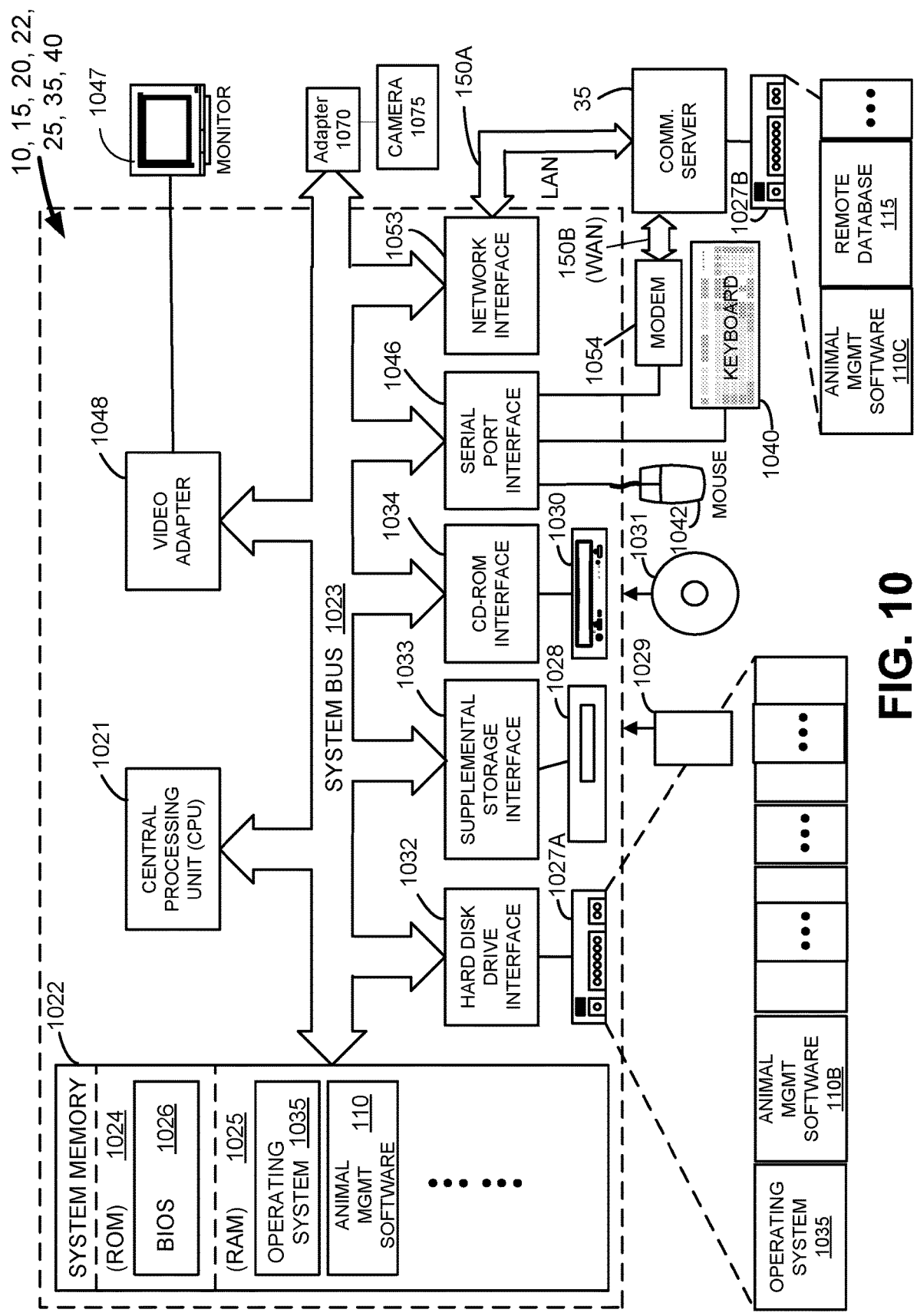
FIG. 10 illustrates one exemplary computer of the system of FIG. 1A according to one exemplary embodiment of the invention.

Referring now to FIG. 10, this figure is a functional block diagram of internet connected device, for example, any one of the computer servers 10, 15, 20, 22, 25, 35 and 40 illustrated in FIG. 1A that can be used in the system 101 for tracking NFC-tags 55. The exemplary operating environment for the system 101 includes a general-purpose computing device in the form of a conventional computer 10, 15, 20, 22, 25, 35 and 40 [hereinafter, "computer 10"].

Generally, a computer 10 includes a processing unit 1021, a system memory 1022, and a system bus 1023 that couples various system components including the system memory 1022 to the processing unit 1021. The system bus 1023 may be any of several types of bus structures including a memory bus or memory controller, a peripheral bus, and a local bus using any of a variety of bus architectures.

The system memory 1022 includes a read-only memory (ROM) 1024 and a random access memory (RAM) 1025. A basic input/output system (BIOS) 1026, containing the basic routines that help to transfer information between elements within computer 105, such as during start-up, is stored in ROM 1024.

The computer 10 can include a hard disk drive 1027A for reading from and writing to a hard disk, not shown, a supplemental storage drive 1033 for reading from or writing to a removable supplemental storage 1029 (like flash memory and/or a USB drive) and an optical disk drive 1030 for reading from or writing to a removable optical disk 1031 such as a CD-ROM or other optical media. Hard disk drive 1027A, supplemental storage 1029, and the optical disk drive 1030 are connected to system bus 1023 by a hard disk drive interface 1032, a supplemental storage drive interface 1033, and an optical disk drive interface 1034, respectively.

Although the exemplary environment described herein employs hard disk 1027A, removable supplemental storage 1029, and a removable optical disk 1031, it should be appreciated by those skilled in the art that other types of computer readable media which can store data that is accessible by a computer, such as magnetic cassettes, flash memory cards, digital video disks, Bernoulli cartridges, RAMs, ROMs, and the like, may also be used in the exemplary operating environment without departing from the scope of this disclosure. Such uses of other forms of computer readable media besides the hardware illustrated will be used in internet connected devices such as in the servers 10 and mobile phone 100 of system 101.

The drives and their associated computer readable media illustrated in FIG. 10 provide nonvolatile storage of computer-executable instructions, data structures, program modules, and other data for computer or client device 100, like a mobile phone 100 of FIG. 1A. A number of program modules may be stored on hard disk 1027, supplemental storage 1029, optical disk 1031, ROM 1024, or RAM 1025, including, but not limited to, an operating system 1035 and animal management software 110. Program modules include routines, sub-routines, programs, objects, components, data structures, etc., which perform particular tasks or implement particular abstract data types. Aspects of the present invention may be implemented in the form of a downloadable, client-side, animal management software 110 which is executed by the phone 100 to provide a NFC reader described above.

A user may enter commands and information into computer 10 through input devices, such as a keyboard 1040 and a pointing device 1042. Pointing devices may include a mouse, a trackball, and an electronic pen that can be used in conjunction with an electronic tablet. Other input devices (not shown) may include a microphone, joystick, game pad, satellite dish, scanner, or the like. These and other input devices are often connected to processing unit 1021 through a serial port interface 1046 that is coupled to the system bus 1023, but may be connected by other interfaces, such as a parallel port, game port, a universal serial bus (USB), or the like.

The display 1047 may also be connected to system bus 1023 via an interface, such as a video adapter 1048. As noted above, the display 1047 can comprise any type of display devices such as a liquid crystal display (LCD), a plasma display, an organic light-emitting diode (OLED) display, and a cathode ray tube (CRT) display.

The camera 1075 may also be connected to system bus 1023 via an interface, such as an adapter 1070. As noted previously, the camera 1075 can comprise a video camera such as a webcam. The camera 1075 can be a CCD (charge-coupled device) camera or a CMOS (complementary metal-oxide-semiconductor) camera. In addition to the monitor 1047 and camera 1075, server 10, comprising a computer, may include other peripheral output devices (not shown), such as speakers and printers.

The computer 10 may operate in a networked environment using logical connections to one or more remote computers, such as another server 10B of FIG. 10. A remote computer 35 may be another personal computer, a server 35, a mobile phone 100, a router, a network PC, a peer device, or other common network node. While a server or a remote computer 35 typically includes many or all of the elements described above, only a memory storage device 1027B has been illustrated FIG. 10.

The logical connections depicted in FIG. 10 include a local area network (LAN) 150A and a wide area network (WAN) 150A. Such networking environments are commonplace in offices, enterprise-wide computer networks, intranets, and the Internet. Communication networks 150 of FIG. 10 correspond with the communication network 150 illustrated with FIG. 1A.

When used in a LAN networking environment 150A, the computer 10 is often connected to the local area network 150A through a network interface or adapter 1053. When used in a WAN networking environment, the computer 10 typically includes a modem 1054 or other means for establishing communications over WAN 150B, such as the Internet. Modem 1054, which may be internal or external, is connected to system bus 1023 via serial port interface 1046. In a networked environment, program modules depicted relative to the server 35, or portions thereof, may be stored in the remote memory storage device 1027B. It will be appreciated that the network connections shown are exemplary and other means of establishing a communications link between the computers 10, 35 and mobile phones 100 of FIG. 1A may be used.

Moreover, those skilled in the art will appreciate that the present system 101 which employs computers 10 may be implemented in other computer system configurations, including hand-held devices—like mobile phone 100 of FIG. 1A, multiprocessor systems, microprocessor based or programmable consumer electronics, network personal computers, minicomputers, mainframe computers, and the like. The system 101 may also be practiced in distributed computing environments, where tasks are performed by remote processing devices that are linked through the communications network 150. In a distributed computing environment, program modules may be located in both local and remote memory storage devices.

Figure 11A:
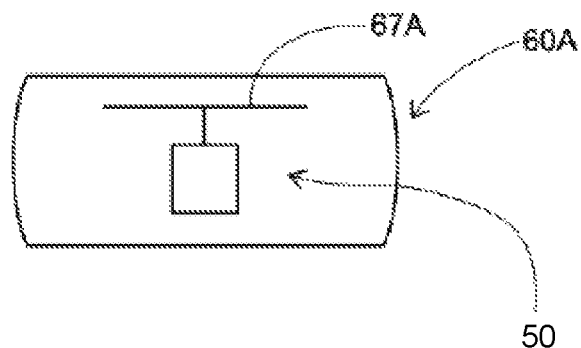
FIG. 11A illustrates one exemplary embodiment of an implantable or ingestible RFID tag according to principles of the present invention.

Referring now to FIG. 11A, this figure illustrates one exemplary embodiment of an implantable or ingestible RFID tag 50 according to principles of the present invention. The RFID tag 50 may comprise an antenna 67A that is enveloped in a container 60A.

Figure 11B:
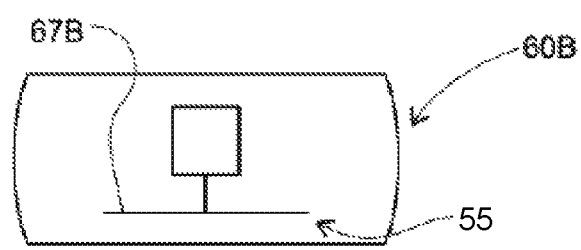
FIG. 11B illustrates one exemplary embodiment of an implantable or ingestible NFC tag according to principles of the present invention.

Referring to FIG. 11B, this figure illustrates one exemplary embodiment of an implantable or ingestible NFC tag 55 according to principles of the present invention. Like the RFID tag 50 of FIG. 11A, NFC tag 55 may comprise an antenna 67B that is enveloped in a container 60B.

The NFC tag 55 may be implanted in addition to an RFID tag 50 into a same animal 65 [see FIG. 1A], so that the animal 65 can be identified via the NFC tag 55 according to the present invention or via the RFID tag 50 according to known methods. The NFC tag 55 and the RFID tag 55 may be implantable using the same or separate procedures. In such circumstances, the location of the NFC implant and the RFID implant may be at commonly understood locations on the animal so that a person seeking to energize and read the appropriate tag will know where to apply the appropriate reader (NFC or RFID). For example, in cattle animal applications, tags 50, 55 are generally fastened and/or implanted in or proximate to the ear of the animal 65.

According to one aspect of the present invention, the NFC tag 55 may be included in a medium that can then be implanted under the skin of a pet, for example a hermetically sealed biocompatible container 60. For example, the NFC tag 55 may be included in a glass vial 60 and implanted in a manner similar to prior RFID tag systems, however, with the NFC tag functionality described herein.

Figures 2, 12A:
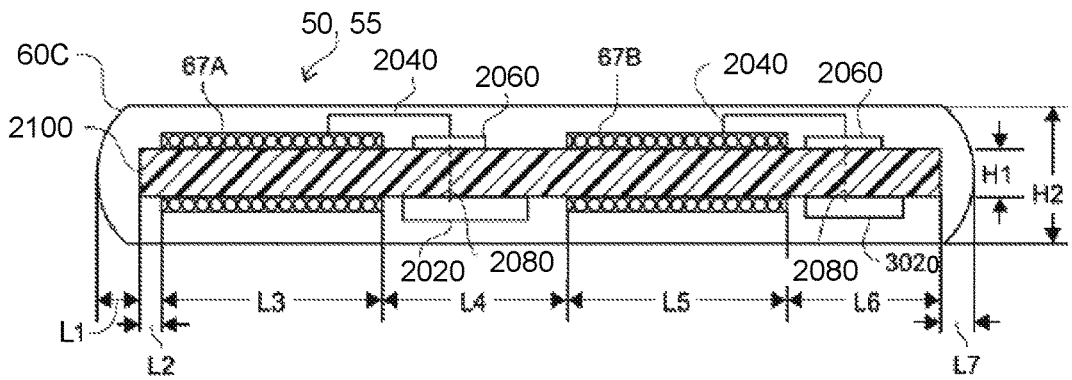
Figures 2, 12B:
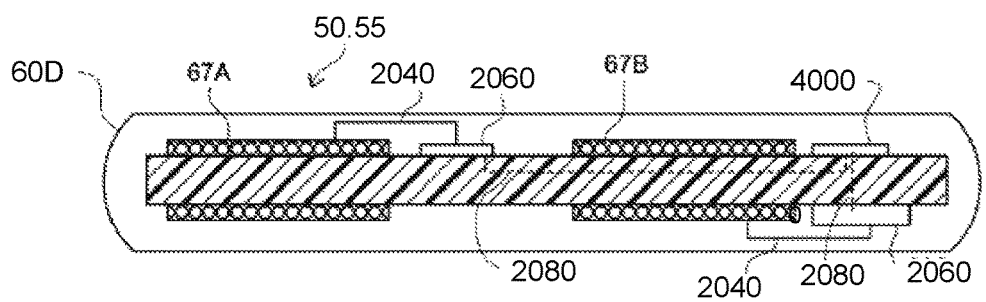
Figures 2I, 12C:
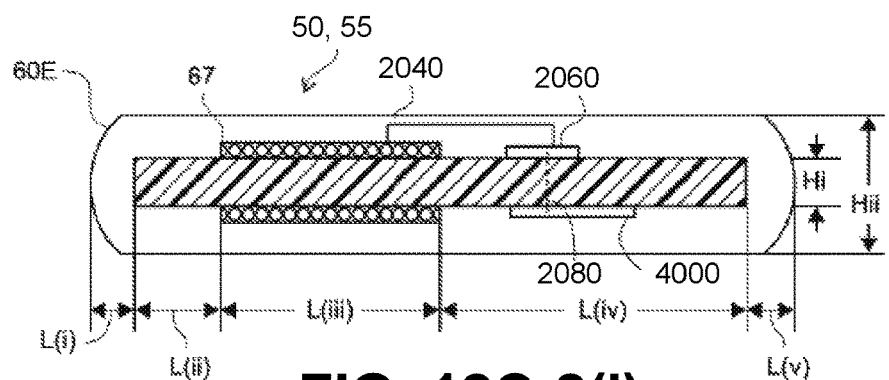
Figures 2, 12C:
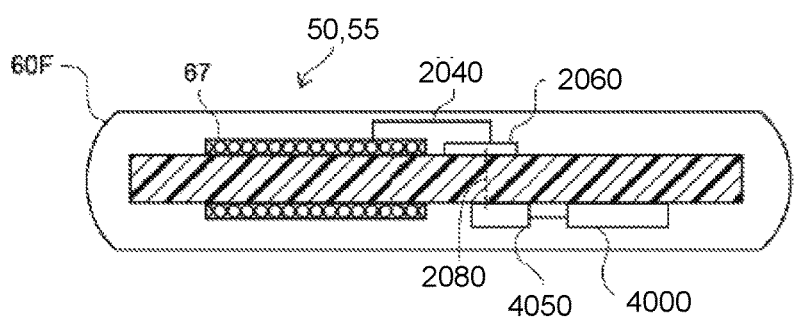

Referring now to FIG. 12A-1, this figure illustrates one exemplary embodiment of a single encasement 60C for an implantable or ingestible NFC tag 55 and RFID tag 50 having separate chips 2020[RFID], 3020[NFC] and separate antennas 67A, 67B according to principles of the present invention. As schematically illustrated in FIG. 12A-1, a single vial or encasement 60C could include an RFID chip 2020 with its own antenna 67A for communication on an appropriate frequency for a known RFID reader and an NFC chip 3020 and appropriate antenna 67B for communication on an appropriate frequency for NFC readers. Further details of this exemplary embodiment illustrated of FIG. 12A-1 are illustrated in FIG. 12A-2 described in further detail below.

Referring now to FIG. 12B-1, this figure illustrates one exemplary embodiment of a single encasement 60D for an implantable or ingestible NFC and RFID tag combination which has a common chip 4000 but separate antennas 67A, 67B according to principles of the present invention. As schematically illustrated in FIG. 12B-1, a single chip 4000 may be operably connected to a first antenna 67A capable of transmitting/receiving an appropriate frequency for known RFID readers and also operably connected to second antenna 67B capable of transmitting/receiving an appropriate frequency for NFC readers. Further details of the exemplary embodiment of FIG. 12B-1 are illustrated in FIG. 12B-2 described in further detail below.

Similarly, FIG. 12C-1 illustrates one exemplary embodiment of a single encasement 60E for implantable or ingestible NFC and RFID tags having a common chip 4000 and common antenna 67 for both tag functions. As schematically illustrated in FIG. 12C-1, a single "dual mode" chip 4000 may be operably connected to a single antenna 67 capable of transmitting/receiving an appropriate frequency for known RFID readers and an appropriate frequency for NFC readers is included in a single vial or encasement. Further details of the exemplary embodiment of FIG. 12C-1 are illustrated in FIG. 12C-2(*i*) and FIG. 12C-2(*ii*), described below.

The single chip 4000 of FIG. 12B-1 and FIG. 12C-1 may include standard RFID technology functionality and NFC tag functionality. That is, for example, the chip 4000 may have a component/elements that can be energized by an RFID reader specific to that type of microchip and by a generic NFC reader of the type typically available with various portable electronic devices such as mobile phones 110 and tablets.

For example, when energized, the RFID tag 50 typically operates at about a 136.0 kHz frequency and is readable at approximately 3.0 feet from the chip 4000 to transmit a unique identification code that can be correlated with the user identification information to facilitate providing services to the user.

Typically, the correlation information is maintained in a database that is accessible to appropriate "readers", such as veterinarians, animal shelters, law enforcement and animal control officials. In addition, the same single chip 4000 can also function according to principles of the present invention such that an NFC reader energizes the NFC tag functionality of the chip 4000 to launch the URL on an Internet connected device or via an App.

In another aspect of the present invention, the tag 50, 55 may be ingestible, for use, for example, for laboratory animals. Although not shown in the present figures, an ingestible tag 50, 55 may be fabricated in a fashion similar to the implantable tag, so long as the materials used therefore are safe for ingestion, as would be appreciated by one of skill in the art.

FIG. 12A-2 illustrates one exemplary embodiment of a single encasement 60C for implantable or an ingestible NFC tag 55 and RFID tag 50 with separate chips 2020[RF], 3020[NFC] and separate antennas 67A, 67B according to the exemplary embodiment illustrated in FIG. 12A-1. The single encasement 60C may comprise glass, plastic, and/or a biocompatible polymer. The encasement 60C when made from plastic may comprise a thickness of between about 0.20 mm to about 0.70 mm, and preferably about 0.30 mm. However, other dimensions larger or smaller are feasible and are included within the scope of this disclosure as understood by one of ordinary skill in the art. For example, for each of the dimensions noted above, each may be increased or decreased by about 0.50 mm and would be within the scope of this disclosure.

The encasement 60C when made from glass may comprise a thickness of between about 0.30 mm to about 0.40 mm, and preferably about 0.35 mm. However, other dimensions larger or smaller are feasible and are included within the scope of this disclosure as understood by one of ordinary skill in the art. For example, for each of the dimensions noted above, each may be increased or decreased by about 0.5 mm and would be within the scope of this disclosure.

The encasement 60C may enclose a substrate 2100 that supports two antennas 67A, 67B and an RFID chip 2020, and an NFC chip 3020. Further details of exemplary circuitry present within the RFID chip 2020 and NFC chip 3020 are described above in connection with FIG. 8B.

The encasement 60C when made from glass may have a thickness or height dimension H2 that comprises a range between about 3.5 mm to about 4.0 mm, preferably 3.85 mm. The substrate 2100 may comprise a dielectric material (non-conductive material), such as a plastic or a ceramic.

However, other dielectric materials may be used and are included with the scope of this disclosure. The dielectric material for the substrate 2100 may comprise composite materials. The composites may contain a matrix (usually an epoxy resin), a reinforcement (usually a woven, sometimes nonwoven, glass fibers, sometimes even paper), and in some cases a filler is added to the resin (e.g. ceramics; titanate ceramics can be used to increase the dielectric constant) as understood by one of ordinary skill in the art.

The thickness or height H1 of the substrate 2100 may comprise a range of between about 0.8 mm to about 1.4 mm, and preferably about 1.2 mm. However, other dimensions larger or smaller are feasible and are included within the scope of this disclosure as understood by one of ordinary skill in the art. For example, for each of the dimensions noted above, each may be increased or decreased by about 0.5 mm and would be within the scope of this disclosure.

The first antenna 67A may be coupled to the RFID chip 2020. The first antenna 67A may be coupled to the RFID chip via a solder wire 2040 and solder pad 2060. The solder pad is coupled to the RFID chip 2020 by a wire 2080 that penetrates/passes through the substrate 2100. In a similar manner, the second antenna 67B may be coupled to the NFC chip 3020. The second antenna 67B may be coupled to the NFC chip 3020 via a second solder wire 2040 and a second solder pad 2060. The second solder pad 2060 is coupled to the NFC chip 3020 by a wire 2080 that penetrates/passes through the substrate 2100.

The first antenna 67A may comprise a coil antenna having insulated wire as understood by one of ordinary skill in the art. In other embodiments, the wire for the antenna 67A may not be insulated as appropriate.

The first antenna 67A supports communications for the RFID chip 2020. The first antenna 67A may be tuned for a first radio-frequency (RF) of about 134.2 kHz. However, the first antenna 67A may be tuned for other frequencies higher or lower than this frequency as understood by one of ordinary skill in the art. For example, other frequencies for RFID tags 50 may include, but are not limited to, between about 125.0 KHz to about 148.0 KHz, preferably about 134.2 kHz (low-frequency); and between about 914.0 MHz to about 916.0 MHz, preferably about 915.0 MHz (Ultrahigh-frequency). These frequency ranges are applicable to all RFID tags 50 described in this specification.

The second antenna 67B, like the first antenna 67A, may comprise a coil antenna having insulated wire as understood by one of ordinary skill in the art. In other embodiments, the wire for the antenna 67B may not be insulated as appropriate. The second antenna 67B supports communications for the NFC chip 3020. The second antenna 67B may be tuned for a second radio-frequency (RF) of about 13.56 MHz. However, the second antenna 67B may be tuned for other frequencies higher or lower than this frequency as understood by one of ordinary skill in the art. For example, other frequencies for NFC tags 55 may include, but are not limited to, between about 12.00 MHz to about 14.00 MHz, between about 13.553 MHz and 13.567 MHz, and preferably at about 13.56 MHz (high-frequency). These frequency ranges are applicable to all NFC tags 55 described in this specification.

Exemplary lengths for the elements within the encasement 60C described above may comprise the following: a length L1 defining a distance between a first end of the encasement 60C and the substrate 2100 comprising about 1.0 mm; a second length L2 defining a distance between a first end of the substrate 2100 and a first end of the first antenna 67A comprising about 0.5 mm; a third length L3 defining a distance between a first end of the first antenna 67A and a second end of the first antenna 67A comprising about 6.0 mm; a fourth length L4 defining a distance between the second end of the first antenna 67A and a first end of the second antenna 67B comprising about 4.0 mm; a fifth length L5 defining a distance between the first end of the second antenna 67B and a second end of the second antenna 67B comprising about 6.0 mm; a sixth length L6 defining a distance between a the second end of the second antenna 67B and a second end of the substrate 2100 comprising about 4.5 mm; and a seventh length L7 defining a distance between the second end of the substrate 2100 and a second end of the encasement 60C comprising about 1.0 mm. As understood by one of ordinary skill in the art, these exemplary lengths may be decreased or increased without departing from the scope of this disclosure. For example, for each of the lengths noted above, each may be increased or decreased by about 0.5 mm and would be within the scope of this disclosure.

While the length of the two coil antennas 67A, 67B are the same in this exemplary embodiment illustrated in FIG. 12A-2, one of ordinary skill in the art recognizes that any one of a multitude of variables/parameters may be adjusted relative to these antennas 67A, 67B such that the physical lengths are equal but each may support different frequencies relative to each other. For example, one of the antennas 67 could be provide with a ferro-magnetic core, and/or the gauge of wire used between the two antennas 67 could be different, and/or a tuning circuit/impedance matching circuit (not illustrated, but see circuit 405 of FIG. 8B) could be employed such that the physical lengths of the two antennas 67A, 67B could be the same while the transmitted frequencies could be different/adjusted as understood by one of ordinary skill in the art.

Referring now to FIG. 12B-2, this figure illustrates one exemplary embodiment of a single encasement 60D for an implantable or ingestible NFC tag 55 and RFID tag 50 with a common chip 4000 and separate antennas 67A, 67B according to the exemplary embodiment illustrated in FIG. 12B-1. The exemplary embodiment of FIG. 12B-2 shares similar physical characteristics relative to the exemplary embodiment of FIG. 12A-2. Therefore, only the differences between the embodiments illustrated in FIG. 12A-2 and FIG. 12B-2 will be described below.

The first antenna 67A is coupled to a first solder pad 2060 via a solder wire 2040. The solder pad 2060 is coupled to the common chip 4000 via a first solder wire 2080 that penetrates the substrate 2100. Similarly, the second antenna 67B is coupled to a second solder pad 2060 via a solder wire 2040. The second solder pad 2060 is coupled to the common chip 4000 via a second solder wire 2080 that also penetrates the substrate 2100.

The first antenna 67A may support radio-frequencies for RFID communications while the second antenna 67B may support radio-frequencies for NFC communications. The common chip 4000 may comprise circuitry that supports NFC communications and RFID communications. The common chip 4000, thus, may have two sets of circuits that are described above and illustrated in FIG. 8B.

FIG. 12C-2(i) illustrates one exemplary embodiment of a single encasement 60E for an implantable or ingestible NFC tag 55 and RFID tag 50 with a common chip 4000 and a single, common antenna 67 for both tags 50, 55 according to the exemplary embodiment illustrated in FIG. 12C-1. The exemplary embodiment of FIG. 12C-1 shares similar physical characteristics relative to the exemplary embodiment of both FIGS. 12A-2 and 12B-2. Therefore, only the differences between the embodiments illustrated in FIG. 12A-2/12B-2 and FIG. 12C-2(i) will be described below.

The single antenna 67 is coupled a solder pad 2060 via solder wire/trace 2040. The solder pad 2060 is also coupled to a solder wire 2080 that may penetrate/pass through the substrate 2100 to the common chip 4000. In addition to the common chip 4000 having both NFC circuitry and RFID circuitry for supporting both NFC and RFID communications, the common chip 4000 may also comprise a tuning circuit/impedance matching circuit 405 [See FIG. 8B above]. The impedance matching circuit 405 may tune/operate the single antenna 67 at both RFID frequencies and NFC frequencies as understood by one of ordinary skill in the art.

Exemplary lengths for the elements within encasement 60E described above may comprise the following: a first length L(i) defining a distance between a first end of the encasement 60E and the substrate 2100 comprising about 1.0 mm; a second length L(ii) defining a distance between a first end of the substrate 2100 and a first end of the sole antenna 67 comprising about 0.5 mm; a third length L(iii) defining a distance between a first end of the sole antenna 67 and a second end of the sole antenna 67 comprising about 6.0 mm; a fourth length L(iv) defining a distance between the second end of the sole antenna 67 and a second end of the substrate 2100 comprising about 3.5 mm; and a fifth length L(v) defining a distance between the second end of the substrate 2100 and a second end of the encasement 60E comprising about 1.0 mm. As understood by one of ordinary skill in the art, these exemplary lengths may be decreased or increased without departing from the scope of this disclosure. For example, for each of the lengths noted above, each may be increased or decreased by about 0.5 mm and would be within the scope of this disclosure.

Referring now to FIG. 12C-2(ii), this figure illustrates one exemplary embodiment of a single encasement 60F for an implantable or ingestible NFC tag 55 and RFID tag 50 having a common chip 4000 and a single antenna 67 for both tags 50, 55 according to the exemplary embodiment illustrated in FIG. 12C-1. The exemplary embodiment of FIG. 12C-2(ii) shares similar physical characteristics relative to the exemplary embodiment of FIG. 12C-2(i). Therefore, only the differences between the embodiments illustrated in FIG. 12C-2(i) and FIG. 12C-2(ii) will be described below.

The single antenna 67 of this exemplary embodiment of FIG. 12C-2(ii) is coupled to a solder pad 2060 via a solder wire 2040. The solder pad 2060 is coupled to a separate, tuning/impedance matching chip 4050 via a solder wire 2080 that penetrates/passes through the substrate 2100. The tuning/impedance matching chip 4050 is coupled to the common chip 4000. As described previously, the common chip 4000 may have both NFC circuitry and RFID circuitry for supporting both NFC and RFID communications as understood by one of ordinary skill in the art. Details for the common chip 4000 are described above in connection with FIG. 8B.

Certain steps in the processes or process flows described in this specification naturally precede others for the invention to function as described. However, the invention is not limited to the order of the steps described if such order or sequence does not alter the functionality of the invention. That is, it is recognized that some steps may be performed before, after, or parallel (substantially simultaneously with)

other steps without departing from the scope and spirit of the invention. Further, words such and "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification.

Therefore, disclosure of a particular set of program code instructions or detailed hardware devices is not considered necessary for an adequate understanding of how to make and use the invention. The inventive functionality of the claimed computer implemented process is explained in more detail in the above description and in conjunction with the figures that may illustrate various processes flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM, Flash, or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, Server, or other remote source, such as in "cloud" computing, using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk, and blue-ray disc where disks usually reproduce data magnetically, while discs reproduce data optically with lasers. Combinations of the above should also be included within the scope or computer-readable media.

Alternative embodiments for the system and method of the present disclosure will become apparent to one of ordinary skill in the art to which the invention pertains without departing from its spirit and scope. Therefore, although selected aspects have been illustrated and described in detail, it will be understood that various substitutions and alterations may be made therein without departing from the spirit and scope of the present invention, as defined by the following claims.

What is claimed is:

1. A computer-implemented method for tracking near-field communication (NFC)-enabled animals with a portable computing device (PCD), the computer-implemented method comprising:

providing an NFC-tag comprising memory, the memory containing a unique identifier; coupling the NFC-tag to an animal; scanning the NFC-tag with the PCD;

the PCD receiving tag information from the scan, the tag information comprising the unique identifier and a universal resource locater;

the PCD transmitting the URL over a communications network to a domain name service computer server;

the domain name service computer server transmitting over the communications network to the PCD an internet protocol address of a NFC-tag identification server assigned to the URL that was part of the tag information;

the PCD transmitting the tag info from the scan over the communications network to the NFC-tag identification server;

if the NFC-tag identification server is available, the NFC-tag identification server receives tag info and then transmits a message comprising a link to an on-line store where animal management software that may communicate with the NFC-tag may be purchased; the NFC-identification server is a first NFC-identification server, if the first NFC-identification server is unavailable, then the first NFC-identification server transmits a redirect message over the communications network to the PCD, the redirect message causing the PCD to re-transmit the tag info to the domain name service server;

wherein the domain name service server receives the tag information and then reviews a list and identifies an internet protocol address for a second NFC-identification server assigned to the NFC-tag according to the sub-domain of the URL which is part of the tag information stored in the memory of the NFC-tag.

2. The method of claim 1, wherein the on-line store is associated with a jurisdiction of the NFC-tag identification server.

3. The method of claim 1, wherein the domain name service server transmits the internet protocol address for the second NFC-identification server over the communications network to the PCD.

4. The method of claim 1, wherein the list comprises internet protocol addresses of a plurality of NFC-identification servers located in different countries.

5. The method of claim 4, wherein a sequence in the list of the NFC-identification servers located in different countries is governed by a protocol established by a government entity.

6. The method of claim 1, wherein the portable computing device comprises at least one of a cellular telephone, a smartphone, a portable digital assistant (PDA), a portable game console, a navigation device, and a tablet computer.

7. The method of claim 1, wherein the portable computing device is a hand-held device.

* * * * *